(12) United States Patent  (10) Patent No.: US 7,753,279 B2
Sells et al.  (45) Date of Patent: Jul. 13, 2010

(54) CARD PERSONALIZATION SYSTEM AND METHOD FOR THE SAME

(75) Inventors: Robert Anders Sells, Edina, MN (US); Richard W. Wendt, Shakopee, MN (US); Dean Raymond Nichols, Hugo, MN (US); Brian Paul Johnson, Eden Prairie, MN (US)

(73) Assignee: DataCard Corporation, Minnetonka, MN (US)

( * ) Notice: Subject to any disclaimer, the term of this patent is extended or adjusted under 35 U.S.C. 154(b) by 0 days.

(21) Appl. No.: 12/034,848

(22) Filed: Feb. 21, 2008

(65) Prior Publication Data

US 2008/0179813 A1 Jul. 31, 2008

Related U.S. Application Data

(63) Continuation of application No. 11/111,456, filed on Apr. 21, 2005, now Pat. No. 7,458,515, which is a continuation of application No. 10/346,849, filed on Jan. 13, 2003, now Pat. No. 6,902,107.

(60) Provisional application No. 60/352,648, filed on Jan. 28, 2002.

(51) Int. Cl.
*G06K 7/00* (2006.01)
(52) U.S. Cl. ...................... 235/486; 235/380
(58) Field of Classification Search ................ 235/486, 235/375, 380; 400/521
See application file for complete search history.

(56) References Cited

U.S. PATENT DOCUMENTS

| 3,820,455 | A |  | 6/1974 | Hencley et al. |
| 4,825,054 | A |  | 4/1989 | Rust et al. |
| 5,012,073 | A |  | 4/1991 | Hewitt et al. |
| 5,037,216 | A |  | 8/1991 | Nubson et al. |
| 5,202,549 | A |  | 4/1993 | Decker et al. |
| 5,266,781 | A |  | 11/1993 | Warwick |
| 5,401,111 | A |  | 3/1995 | Nubson et al. |
| 5,451,037 | A |  | 9/1995 | Lundstrom |
| 5,588,763 | A |  | 12/1996 | Nubson et al. |
| 5,837,991 | A |  | 11/1998 | LaManna et al. |
| 6,142,370 | A |  | 11/2000 | LaManna et al. |
| 6,481,093 | B1 | * | 11/2002 | Ruden et al. ............. 29/603.03 |

(Continued)

FOREIGN PATENT DOCUMENTS

JP 5-159110 A 6/1993

(Continued)

OTHER PUBLICATIONS

"The Toyota Way" by Jeffrey Liker, McGraw Hill, Jan. 2004, esp. pp. 129-130. Viewable at Google books: http://books.google.com/books?id=9y_sxqERqvMC.*

(Continued)

*Primary Examiner*—Daniel A Hess
(74) *Attorney, Agent, or Firm*—Hamre, Schumann, Mueller & Larson, P.C.

(57) ABSTRACT

A system and method for personalizing cards and other secure identification documents. The card personalization system and method provide improved data integrity, system reliability, and system performance. Improvements to card handling and processing within the modules, improved card transfer between modules, improvements to control of the modules, and other improvements are set forth, all of which contribute, individually and collectively, to achieving these goals.

8 Claims, 75 Drawing Sheets

U.S. PATENT DOCUMENTS 6,783,067 B2     8/2004     Kreuter et al.

FOREIGN PATENT DOCUMENTS

| | | |
|---|---|---|
| JP | 7-24421 A | 1/1995 |
| JP | 8-127443 A | 5/1996 |
| JP | 11-60013 A | 3/1999 |
| JP | 2001-52117 A | 2/2001 |
| JP | 2001-356884 A | 12/2001 |

OTHER PUBLICATIONS

Liker, The Toyota Way, 2004, McGraw Hill, pp. 128-131.*
Kanban: Just in Time At Toyota, 1989, Productivity Press, pp. 70-75.*
DataCard Japan Ltd. Service Division "DC2500 E-CIF Warning Light Option, Rev. A", Jul. 17, 1992, 6 pages including 3 pages of Japanese text and 3 pages of English translation.
DataCard Series 2500 Data-Match Inserter System, undated, 2 pages.
Official Action issued by the Japanese Patent Office Apr. 3, 2009.
A letter dated May 4, 2009 sent to representatives of the assignee alleging materiality of certain information; 3 pages.
Exhibit D from May 4, 2009 letter, Business Services Industry, Datacard and Cybernetix Join Forces to Bring High-Volume Card Personalization System to Market; Business Wire, Oct. 25, 2000, 4 pages.
Exhibit E from May 4, 2009 letter, Cybernetix HPX4000 card issuance system; 2000 copyright notice; 2 pages.
Exhibit C (redacted) contained in Exhibit F from May 4, 2009 letter; Spare Parts Price List; 5 pages.
Exhibit G (redacted) from May 4, 2009 letter; e-mail dated Jan. 27, 2001; 3 pages.
Exhibit H from May 4, 2009 letter; 2 pages.
Exhibit I (redacted) from May 4, 2009 letter; 3 pages.
Exhibit J from May 4, 2009 letter; 2 pages.
Exhibit K from May 4, 2009 letter; 2 pages.
Exhibit L from May 4, 2009 letter; Semiconductor Equipment, HPX 4000, Smart card personalisation system; alleged date of Apr. 2001; 3 pages.
Exhibit M from May 4, 2009 letter; Datacard Group, Cybernetix, HPX; Apr. 17, 2001; 2 pages.
Exhibit N from May 4, 2009 letter; HPX 4000, Smart Card Personalisation Machine, Model: 001A and 002A, User Manual; dated May 15, 2001; 33 pages.
Exhibit O from May 4, 2009 letter; HPX 4000, Smart Card Personalisation Machine, Model: 001A and 002A, Installation Manual; dated May 5, 2001; 47 pages.
Exhibit P from May 4, 2009 letter; Datacard Group, The Transition from Magnetic Stripe to EMV Chip (Smart) Cards, White Paper, Version 1.0, Nov. 2001; 14 pages.

* cited by examiner

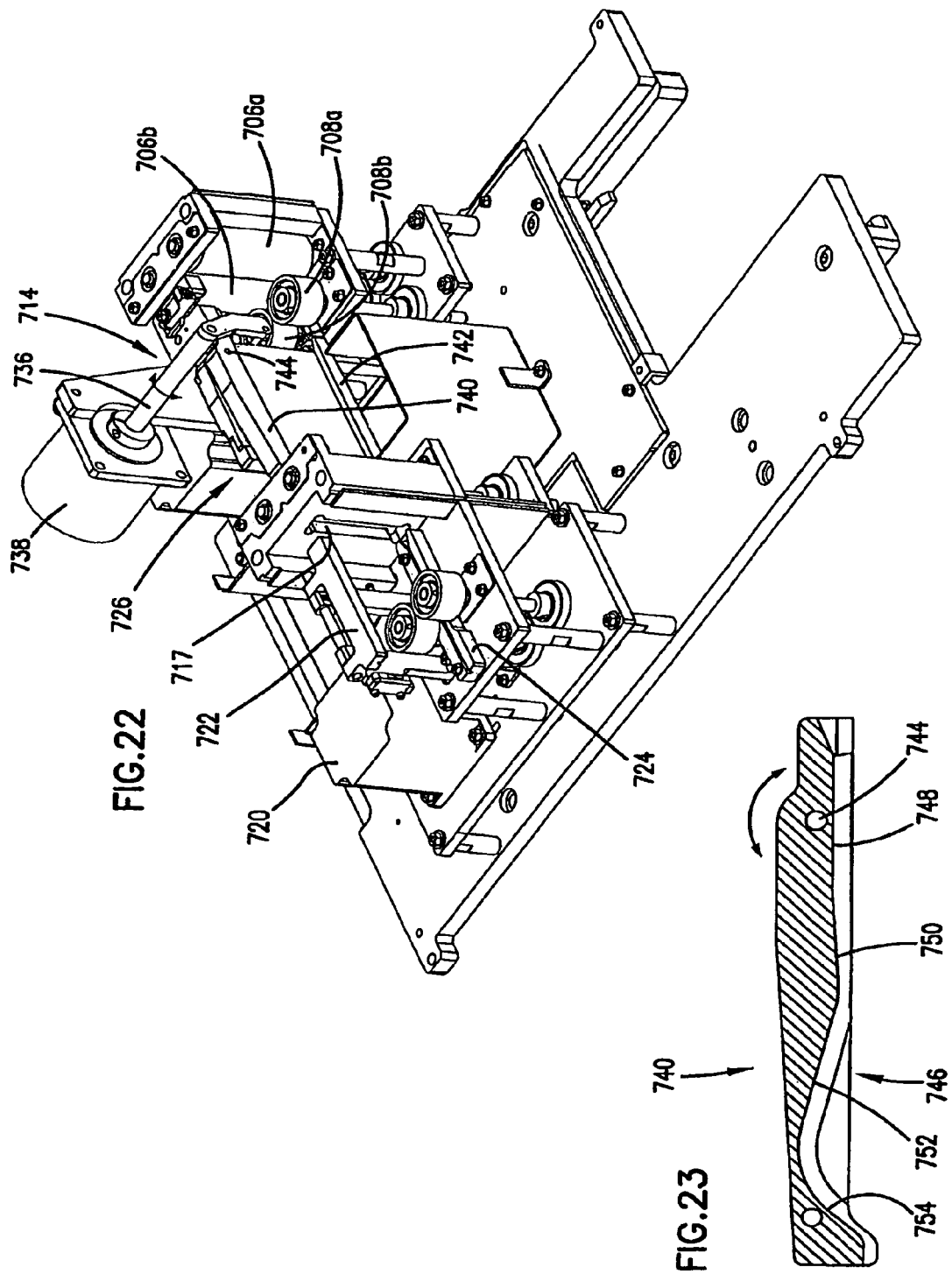

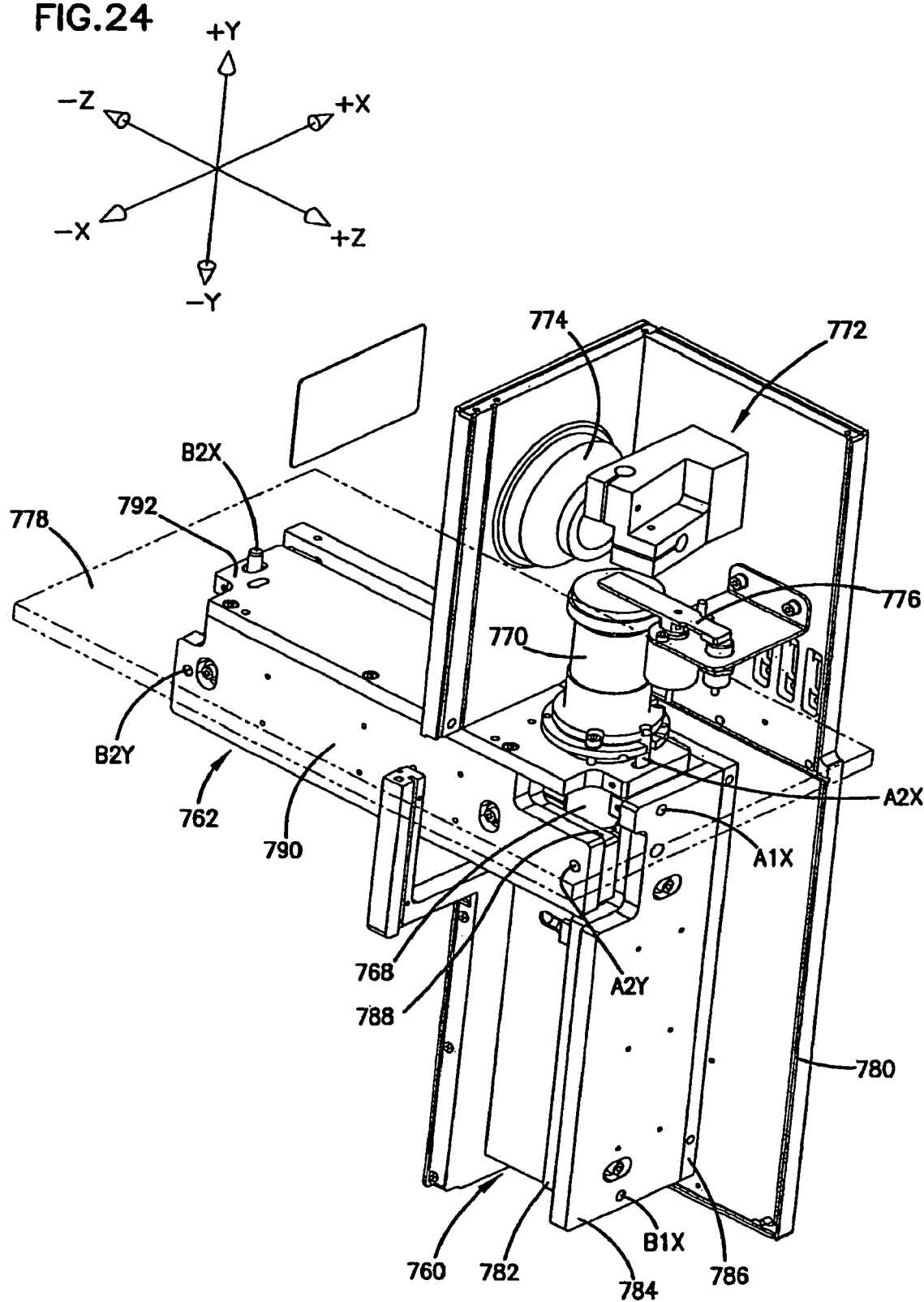

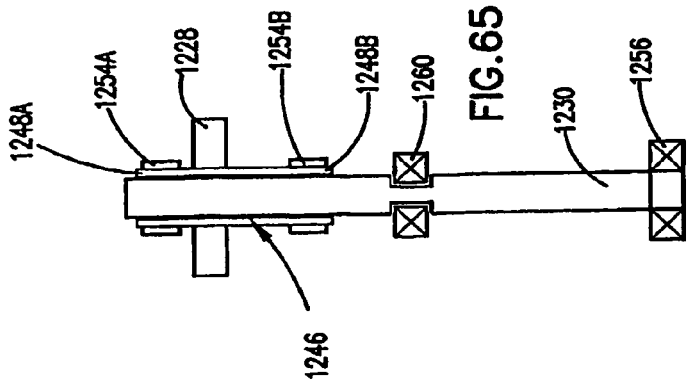
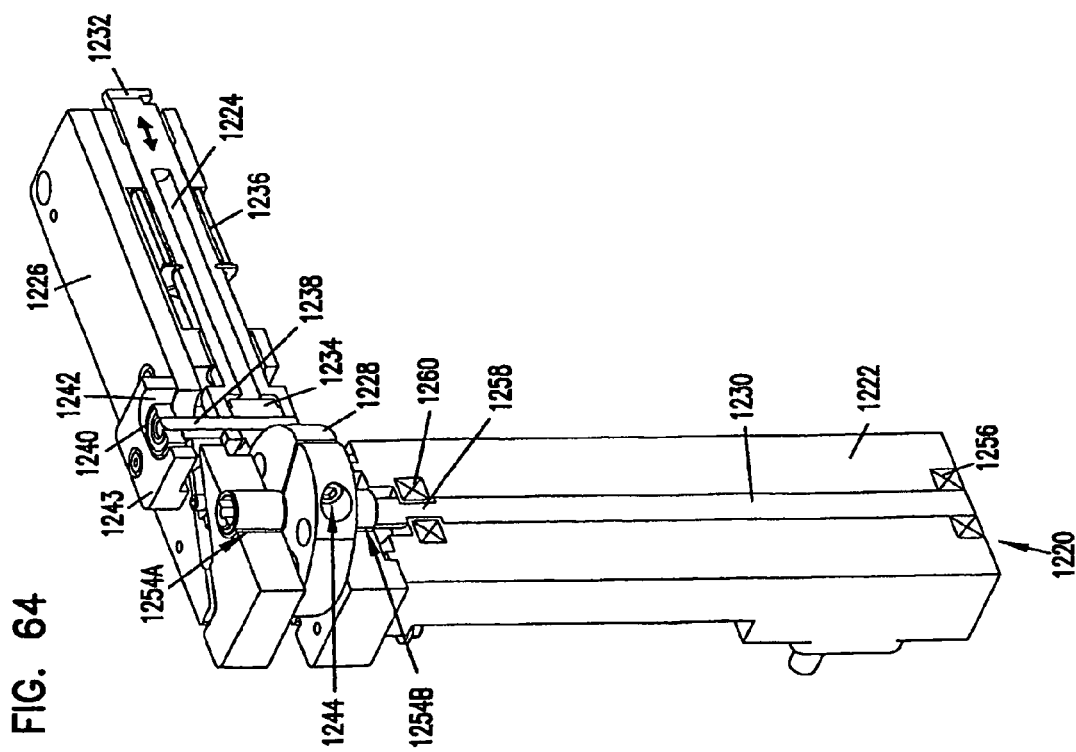

CARD PERSONALIZATION SYSTEM AND METHOD FOR THE SAME

PRIOR APPLICATIONS

This application is a Continuation of U.S. application Ser. No. 11/111,456, filed Apr. 21, 2005, now U.S. Pat. No. 7,458,515 which is a Continuation of U.S. application Ser. No. 10/346,849, now U.S. Pat. No. 6,902,107, filed Jan. 13, 2003, which claims the benefit of U.S. Provisional Application No. 60/352,648, filed Jan. 28, 2002. The prior applications are herein incorporated by reference in their entirety.

FIELD OF THE INVENTION

This invention relates to a system and method for producing and personalizing identity documents. In particular, this invention relates to a system and method for producing and personalizing data bearing plastic cards such as financial (e.g. credit and debit) cards, drivers' licenses, national identification cards, and other cards which are personalized with information unique to the card holder and/or with other card or document information.

BACKGROUND OF THE INVENTION

Card personalization systems and methods used in producing personalized cards and other personalized identity documents have been employed by institutions that issue such documents. Identity documents which are often personalized by such systems and methods includes plastic and composite cards, such as financial (e.g. credit and debit) cards, drivers' licenses, national identification cards, and other cards and documents which are personalized with information unique to the intended document holder.

Card personalization systems and methods can be designed for small scale, individual card personalization and production. In these systems, a single card to be personalized is input into a personalization machine, which typically includes one or two personalization/production capabilities, such as printing and laminating.

For large volume, batch production of cards, institutions often utilize systems that employ multiple processing stations or modules to process multiple cards at the same time to reduce the overall per card processing time. Examples of such systems includes the DataCard 9000 series available from DataCard Corporation of Minneapolis, Minn., the system disclosed in U.S. Pat. No. 4,825,054, and the system disclosed in U.S. Pat. No. 5,266,781 and its progeny. Common to each of these types of systems is an input with the ability to hold a relatively large number of cards that are to be personalized/produced, a plurality of personalization/production stations through which each card is directed to perform a personalization/production operation, and an output that holds the personalized cards. Personalization and production operations that are typically performed on the cards include the programming of data onto a magnetic stripe of the card, monochromatic and/or color printing, programming an integrated circuit chip in the card, embossing, and applying various topcoat and protective layers. A controller is typically employed to transfer data information and instructions for operating the input, the personalization/production stations, and the output.

In batch card personalization and production systems, such as the DataCard 9000 series, data integrity (e.g. ensuring that the correct data is placed onto the proper card), and system reliability and performance are important. Any improvements in these areas, including improvements in the personalization process and the modules used to implement the process, will improve the utility of batch card personalization and production systems.

The present invention, as described hereinbelow, provides improvements upon one or more of the above described existing and previous card personalization systems.

SUMMARY OF THE INVENTION

The present invention provides a system for personalizing cards and other secure identification documents. Further, the present invention provides methods of personalizing cards and secure documents. One object of the present invention is to provide a card personalization system with improved data integrity, reliability, and performance.

In one embodiment of the present invention, a card personalization system includes an input at one end of the system that holds a supply of cards and inputs the cards for personalization by the system. The input delivers each of the cards to a plurality of card processing modules arranged in sequence, where one module is downstream from a previous module. An output is disposed at an end of the card personalization system, and collects cards that have been personalized by the card processing modules. Together the input, plurality of processing modules, and output define a card track, which enables each card to advance through the system. A controller is operatively connected to and in communication with the input, each of the processing modules, and the output. Processing and data information is transferred to and from the controller to the input, processing modules, and output.

In one embodiment, the system is arranged and configured to operate such that at least one of the modules exits a processed card before accepting entry of another card to be processed by the module. Preferably, the system is arranged and configured to operate such that a card can be output to the next module after the module completes its personalization, provided the next module is ready to receive the card (i.e. the next module has already processed its card and exited the card), and once the card exits the module, the module is ready to receive another card from the adjacent upstream module.

More preferably, each module in the system operates such that entry of a card into a module occurs only after a processed card has exited the module, or when no card is in the module, where card transfer by the plurality of modules in the system is configured in a cascading arrangement.

In one embodiment, the processing modules are supported on a mounting mechanism. The mounting mechanism includes common support structures to enable secure connection and proper alignment of the modules.

In one embodiment, each of the processing modules includes status indicators incorporated therein and in communication with the controller. A status indicator is also incorporated into an operator station of the system. The status indicators provide the disposition and operation status of each of the modules.

In one embodiment, the controller that is used to control operation of the system provides a networking system. The networking system resides in the controller, wherein configurative adjustments may be made at the controller for each card processing module connected within the system.

In one embodiment, the plurality of processing modules include, but are not limited to, a magnetic stripe module, an embossing module, a smart card programming module, a printer module, a laser module, a graphics module, and a cleaning module.

In one embodiment, a method for personalizing cards includes picking a card from an input, placing the card in a card track, and inputting the card to a first processing module. The card is transferred along the card track to additional processing modules arranged in sequence. The card is collected at an output after being personalized by one or more of the processing modules. Each of the processing modules personalizes a single card at a time, such that one card at a time is transferred through each processing module, wherein the processing modules transfer cards in a cascading configuration. A controller is provided to transfer data and other information to and from each of the system components, and to monitor operation of the system.

The present invention provides the advantages of a card personalization system and method having improved data integrity, reliability, and performance.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 22 is a front, left perspective view of interior portions of the laser module illustrating details thereof.

FIG. 23 is a longitudinal cross-sectional view of the card stop of the laser module illustrating details of the channel.

FIGS. 24-26 are perspective views of the laser mechanism used in the laser module.

FIG. 35b represents a top view of the card in sensor bracket of FIG. 35a.

FIG. 35c represents a front view of the card in sensor bracket of FIG. 35a.

FIG. 35d represents a side view of the card in sensor bracket of FIG. 35a.

FIG. 49b represents a bottom view of the roller of FIG. 49a.

FIG. 64 is a perspective view, partly in section, of a direct drive cam mechanism for use in an embossing module.

FIG. 65 is a cross-sectional view through the cam illustrating how the can is mounted on the shaft.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Figure 1:
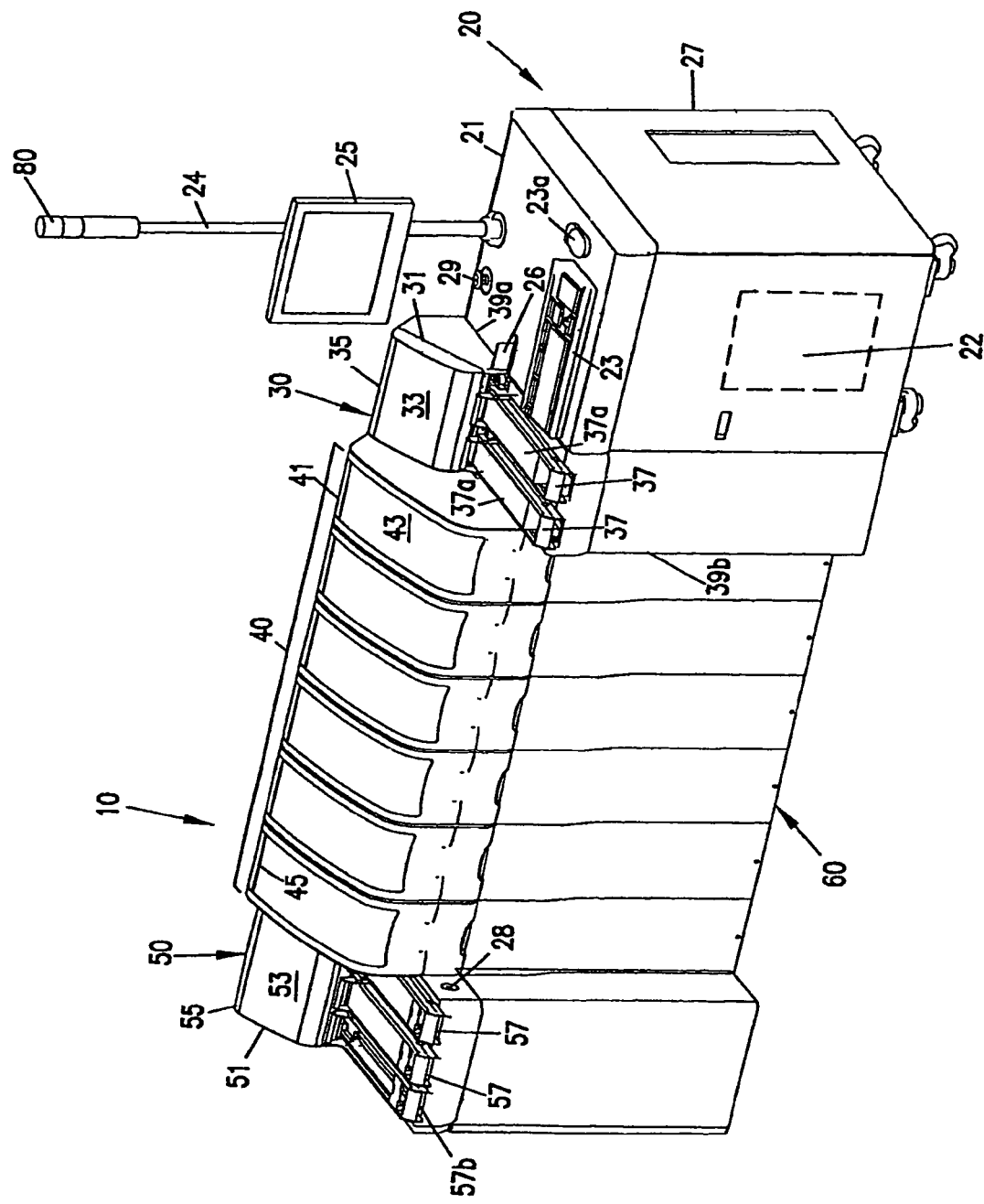
FIG. 1 represents a front perspective view of one embodiment of a card personalization system in accordance with the principles of the present invention.
Figure 2:
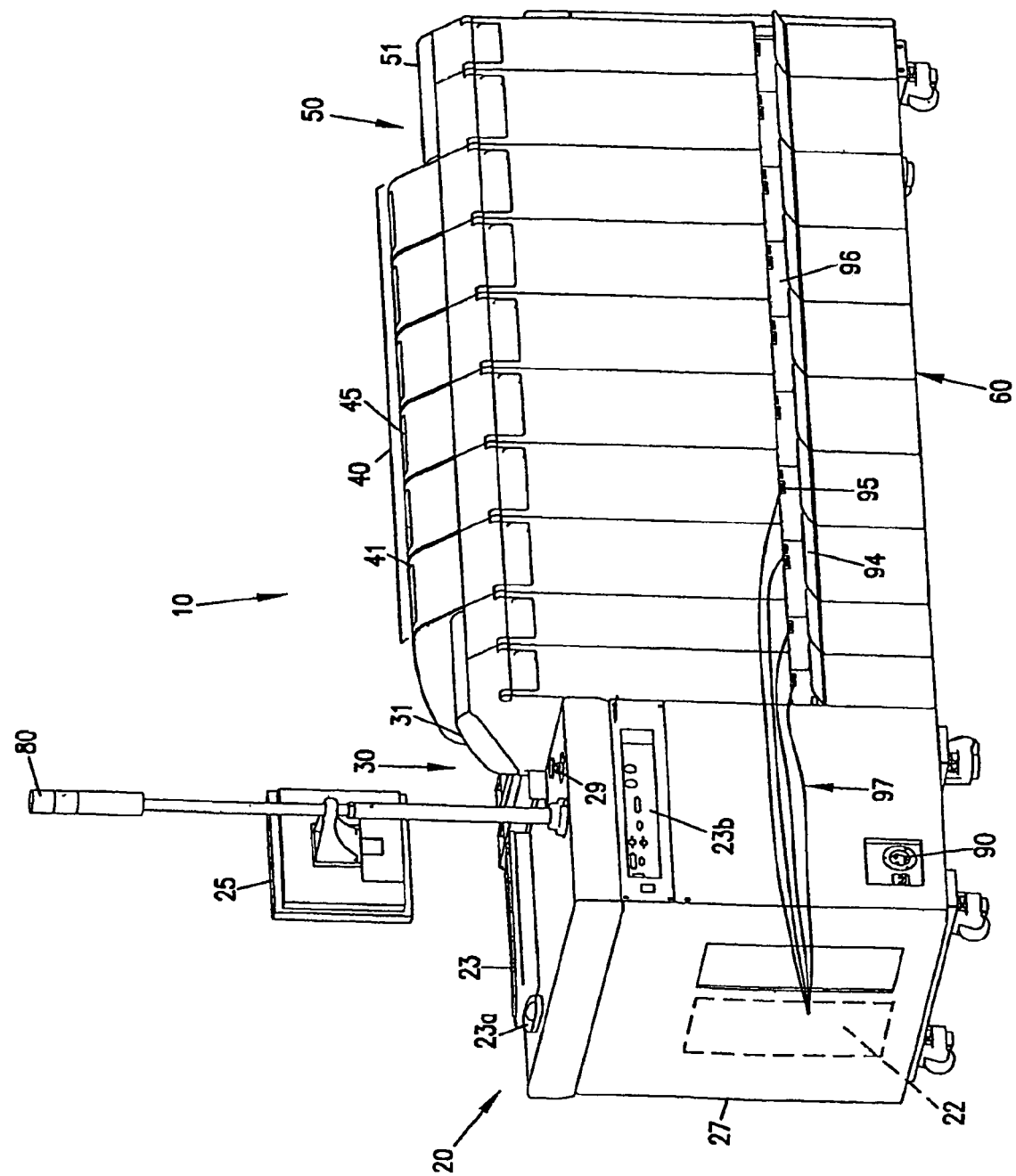
FIG. 2 represents a rear perspective view of the card personalization system of FIG. 1.

FIGS. 1 and 2 illustrate perspective views of one embodiment of a card personalization system 10 in assembled form. The card personalization system 10, referred hereafter as the system 10, includes an operator station 20, an input hopper 30, a plurality of processing modules 40, and an output hopper 50.

The operator station 20 includes a housing 27 having a work surface 21 formed on the top of the housing 27. A system controller 22, illustrated in dashed lines in FIGS. 1 and 2, resides in the housing 27. The controller 22 controls operation of the system 10 and transfers data to and from the input hopper 30, the modules 40 and the output hopper 50. The controller 22 can be a computer or any central processing unit suitable for transferring data and processing information. Operator interface means 23, 23a are connected to a data port system 23b of the controller 22 to permit control commands and data input to the controller 22. Preferably, the interface means 23, 23a are a keyboard and mouse, as depicted in FIGS. 1 and 2. However, it will be appreciated that other suitable interface means may be employed. Each module 40 also includes it own module controller (not shown) that controls the functions and operation of the respective module.

In addition, the operator station 20 includes an interface or monitor 25 to enable display and viewing of data pertaining to the operation of the controller 22, the input and output hoppers 30, 50, and the processing modules 40. As shown in FIGS. 1 and 2, the monitor 25 is preferably mounted to the station 20 through a support 24, which may be but is not limited to a pole. Further, a status indicator 80 may be employed at the top of the support 24 for indicating an operational status of the system 10.

As shown in FIG. 2, data and control commands are communicated between the controller 22 and the various components of the system 10 via data lines 97. Preferably, a data line 97 runs from the controller 22 to each system component, so that data and commands are directly received from the controller 22. For example, a pair of data lines 97 connect to the input hopper 30 to provide control and/or data inputs to each input mechanism of the hopper 30. Similarly, at least one data line 97 connects to the first module 40 to provide data and control inputs to the first module.

As shown in FIGS. 1 and 2, an emergency stop button 29 is provided on the work surface 21. When the button 29 is pressed, operation of the system 10 is stopped. In addition, the system 10 preferably includes at least one pause/resume button 28 to allow the system operator to temporarily pause system operation, such as when clearing a card jam, and to thereafter resume system operation simply by pressing the button 28. The pause/resume button(s) 28 can be located at any convenient location on the system 10. In the preferred embodiment, a pause/resume button 28 is provided on each of the input hopper 30 and the output hopper 50 (only the output hopper 50, button is visible in the figures). If desired, pause/resume buttons could also be provided on one or more of the modules 40 and/or on the operator station 20. Pause/resume capability could also be incorporated into the keyboard 23 or the mouse 23*a* and monitor 25.

The input hopper 30 is releasably connected at its upstream side 39*a* to a side of the operator station 20. The input hopper 30 preferably includes at least one tray 37 holding a supply of cards 37*a*. Preferably, the input hopper 30 includes a plurality of trays 37, thereby increasing the number of cards that can be automatically fed into the system 10. A cover 31 protects the inside of the input hopper 30. A status indicator 35 is provided on the input hopper 30 to indicate an operational status of the input hopper 30. The indicator 35 may be, but is not limited to, a light indicator.

The input hopper 30 works by picking a card 37*a* from the supply of cards held in one of the trays 37, and transferring the card into the adjacent downstream processing module 40 to begin personalization of the card. As an alternative to picking a card from the input hopper 30, an acception card slot 26 is provided in the work surface 21 of the operator station 20 upstream of the input hopper 30 and communicating with the card track and card transport mechanism of the input hopper. The card slot 26 allows input of a single card into the system 10, to enable personalization of a select card and/or to enable re-insertion of a previously picked card into the system, such as when an error occurs. Further description is provided below of an input hopper in accordance with the principles of the present invention.

The plurality of processing modules 40 are disposed at a downstream side 39*b* of the input hopper 30. The plurality of processing modules 40 are configured in a sequential arrangement, with each processing module being sequentially connected to a downstream side of a previous processing module or the input hopper 30. Particularly, as shown in FIGS. 1 and 2, a first processing module is connected to the downstream side 39*b* of the input hopper 30, with the additional processing modules each being sequentially arranged downstream.

As with the input hopper 30, each processing module 40 includes a cover 41 and a status indicator 45. The covers 41 may include a transparent surface 43 allowing a user or operator to view the inside of each of the processing modules 40. The status indicator provides an indication of an operational status of the respective processing module 40, and may be but is not limited to a light indicator. A variety of processing modules 40 may be employed in the system 10, some of which are further detailed below in accordance with the principles of the present invention.

Examples of processing modules 40 that may be included in the system 10 are a magnetic stripe module (described below) for writing data to and reading data from a magnetic stripe on the cards, an embossing module (described below) for forming embossed characters on the cards, a smart card programming module for programming an integrated circuit chip on the cards, a printer module for performing monochromatic or multi-color printing, a laser module (described below) for performing laser personalization on the cards, a graphics module (described below) for applying monochromatic data and images to the cards, a cleaning module (described below) for cleaning the cards, a topping module for applying a topcoat to the cards, and a card punching module to punch or cut a hole into the cards and/or to punch the card into a specific shape.

Figure 3:
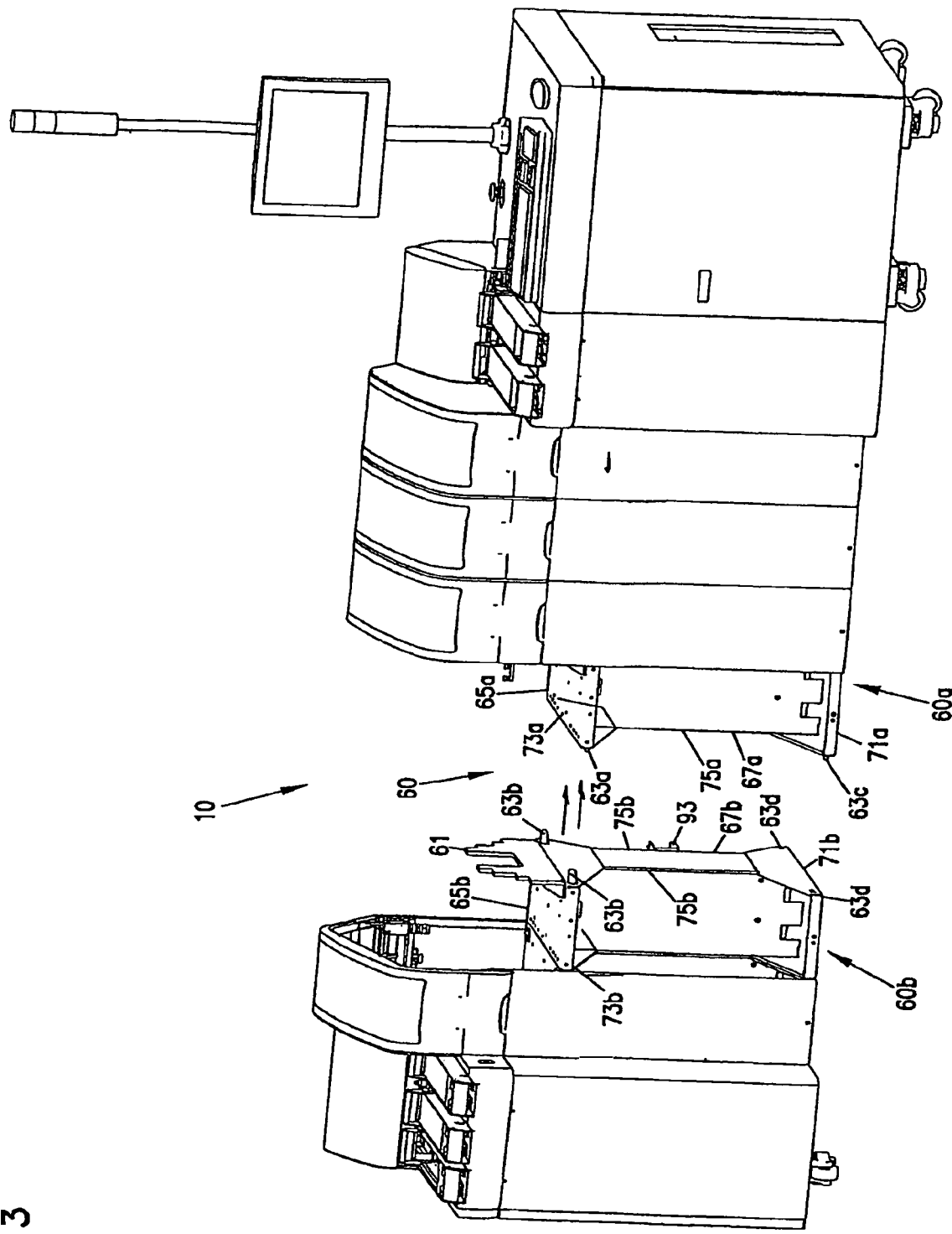
FIG. 3 represents a front perspective view of one embodiment of a mounting mechanism incorporated in the card personalization system of FIG. 1 in accordance with the principles of the present invention.

Each of the processing modules 40 is connected into the system 10 through a mounting mechanism 60. FIG. 3 best illustrates the features of the mounting mechanism 60. As shown in FIG. 3, two adjacent mounting mechanisms 60*a* and 60*b* are shown detached from each other. It will be appreciated that mounting mechanism 60*a* includes equivalent parts as mounting mechanism 60*b*. The mounting mechanisms 60*a*, 60*b* include frames 67*a*, 67*b*. The frames 67*a*, 67*b* each include a top 73*a*, 73*b*, and a bottom 71*a*, 71*b* to provide structural support for a processing module. At the top 73*a*, 73*b*, a platform 65*a*, 65*b* is provided with a substantially flat surface, where a processing module is positioned and held.

FIG. 3 shows a downstream side 75*a* of mounting mechanism 60*a* and an upstream side 75*b* of mounting mechanism 60*b*. However, it will be appreciated that each mounting mechanism 60*a*, 60*b* includes an upstream side and a downstream side. As shown, the mounting mechanism 60*b* includes a pair of locator pins 63*b* that fit into a corresponding pair of locator holes (not shown) of the adjacent mounting mechanism 60*a*. The locator holes and pins 63*b* provide a means for aligning and connecting adjacent mounting mechanisms 60*a*, 60*b* to ensure proper alignment of the mounting mechanisms and thereby the processing modules of the card personalization system. In addition, mounting holes 63*d* are disposed at the bottom 71*b* of the mounting mechanism 60*b*, and similar mounting holes (not shown) are disposed at the bottom 71*a* of the mounting mechanism 60*a*. The mounting holes 63*d* are connected by common screws 63*c* (only one screw is visible in FIG. 3) which fasten adjacent mounting mechanisms together. A similar arrangement of mounting holes (not shown) and mounting screws 63*a* (only one screw is visible in FIG. 3) is provided at the tops 73*a*, 73*b* of the mounting mechanisms 60*a*, 60*b*. It will be appreciated any suitable screw or other fastener may be employed for connecting the mounting holes. Moreover, it will be appreciated that other configurations of locating pins and holes may be employed to provide proper connection and alignment between respective adjacent mounting mechanisms 60*a*, 60*b*.

At an upstream side 75*b* of mounting mechanism 60*b*, a bracket 61 is mounted at the top 73*a*, 73*b* of the mounting mechanism 60*a*, 60*b*. The bracket 61 provides a common support structure, such that when adjacent mounting mechanisms 60*a*, 60*b* are connected together, the bracket 61 is shared between the adjacent modules. Preferably, the bracket 61 provides a mount structure for mounting the processing mechanisms of the processing modules. It will be appreciated that mounting mechanism 60*a* also includes a bracket, similar to bracket 61, on its upstream side. Further, it will be appreciated that the bracket 61 may be disposed at the downstream sides of mounting mechanisms 60*a*, 60*b* to achieve the same shared results. The common bracket 61 between the adjacent mounting mechanisms also provides improved alignment of the card path between processing modules sharing the bracket 61 and mounted on the mounting mechanisms. Two adjacent processing modules are mounted on respective mounting mechanisms, such as 60*a*, 60*b*, and share a bracket 61 as a common mount and support structure for the processing modules. Such a structure preserves alignment of the card path between processing modules.

Preferably, each of the processing modules 40 mounted on a mounting mechanism, such as 60*a*, 60*b*, are configured to have frames with widths of 9.0 inches, 6.25 inches, or 12.5 inches, or a combination thereof for mounting particular processing modules. Preferably, 12.5 inch frames use two 6.25 inch frames and respective covers, and front and back panels.

The input hopper 30, each module 40, and the output hopper 50 also include at least one panel 94 on the backside thereof, as best seen in FIG. 2. The panel 94 angles outwardly and upwardly away from the rear of the hopper or module, and together with the other panels 94, define a trough or channel 96. The trough 96 provides a convenient location for passing electrical and data cables and the like along the rear of the system. Each hopper 30, 50 and the modules 40 include at least one passage 95 in a back side thereof through which power and data cables can pass into the interior of the hopper or module, to provide power, data and control signals to the respective hopper or module controller. Power to the system 10 is input from a power cable (not shown) that connects to a power plug-in 90 provided on the backside of the operator station 20 as shown in FIG. 2. If the system 10 requires more power than that provided by a single power plug-in, an additional power plug-in can be provided on one of the downstream modules 40. In this case, upstream portions of the system 10 are provided power through the power plug-in 90, while downstream portions of the system are provided power through the power plug-in associated with the module 40.

After a card has been personalized by each of the processing modules 40, it is exited to an output hopper 50 that collects and stacks the finished cards. The output hopper 50 is disposed after the most downstream processing module 40. The output hopper 50 includes at least one collecting tray 57, and more preferably a plurality of collecting trays 57. One collecting tray 57 is preferably used to collect properly personalized cards while a second tray 57b is used to collect improperly personalized cards or defective cards that result from errors in processing. As with the input hopper 30 and the processing modules 40, the output hopper includes a cover 51 and a status indicator 55. The cover 51 and the status indicator 55 operate similarly to the cover and status indicator for the input hopper 30 and therefore are not further discussed herein. Further description is provided below of the output hopper 50 in accordance with the principles of the present invention.

Figure 4:
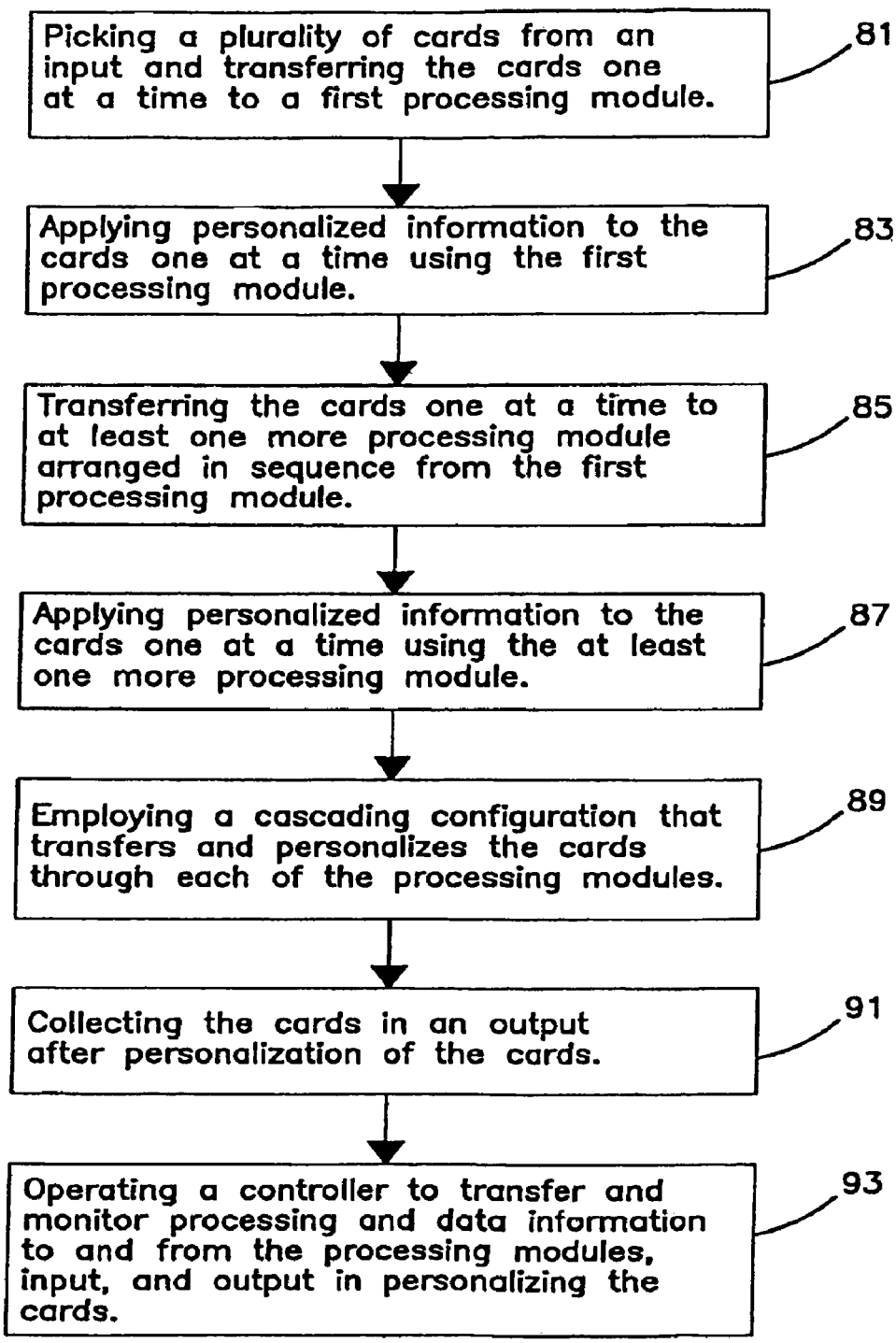
FIG. 4 represents a flow diagram of one embodiment of a method for personalizing a card in accordance with the principles of the present invention.

FIG. 4 provides a flow diagram of one preferred method 80 for personalizing a card. The method 80 includes picking a plurality of cards, one at a time, from an input, and transferring the cards, one at a time, to a first processing module 81. At the first processing module, personalized information is applied 83 to the cards as each card is transferred through the first processing module. After one card is finished being personalized by the first processing module, it is then transferred to at least one more processing module 85. The at least one more processing module or next processing module is arranged in sequence downstream from the first processing module. It will be appreciated that any additional processing modules also are arranged in a sequential manner. Personalized information is applied to each of the cards one at a time using the next processing module 87.

The processing modules employ a cascading sequence 89 to transfer cards through each of the processing modules. Particularly, when a module has completed personalizing a card, the card is completely transferred out of the module before the next card is transferred into the module from an upstream module. Then, the following card is transferred into the upstream module, and so on. Card transfers cascade, one at a time, from the downstream most module to the upstream most module. In this manner, only one card is in a module at a time. This improves system integrity by simplifying control algorithms, and reduces the likelihood that cards or their data can ever be mixed up in a module. However, in certain modules, such as the smart card programming module, a plurality of cards can be processed at the same time.

To further improve system integrity and assure that no module ever has two cards or parts of cards in it at any time, each module of the system 10 includes an entry and exit photocell. The entry photocell verifies that a card has entered the module, and the exit photocell verifies that a card has left the module. The entry and exit photocells of the modules are connected to the respective module controller so that the module knows when a card is entering or exiting the respective module. The module controller communicates this card status information to the system controller 22. Means, such as entry rollers on the module itself or rollers from an upstream module, transfer cards into the respective module. Similarly, means, such as exit rollers in the module or a card transport system of the module, transfer cards to the next module.

After a card is personalized by the processing modules, the card is collected in an output 91. A controller, such as controller 22 shown and described in FIGS. 1 and 2 and the module controllers, are operated 93 to transfer and monitor processing and data information to and from the input, processing modules, and output in personalizing the cards.

The system 10 has been described so far as including a single module 40 of any one of the different types of modules 40, i.e. a single magnetic stripe module, a single laser module, a single graphics module, etc. Often times, the time required by an individual personalization module to complete its particular personalization task may be long, such that the immediately adjacent upstream module must wait until the personalization task is complete before sending a new card to the downstream personalization module. Because the immediately adjacent upstream module must wait, further upstream modules may also have to wait for the personalization task of the first module to be completed. In effect then, a long personalization task in one module can effectively cause the system 10 to pause until the personalization of the one module is complete.

To avoid this situation, a plurality of any one of the modules can be used, with the identical modules arranged side-by-side in the system 10. By using a plurality of the same type of module, each module can be assigned to perform a similar personalization task. Therefore, if a first module that is assigned to perform for example, a laser personalization task, has not completed its personalization task, the next card from the immediately adjacent upstream module can be transported to the second laser module rather than waiting for completion of the personalization in the first laser module. Additional modules performing a particular personalization task can be added as needed in order to prevent pausing of the system. This concept of grouping modules that perform similar personalization tasks increases card throughput.

In addition, if a plurality of one type of module is used, each module can be assigned different personalization tasks. For instance, if a plurality of laser modules are used, one laser module can be used to personalize one line of information onto a card, after which the card is transferred to the next laser module which is used to personalize a second line of information onto the card. If needed, the card can be transferred to additional laser modules for personalization of other information onto the card. Therefore, a long personalization task can be broken up into distinct task segments, with each module being assigned to handle one of the task segments, rather than the entire personalization task being performed by a single module. This also increases card throughput.

Processing Modules

The following descriptions are provided to illustrate features and improvements upon respective processing modules of the card personalization system 10 in accordance with the principles of the present invention.

Reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Input Hopper

Input hoppers are needed to provide a supply of cards and input the cards to be processed and personalized by any following processing modules. The input hopper 30 includes trays for holding a supply of stacked cards to be processed. In addition, cards are selected to be entered into a card track, and input to a downstream processing module. Typically, the cards are selected using roller assemblies and a suction cup to pick each card from a card tray. Usually, a card pusher is employed to apply a force against the card stack and continuously reseats the card stack after each picked card. However, these designs employ separating rollers that rotate towards a respective card to be picked and use the reduced air pressure provided by the suction cup alone to pick and pull a card from the card supply tray. In addition, a spring load usually is employed with the card pusher to provide the force against the card stack.

Although these designs may be suitable for their purpose, improvements may still be made. There is still a need for an input hopper that provides a higher reliability and efficiency for holding and inputting cards to be processed by a card personalization system. The following description illustrates the features and improvements made upon existing designs of an input hopper in accordance with the principles of the present invention.

As illustrated in FIGS. 1 and 2, the input hopper 30 of the system 10 is positioned adjacent to and immediately downstream from the operator station 20 for inputting cards upstream of all of the modules 40. It will be appreciated that one or more similar input hoppers may also be located within the system downstream from the input hopper 30 and between two or more of the modules 40. In this configuration, cards can be inserted at into the card path of the system at the location(s) of the input hopper, allowing the cards to bypass one or more of the modules 40. Thus, multiple input hoppers can exist within the card personalization system 10, including between modules 40.

FIGS. 5-15 illustrate an input hopper 200 according to the present invention. Preferably, the module 200 is capable of inputting cards up to 3000 cards per hour.

Figure 5:
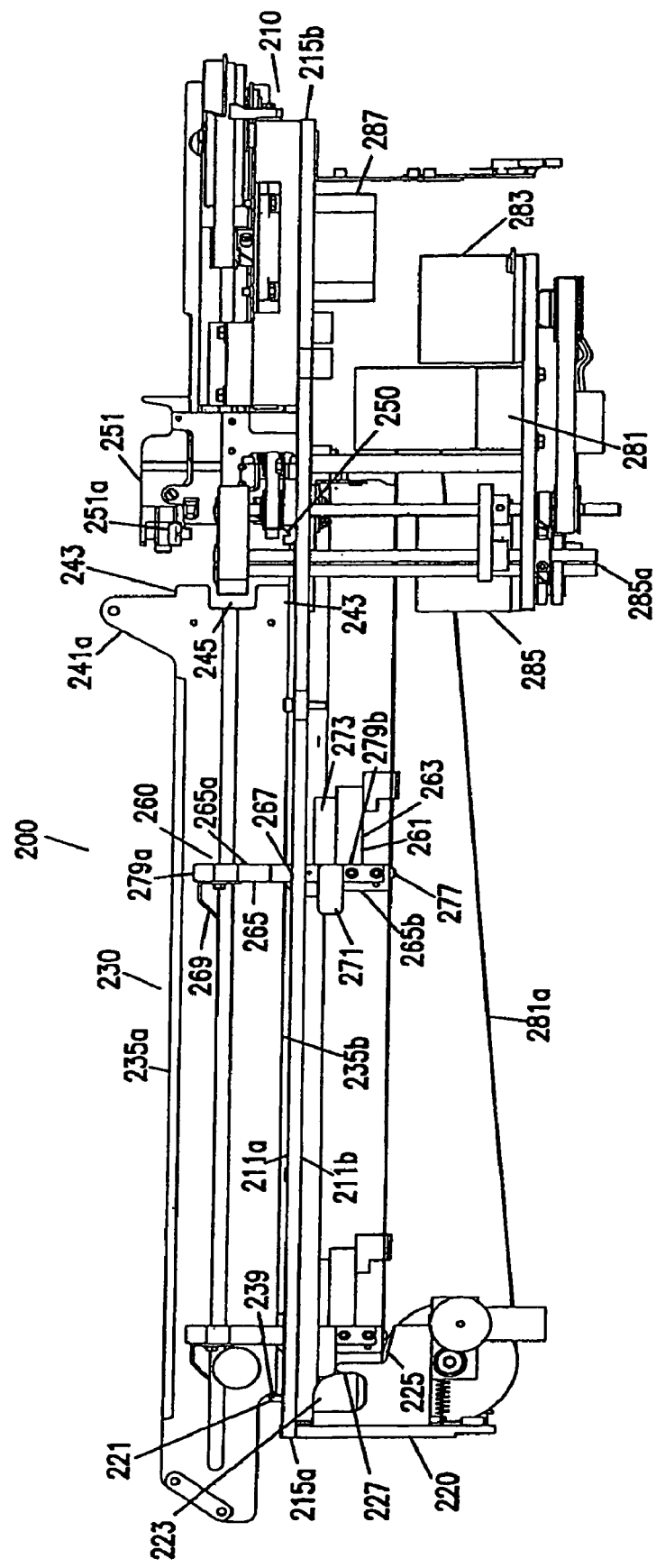
FIG. 5 represents a side view of one embodiment of an input hopper in accordance with the principles of the present invention.
Figure 6:
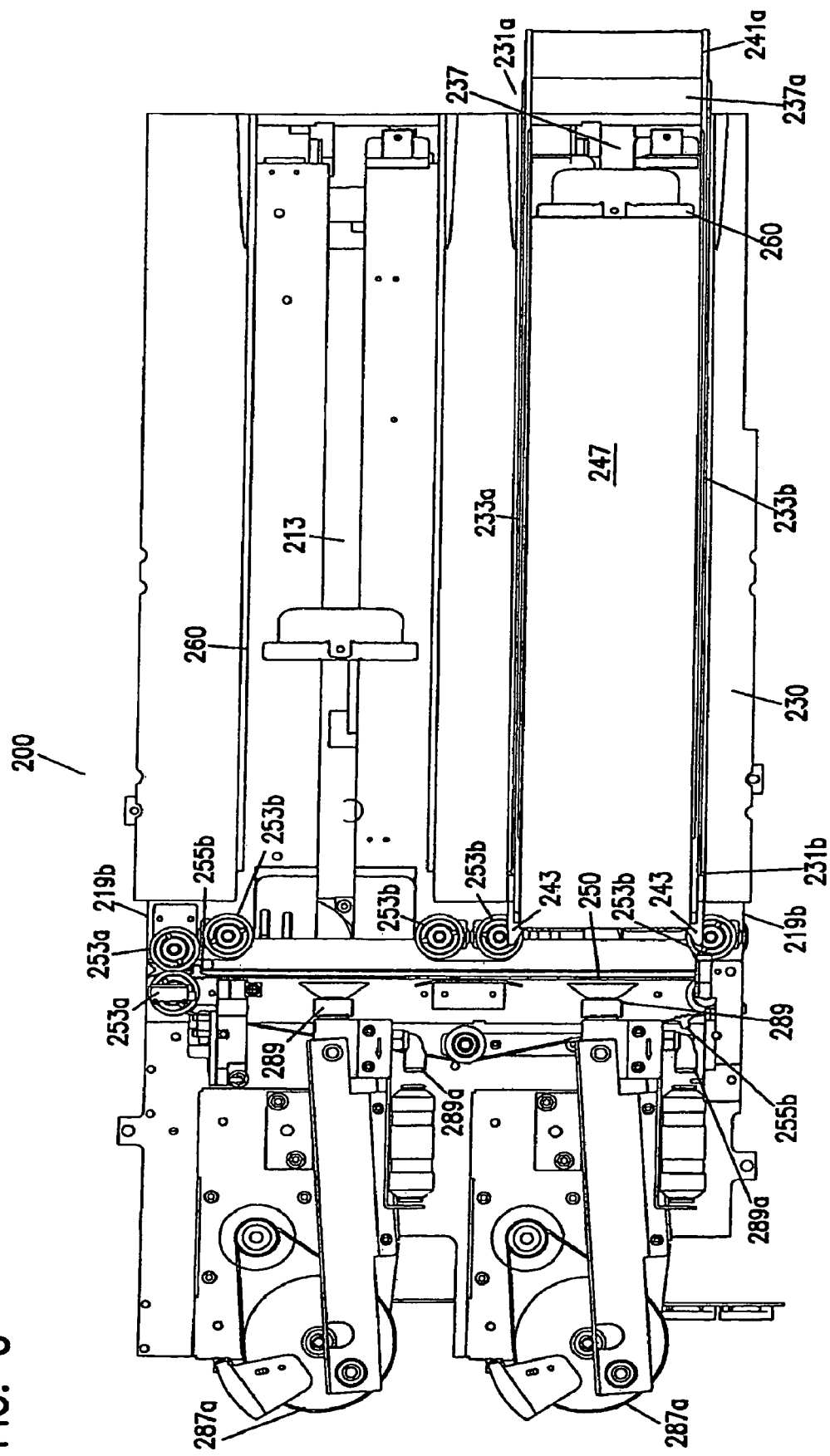
FIG. 6 represents a top view of the input hopper of FIG. 5.

FIGS. 5 and 6 illustrate side and top views of one preferred embodiment of the input hopper 200. The input hopper 200 includes a frame 210 having a front 215a, a back 215b, a top 211a, a bottom 211b, and upstream and downstream sides 219a, 219b (best shown in FIG. 6), respectively. The frame 210 includes a slot 213 extending from the front 215a toward the back 215b. At least one card tray 230 includes a front 231a, a back 231b, a top 235a, a bottom 235b, and sides 233a, 233b. The card tray 230 is disposed on the top 211a of the frame 210 and extends a length from the front 215a toward the back 215b of the frame 210. A trough 247 provides a space for a supply of cards to be held before being picked for processing by downstream processing modules. The card tray 230 also includes a slot 237 extending from the front 231a toward the back 231b of the card tray 230. The slot 237 of the card tray 230 corresponds with the slot 213 of the frame 210. As shown in FIGS. 5 and 6, one tray 230 is illustrated. However, it will be appreciated that a plurality of card trays, such as card tray 230, may also be employed. Preferably, the input hopper 200 employs card trays, such as the card tray 230, in pairs.

A card pusher 260 is operatively connected to the frame 210 and its corresponding card tray 230. The card pusher 260 extends through the slots 213, 237 of the frame 210 and card tray, respectively. Further, the card pusher 260 is movable back and forth along the slots 213 and 237. The card pusher 260 includes a backstop 265 having a handle, and is pivotally engaged to a frame 261 having a support structure 263. The backstop 265 includes an upper portion 279a with a section 265a having a width greater than a width of a section 265b of a lower portion 279b. The width of section 265a also is greater than a width of both slots 213 and 237 of the frame 210 and card tray 230. The section 265a prevents the card tray 230 from detaching from the frame 210 when in use. The card tray 230 is released using a release mechanism 220 actuated by movement of the card pusher 260 toward the front of the frame and tray, and when the card pusher 260, particularly section 265a, is cleared from the slots 213 and 237. FIGS. 9 to 14 below best illustrate the release of the card tray 230.

Figure 6A:
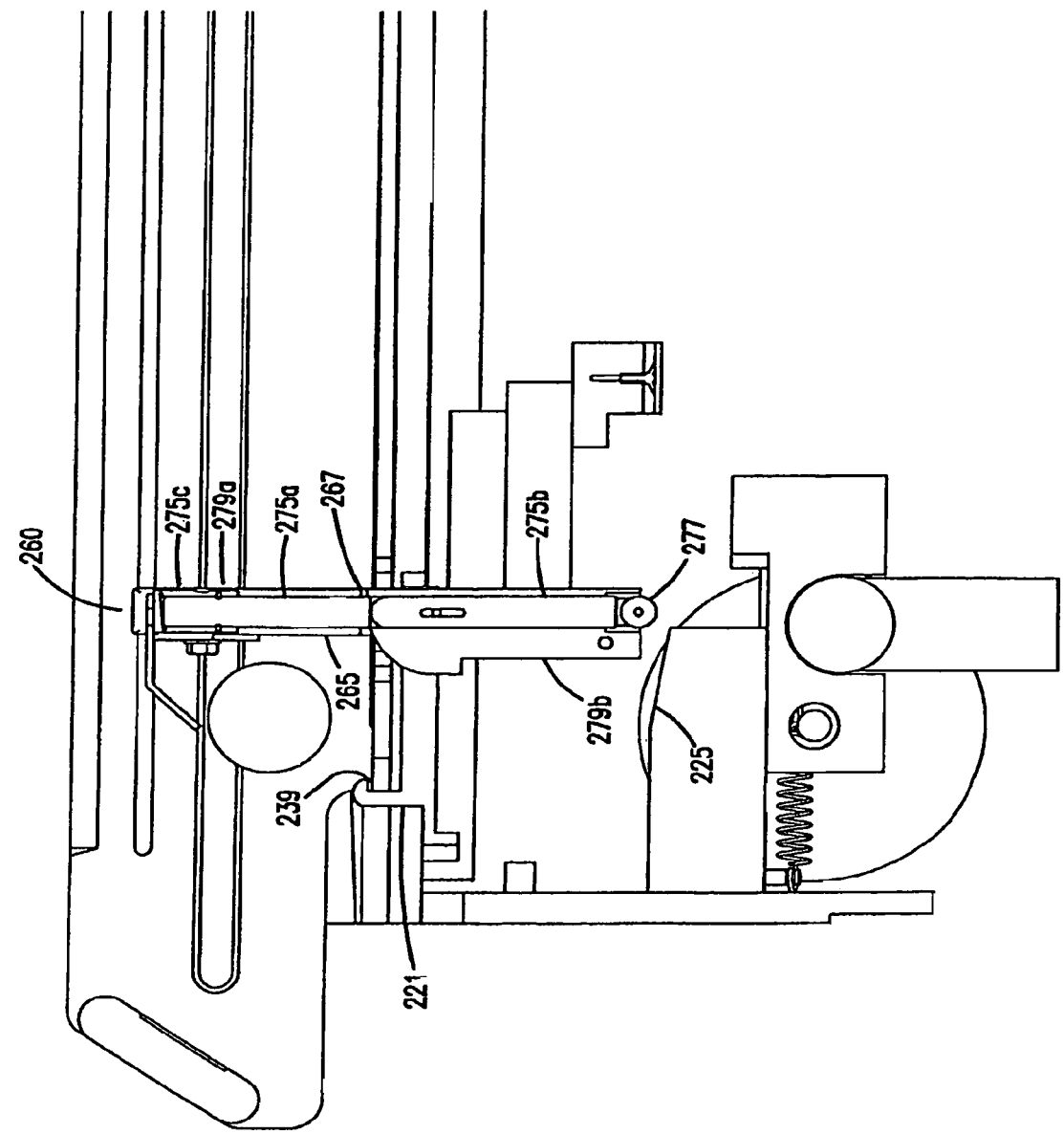
FIG. 6a represents a side view of one embodiment of a card pusher and release mechanism of an input hopper in accordance with the principles of the present invention.

FIG. 6a illustrates one preferred embodiment of the backstop 265 of the card pusher 260. Within the backstop 265, an upper shaft 275a and biasing member 275c reside in the upper portion 279a. A lower shaft 275b resides in the lower portion 279b having a roller 277 operatively connected to the lower shaft 275b. The upper shaft 275a, lower shaft 275b, and roller 277 are biased by the biasing member 275c to normally disable a pivot position of the backstop 265 relative to the frame 261. The biasing member 277 is shown as a spring. However, it will be appreciated that other biasing members may be employed. The roller 277, lower shaft 275b, and upper shaft 265a may be pushed upward towards the upper portion 279a of the backstop 265 to enable a pivot position of the backstop 265 relative to the frame 261. The features and details will be further discussed in FIGS. 9 through 14 below.

Figure 7:
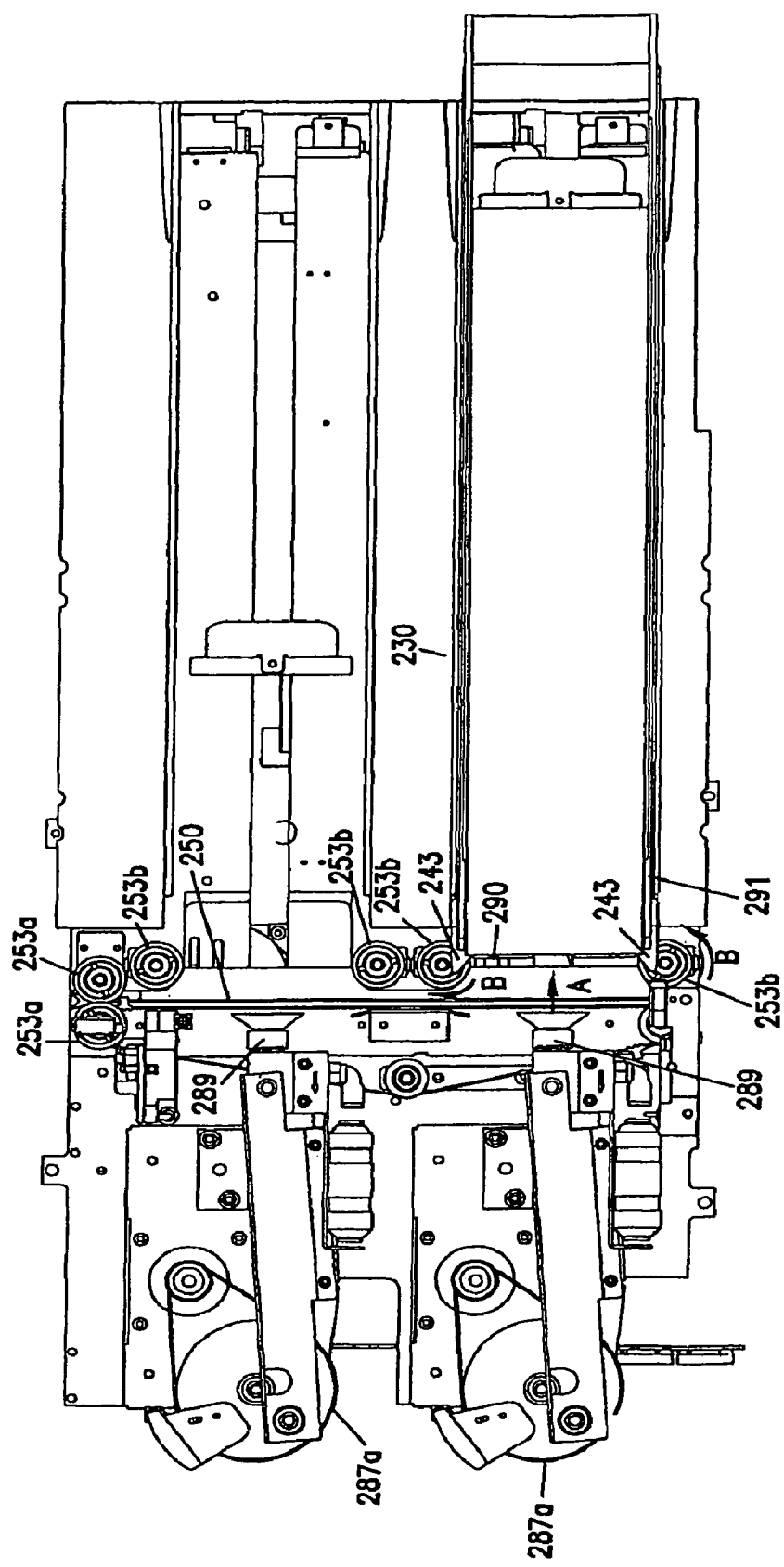
FIG. 7 represents a top view of one embodiment of method for a card being picked for processing in accordance with the principles of the present invention.
Figure 8:
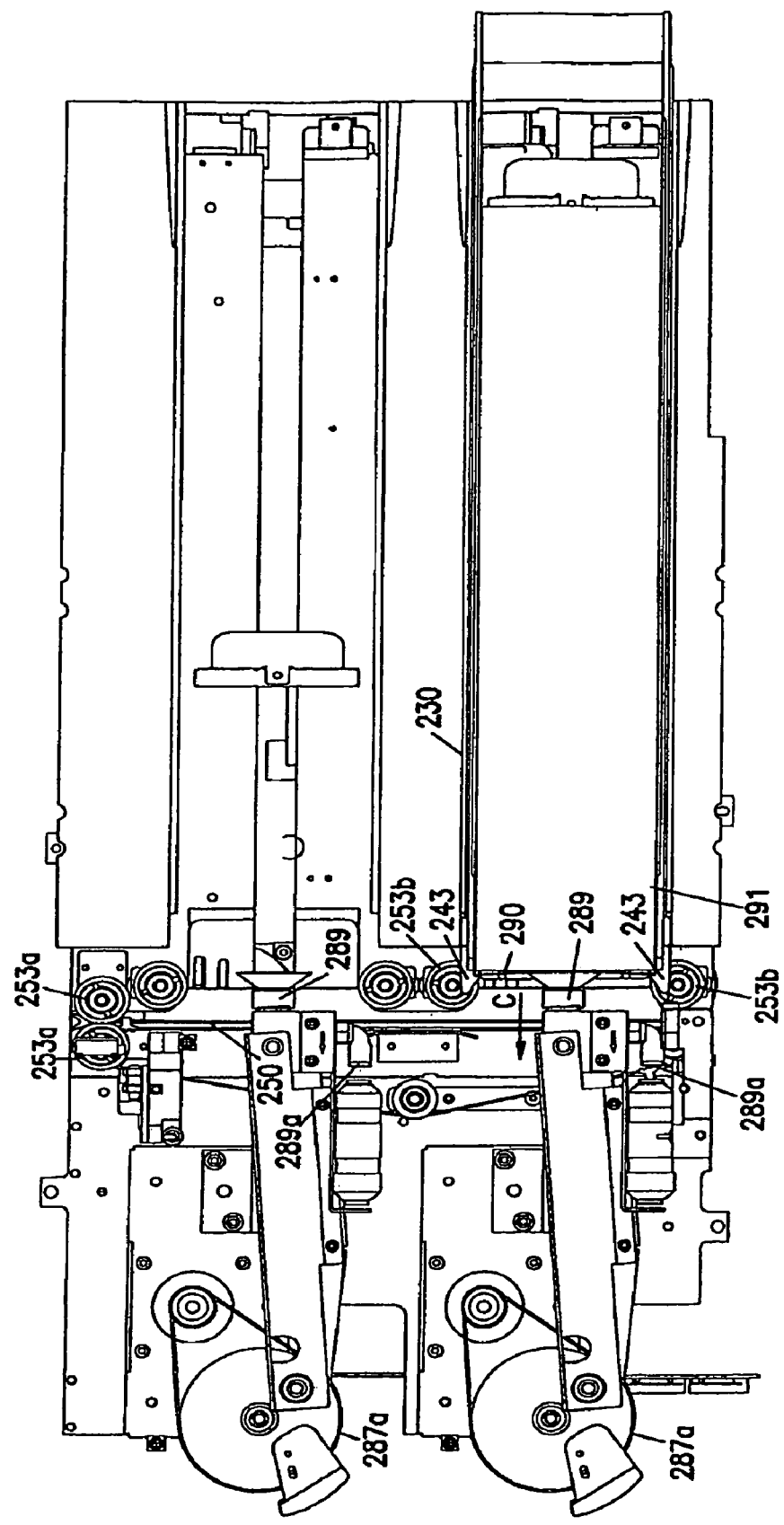
FIG. 8 represents a top view of the method of FIG. 7 of a card being picked for processing.

FIGS. 7 and 8 illustrate one preferred embodiment of picking a card 290 from the card tray 230. FIG. 7 illustrates a suction cup 289 operatively connected to an active vacuum line 289a and driven by a picker drive 287a. The vacuum line 289a is illustrated as portion being an elbow joint, and it will be appreciated that any suitable line may extend from the joint 289a and attach to a conventional vacuum source (not shown). Preferably, the active vacuum line 289a incorporates a valve for opening and closing the active vacuum supply to the suction cup 289. More preferably, the valve is a solenoid valve used to open the active vacuum line to the suction cup 289. The suction cup 289 moves toward the card tray 230, as shown by the arrow A, to pick a card from the card tray 230. Separation rollers 253b contact the card 290 and rotate in a direction outwards from the card 290, shown by arrows B. The rotation of the separator rollers 253b bend the card 290 in an outward direction from the card stack 291, thereby facilitating picking of the card 290 from the card tray 230 using the suction cup 289 having the active vacuum applied. The separation rollers 253b rotate as described to break intimate card surface contact at edges of the card 290 to allow a single card to be pulled from the card stack 291.

FIG. 8 illustrates the suction cup 289 in contact with the card 290, and arrow C represents the direction the card 290 is pulled using the suction cup 289. Further, a vacuum valve line connectable to an active vacuum source is operatively connected to the suction cup 289. As shown in FIG. 8, the separation rollers 253b select and bend the card 290, and the suction cup 289, employing the active vacuum through the vacuum valve line 289a, pulls the card 290 straight back (arrow C) to the card path 250. The card 290 is pulled past the retainers 243 and out of the card tray 230. Preferably, the retainers 243 are clips. Once the card 290 is in the card path 250, a tab belt 255 moves the card, such as the card 290, downstream along the card path 250 to entry rollers 253a. The tab belt 255 includes tabbed portions 255a that contact the card and drive the card along the card path 255. Preferably, a card guide 251 including a slot 251a is used to help facilitate transfer of the card downstream along the card path 250. The entry rollers 253a input a card, such as 290, into a downstream processing module.

FIGS. 9 to 14 represent positions of the card pusher 260 along the slots 213 and 237 in the release of the card tray 230. At the front 215a of the frame 210, a locking member 221 is releasably engaged to the card tray 230 at a lock receiving portion 239. Preferably, the locking member 221 is engaged to the card tray 230 when the card tray 230 is placed on top of the frame 210 and the input hopper 200 is in use. A release mechanism 220 also is disposed at the front 215a of the frame 210, and is connected at the bottom 211b.

Figure 9:
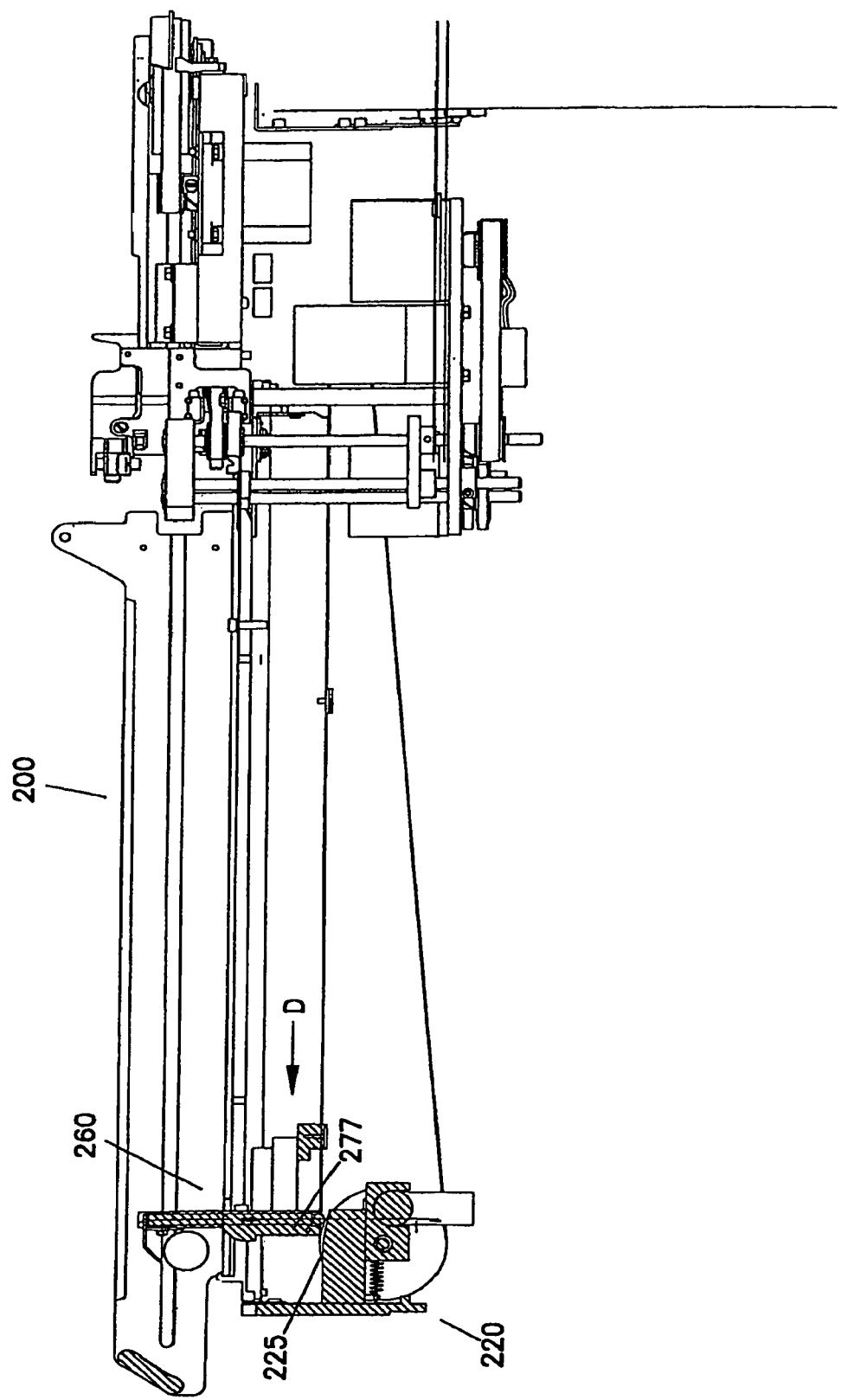
FIG. 9 represents a side view of a method for releasing a card tray in accordance with the principles of the present invention.
Figure 10:
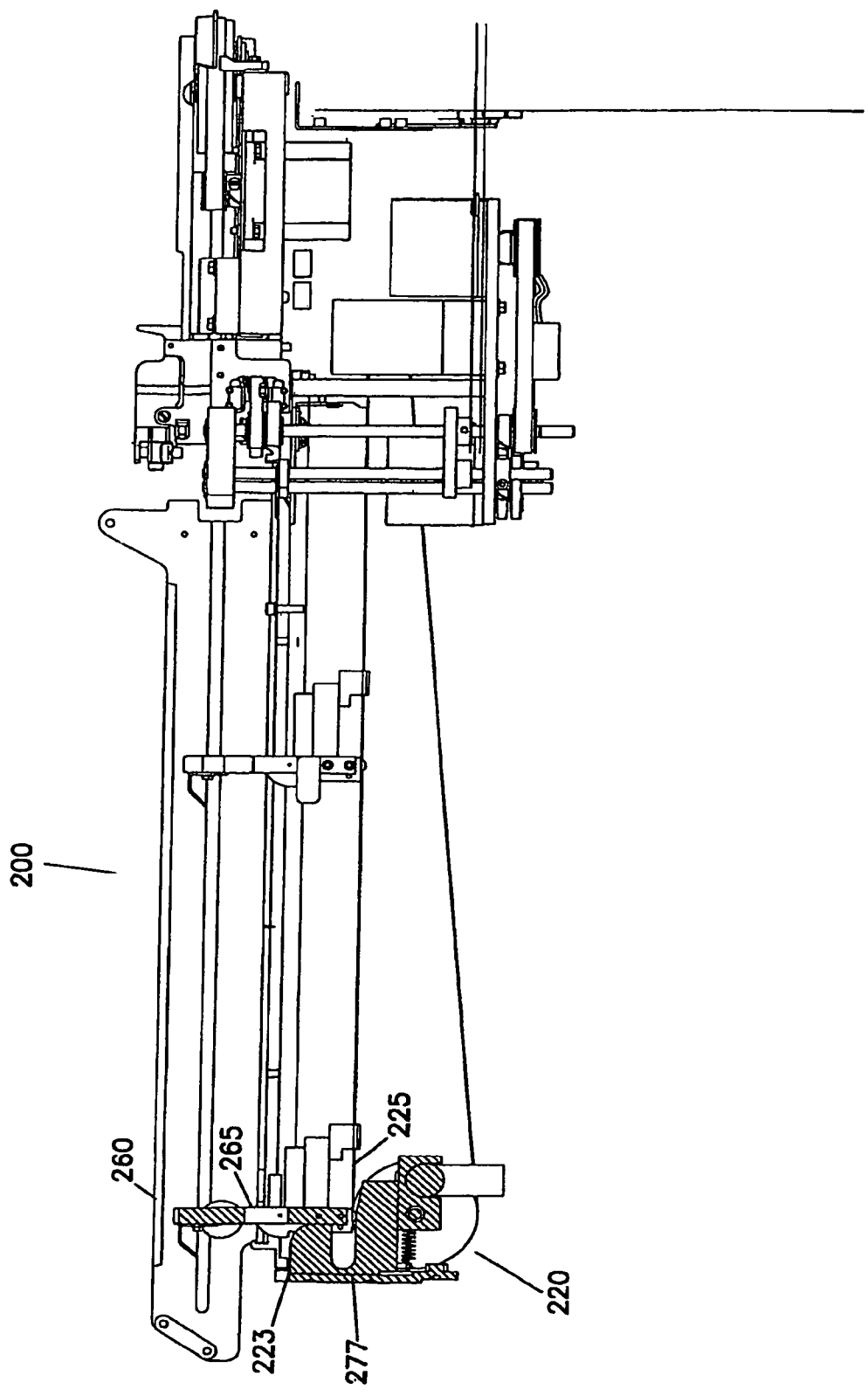
FIG. 10 represents a side view of the method for releasing the card tray of FIG. 9.

As best shown altogether in FIG. 5, the release mechanism 220 includes a ramp 225, curvature member 223, and finger portion 227. FIG. 9 illustrates the card pusher 260 approaching the ramp 225 (arrow D) of the release mechanism 220. FIG. 10 shows the roller 277 of the card pusher 260 in contact with the ramp 220. When the roller 277 moves along the ramp 277 toward the front 215a of the frame 210, the roller may be simultaneously pushed upward into the backstop 265 of the card pusher 260. In addition, the upper shaft 275a and the lower shaft 275b, such as described above in FIG. 6a, also move upward within the backstop 265. The spring 275c is also pushed upward enabling the upper shaft 275a to clear the pivot point 267 actuating the backstop 265 into a pivotable position.

Figure 11:
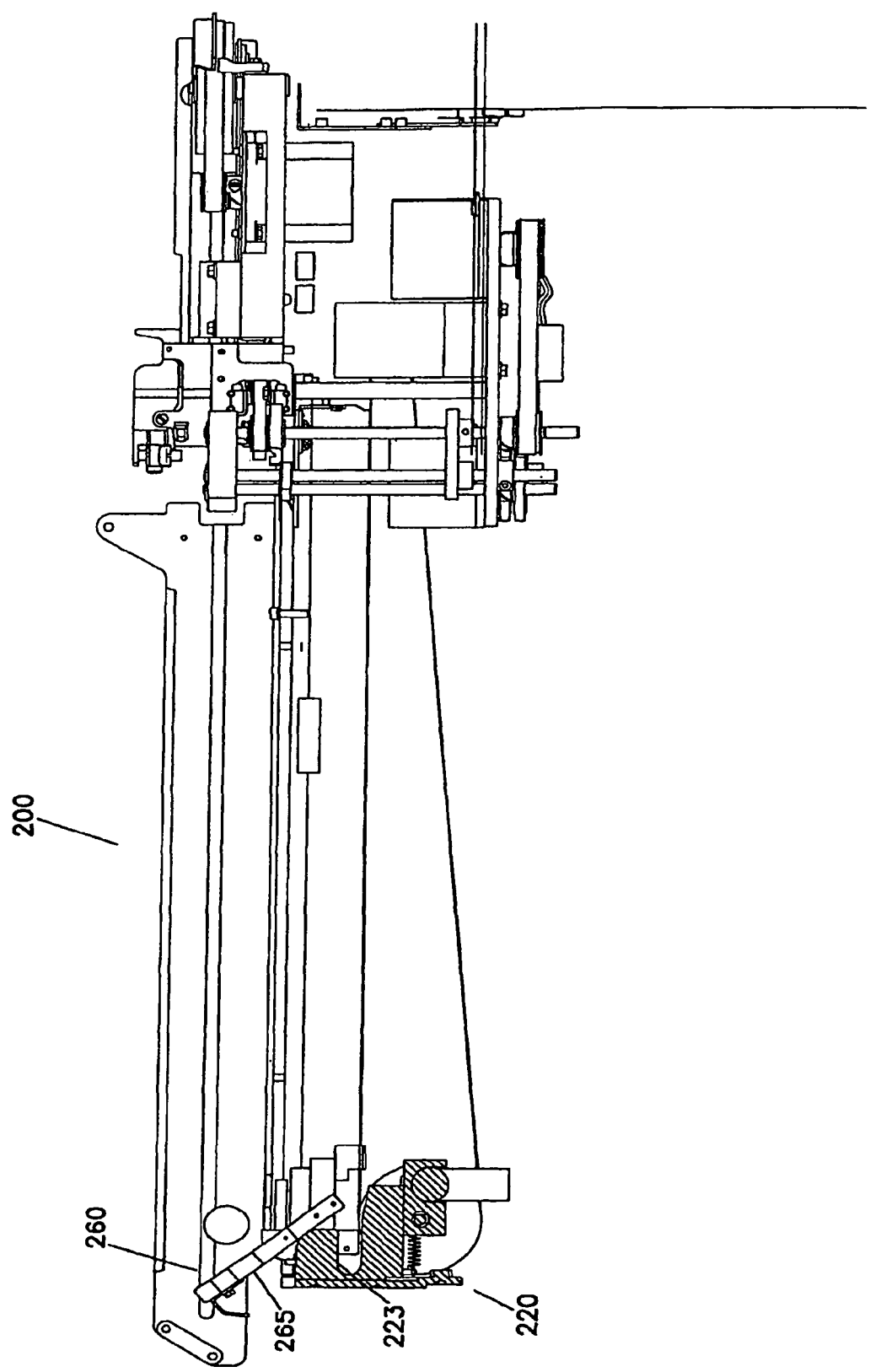
FIG. 11 represents a side view of the method for releasing the card tray of FIG. 9.
Figure 12:
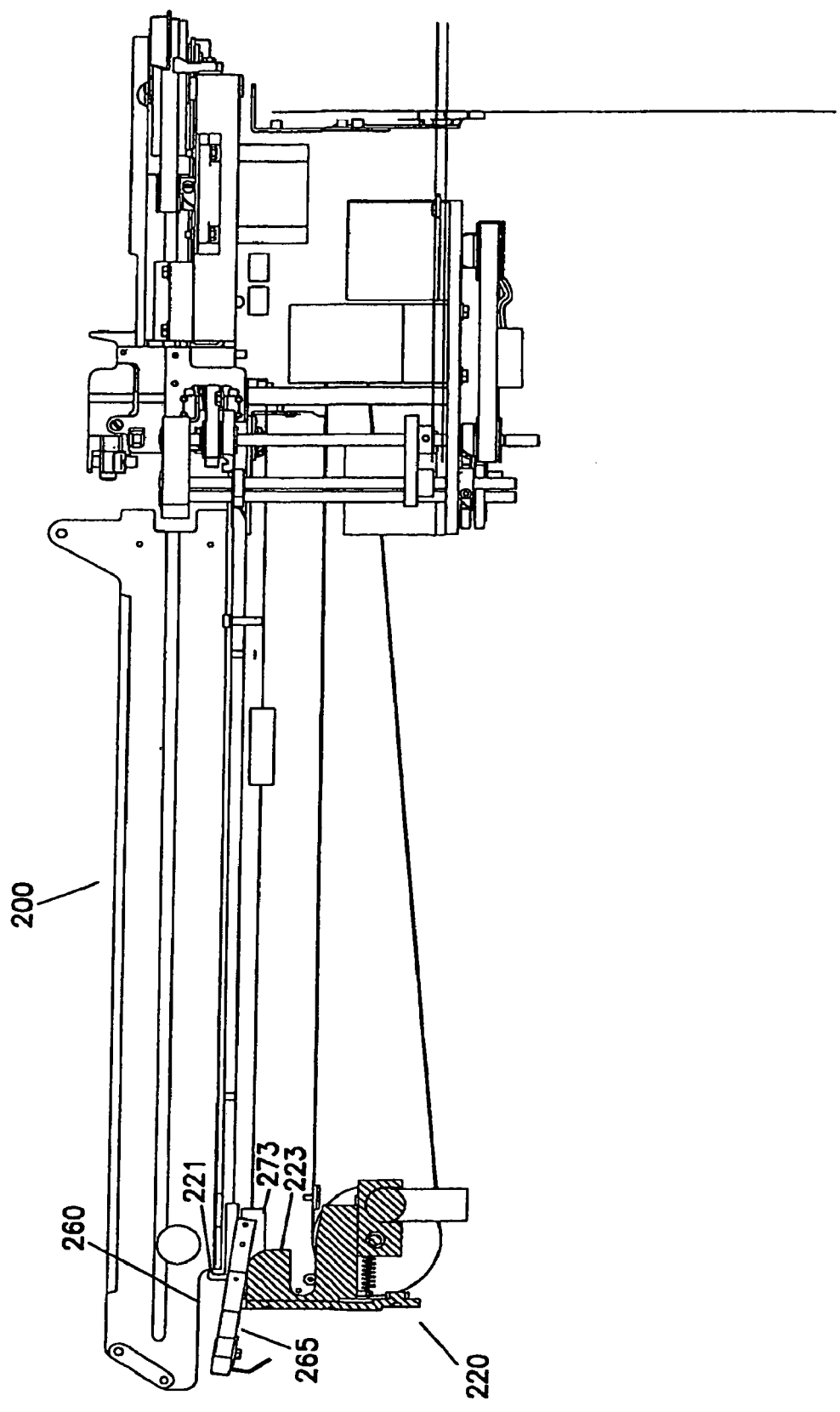
FIG. 12 represents a side view of the method for releasing the card tray of FIG. 9.
Figure 13:
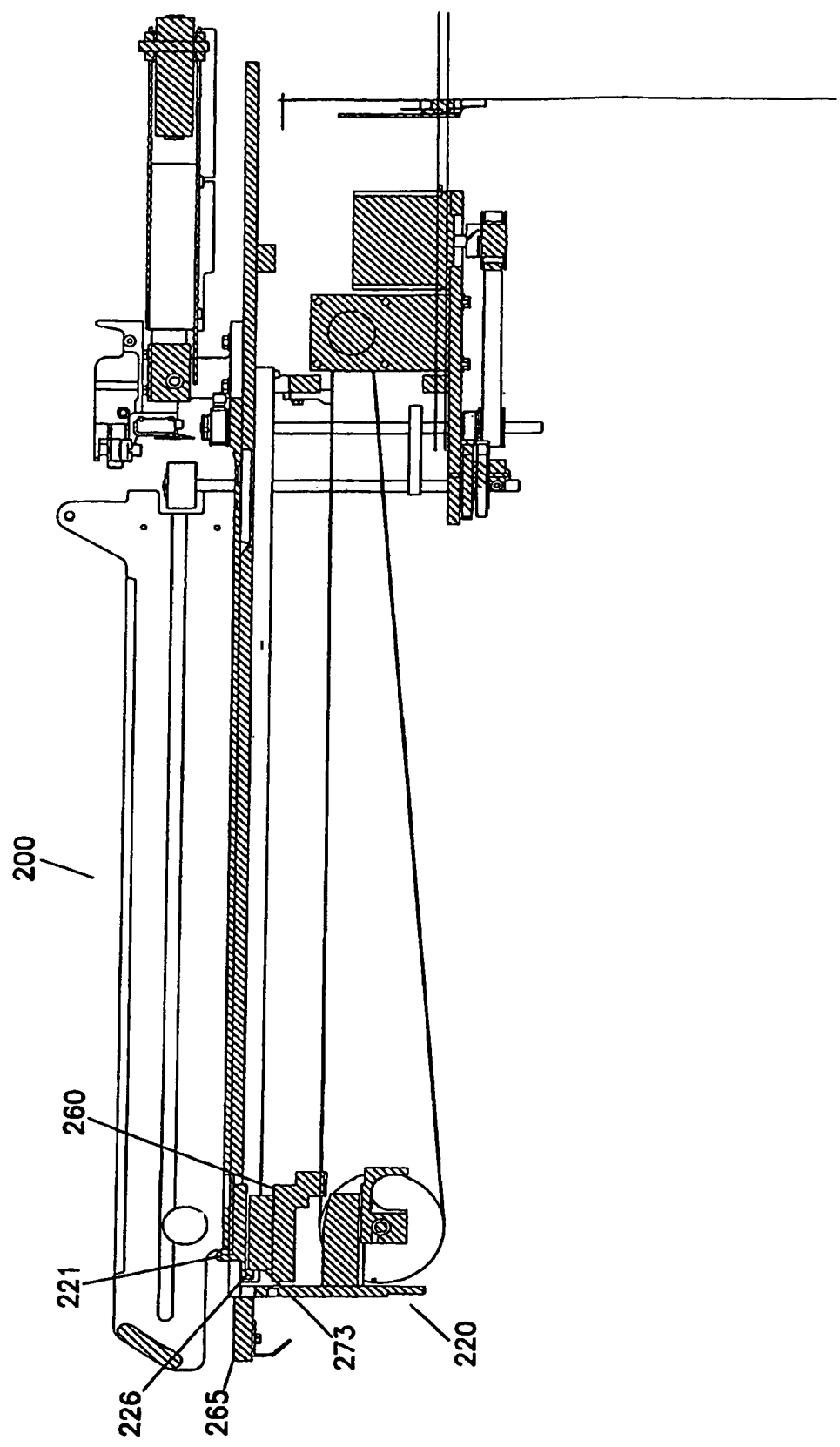
FIG. 13 represents a side view of the method for releasing the card tray of FIG. 9.
Figure 14:
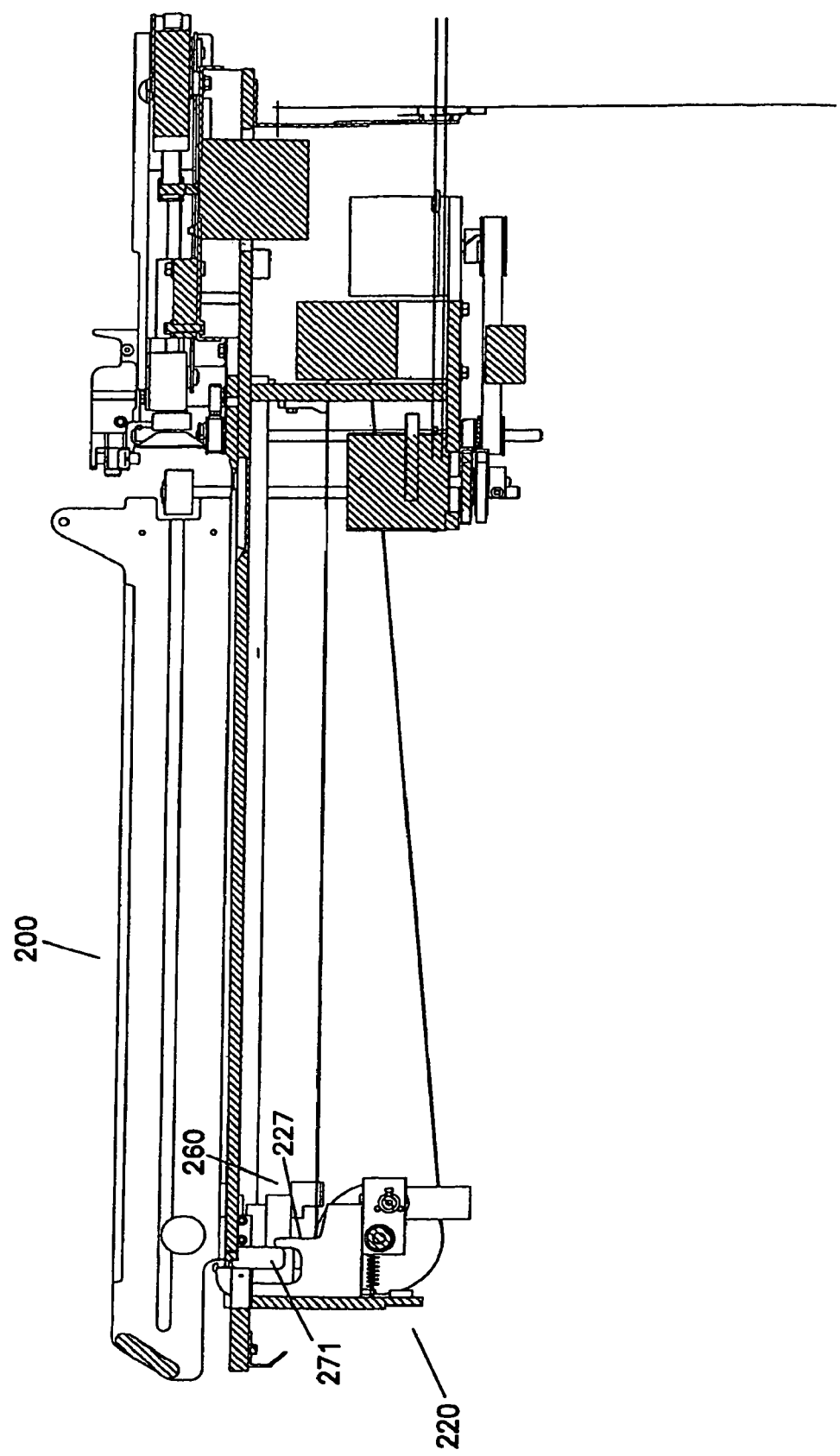
FIG. 14 represents a side view of the method for releasing the card tray of FIG. 9 with the card tray in a released position.

As the card pusher 260 moves along the ramp and contacts the curvature member 223, shown in FIGS. 10, 11, and 12, the backstop 265 is simultaneously enabled into the pivotable position as described above. The backstop 265 walks around the curvature member 223 pivoting the backstop 265 of the card pusher from its normally upright position, when in use, toward a prostrate position. When the backstop 265 is in the prostrate position, the card pusher 260 moves through a space 237a of the card tray 230 to clear the slots 213 and 237. Simultaneously, a bearing block 273, as shown in FIGS. 12 and 13, contacts a hanging portion 221a of the locking member 221. As the card pusher 260 moves toward the front 215a of the frame 210, the bearing block 273 pushes the locking member 221, through contact with the hanging portion 221a, away from the lock receiving portion 239 of the card tray 230. FIGS. 12 to 14 illustrate the card pusher 260 cleared from the slots 213, 237 and the locking member in a release position.

The finger portion 227 of the release mechanism 220, and a curvature member 271 of the backstop 265 restore the card pusher 260 back to its upright position for use. As the card pusher 260 moves toward the back 215b of the frame 210, the curvature member 271 of the backstop 265 contacts the finger portion 227 (FIGS. 1 and 14), and can walk around the finger portion 227 to pivot the backstop 265 back to the upright position.

The input hopper 200 employs the following motors and drive mechanisms in operating its respective functions. A tab belt motor 283 drives the tab belt 255 to move the card. A separator motor 285 and separator roller drive 285a operate the separation motors 253b to pick a card. In addition, the picker motor 287 and drive 287a move the suction cup 289 back and forth from the card supply 291 of the card tray 230. The card pusher 260 includes a motor 281 and drive 281a to move the pusher along the slots 213 and 237 of the frame 210 and card tray 230 of the input hopper 200.

Figure 15:
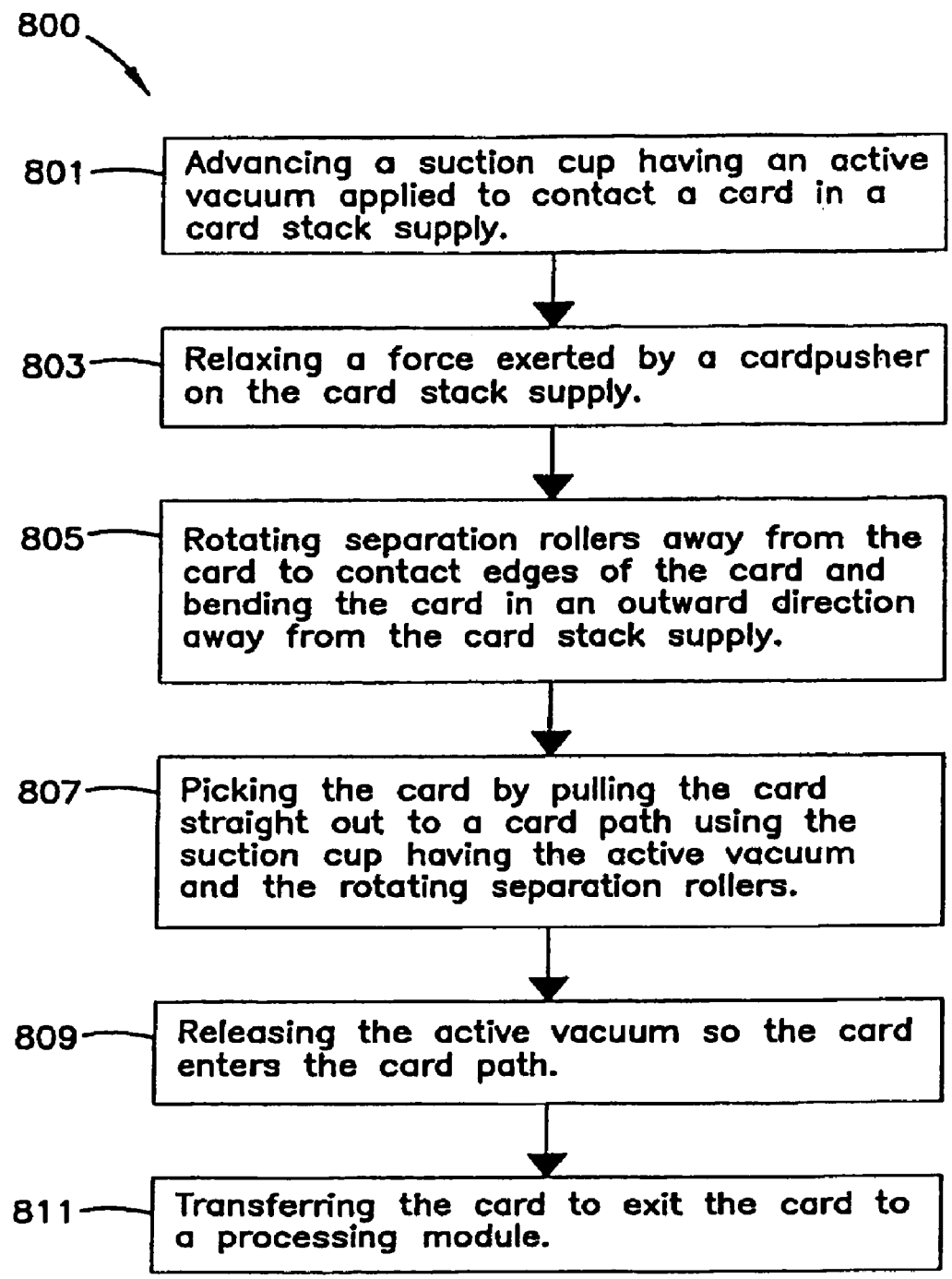
FIG. 15 represents a flow diagram of one embodiment of a method for picking a card from an input hopper in accordance with the principles of the present invention.

FIG. 15 illustrates a flow diagram of a preferred embodiment for a method 800 of picking a card (also shown in FIGS. 7 and 8) to be transported downstream to a processing module. A suction cup is advanced 801 to a card stack supply. An active vacuum is supplied to the suction cup to suitably grab the card. A force exerted on the card stack supply by a card pusher is relaxed 803, so as to enable separation rollers to position the card to be picked. The separation rollers rotate away from the card 805 to contact edges of the card and bend the card outwardly away from the card stack supply. The card is picked by using the suction cup, having the applied active vacuum, and the rotation of the separation rollers. The card is picked by pulling the card out of the card stack supply in a substantially straight direction (FIG. 8). The card is pulled toward the card path. Preferably, one card at a time from a card tray is picked to enter the card path. The active vacuum is released 809 so that the card may enter the card path for transfer downstream 811. As illustrated in the previous figures, a tab belt such as 255 may be employed to transfer the card downstream on the card path such as the card path 250.

After the card is released from the card stack supply, the card pusher may restore a suitable force against the remaining card supply, and reseat the card stack supply against the separation rollers. A higher number of cards available in the card supply require a lower amount of force to reseat the card stack against the separation rollers. As the card stack supply decreases, the amount of force needed by the card pusher to reseat the card stack supply increases. Preferably, the card pusher is actively driven, for instance by a motor, in applying the force against the card stack and reseating the supply of cards. After the card stack is reseated, the separation rollers may turn inwards toward the next card to realign the card stack for the next pick. Preferably, a controller, such as described above, is used to provide the necessary data information in controlling the input hopper settings.

The individual motor and solenoid control of the input module, for instance, the picker motor, vacuum activation via valves, separator motor and pusher motor contribute to the reliability of the present invention. The input module picks many different card types which include combinations of different thickness and material, GSM punch-outs, and embossed cards. The individual motor control and system methods of transferring card types to be picked reliably through software changes on a card by card basis, where previous input devices have required mechanical adjustments.

The input hopper of the present invention provides an improved input module with increased reliability and efficiency. In addition to other advantages, the input hopper of the present invention enables a card to be efficiently picked from the card stack supply for transfer downstream to a processing module. The separation roller configuration and active applied active vacuum present a reliable structure for picking a card. Further, the actively driven card pusher provides an improved design for resetting the card supply for the next card pick that also is more reliable. The release mechanism and lock features incorporated for the card tray provide convenience and added security when the input hopper is in use with the card personalization system.

Magnetic Stripe Module

The magnetic stripe module 100 is illustrated in detail in FIGS. 16-20. In the preferred arrangement, as shown in FIG. 1, the magnetic stripe module 100 is positioned immediately downstream from the input hopper 200. However, the module 100 could be positioned anywhere in the system, and not just immediately after the input hopper 200. In the preferred arrangement, the magnetic stripe module 100 receives cards from the input hopper 200, and programs data onto the magnetic stripe of each card if instructed to do so by the controller 22. The module 100 is also designed to read the magnetic stripe after programming to determine whether adequate programming has occurred. If a card does not have a magnetic stripe or magnetic stripe programming on a card is not required, the card can simply be passed through the module 100 to the next module. Preferably, the module 100 is capable of programming of up to 3000 cards per hour.

FIGS. 16-20 illustrate details of the interior of the module 100. Each card enters the module via an inlet drive assembly comprising a pair of drive rollers 102a, 102b. Each drive roller 102a, 102b is rotatably driven by a motor 104, such as a stepper motor, via gears 106a, 106b which are connected by drive shafts to the rollers 102a, 102b. One of the drive rollers 102a, 102b, such as the drive roller 102a, is spring biased toward the other drive roller to maintain good driving contact with the card and to accommodate embossing that may be present on the card.

Figure 16:
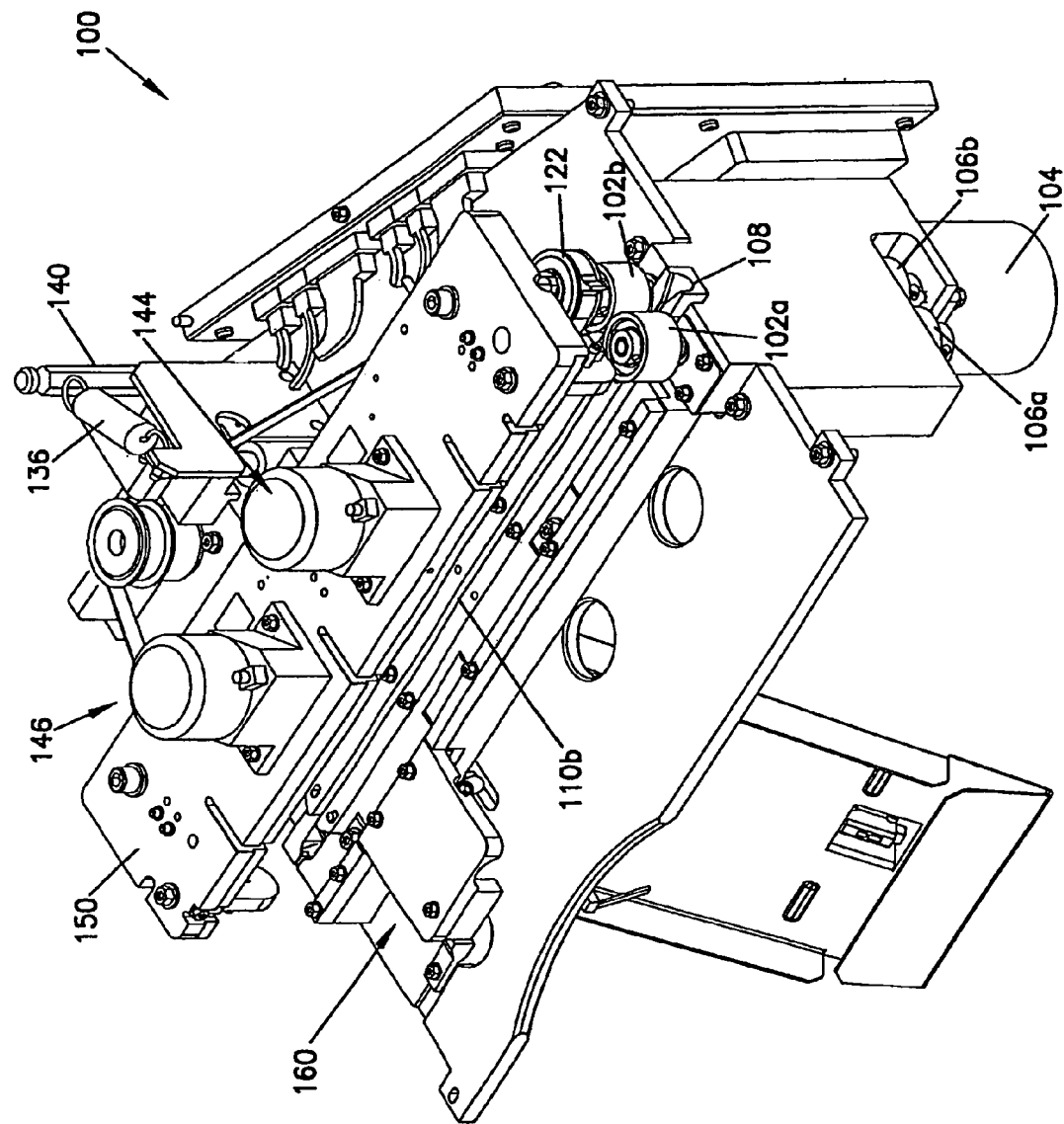
FIG. 16 a front perspective view of one embodiment of a magnetic stripe module in accordance with the principles of the present invention.
Figure 20:
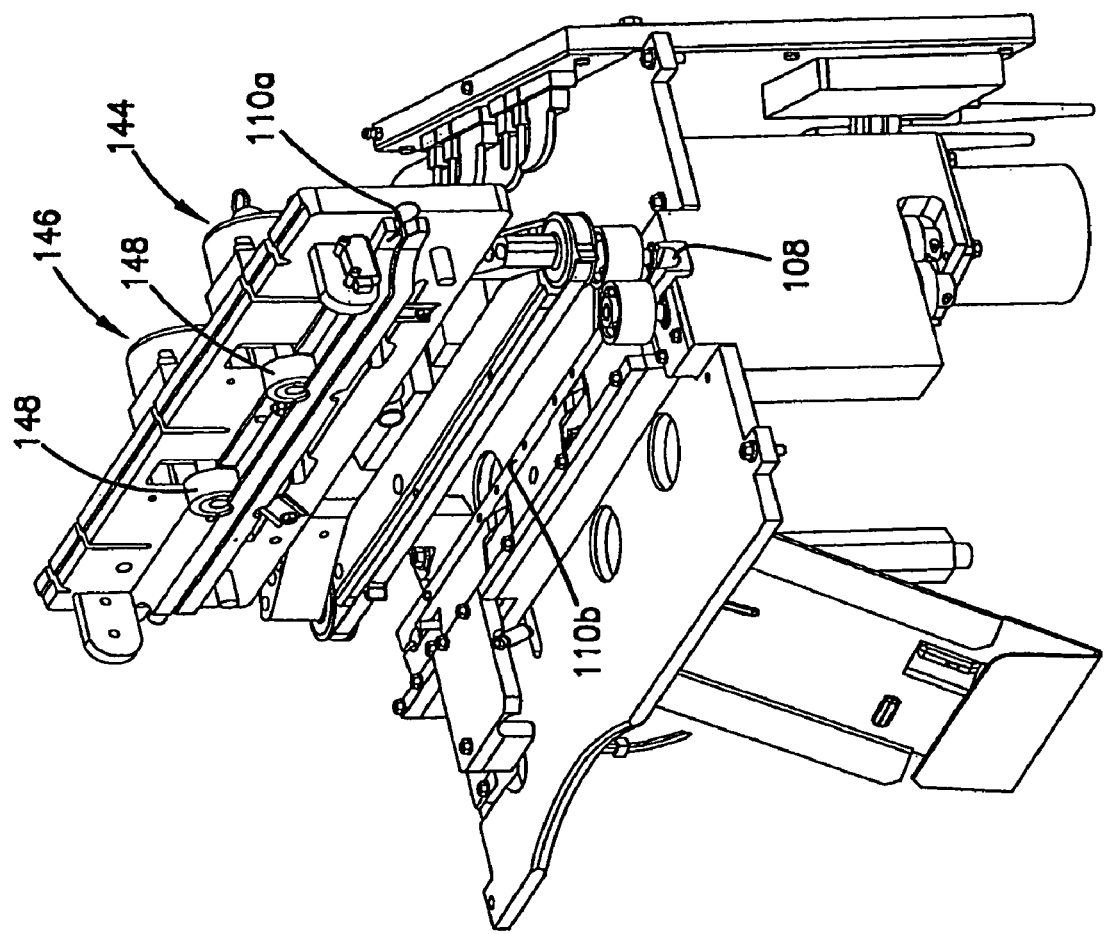
FIG. 20 illustrates the upper plate with the write and read head units of the magnetic stripe module disposed in a service position.

A lower input guide 108, best seen in FIGS. 16 and 20, helps guide cards into the module 100 as they enter. Upper and lower guide tracks 110a, 110b extend from the inlet of the module 100 to the outlet for guiding cards through the module 100 along a defined card path. The guide tracks 110a, 110b receive upper and lower edge regions of each card to maintain a consistent travel path through the module 100, with the plane of the cards being oriented generally vertically.

After passing through the rollers 102a, 102b, the card is next engaged by a drive assembly 112 which drives the card through the remainder of the module 100. The drive assembly 112, portions of which are visible in FIGS. 16, 17 and 20 but is best seen in FIG. 18, preferably comprises a tab belt drive mechanism that includes a drive belt 114 and a plurality of tabs 116 fixed to the belt.

Previous drive mechanisms have utilized a carriage or drive rollers for moving a card. A carriage mechanism is relatively complex and requires a large number of parts, requires a relatively complex connection between the drive motor and the carriage, has sliding parts that are subject to wear, and has a relatively high inertia that reduces the transport speed. Further, a carriage must be returned to the entrance after moving a card to the exit in order to pick up the next card. Drive rollers, on the other hand, cannot be used on areas of the card that contain embossing. Further, a drive roller mechanism has a relatively large number of components particularly in connecting the drive motor to the rollers, introduces torsional compliance, creates problems when transferring the card from one set of drive rollers to another set, requires certain frictional characteristics to engage the card properly, the drive rollers are subject to contamination and must be regularly cleaned, and the drive roller shafts limit placement of the write and read heads.

The use of a tab belt drive mechanism eliminates many of the deficiencies that result from using carriage or drive roller mechanisms. The tab belt is simple with fewer parts, provides a more direct connection between the drive motor and the belt, has no sliding parts that are subject to wear, has a relatively low inertia thereby increasing speed, can be used with embossed cards, there is less compliance than drive rollers, there are no "hand-off" problems such as found when using drive rollers, does not depend upon friction between the belt and the card, and limitations on the placement of the write and read heads are reduced.

Moreover, it has been discovered that better programming is achieved using a tab belt compared to using drive rollers. This is due to the fact that drive rollers have greater torsional compliance than a tab belt and contain additional components that lead to greater card speed variations and lower quality programming.

In the preferred embodiment, three tabs 116, only two of which are visible in FIG. 18, are provided on the belt 114, with the tabs being equally spaced on the belt 114. The use of multiple tabs increases the speed of the drive assembly 112, thereby increasing the speed of the module 100, by reducing the card pick-up time of is the tabs, as will become apparent from the following description. Further, multiple tabs improves the reliability since the belt will still operate with two or even one tab. However, it is possible to utilize a lesser number of tabs, such as a single tab, if the reduced speed provided thereby is sufficient.

Figure 17:
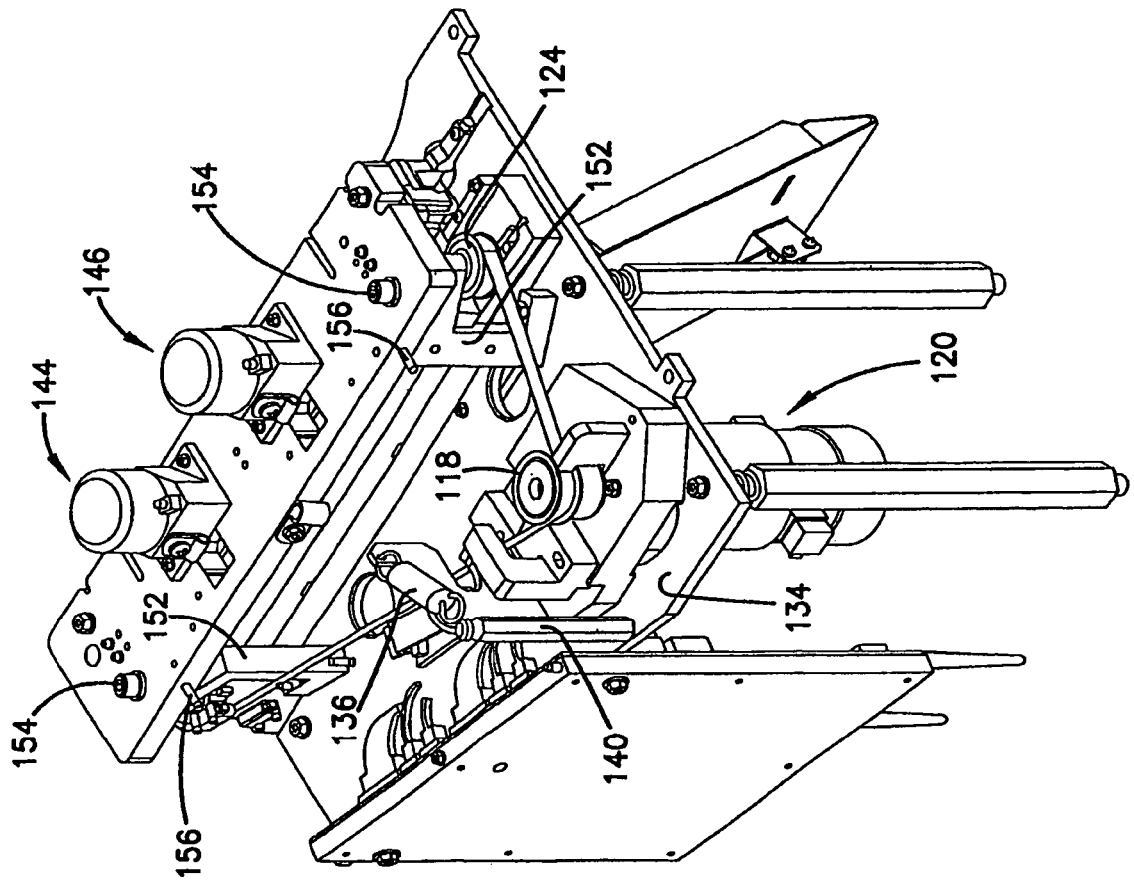
FIG. 17 is a rear perspective view of the magnetic stripe module.
Figure 18:
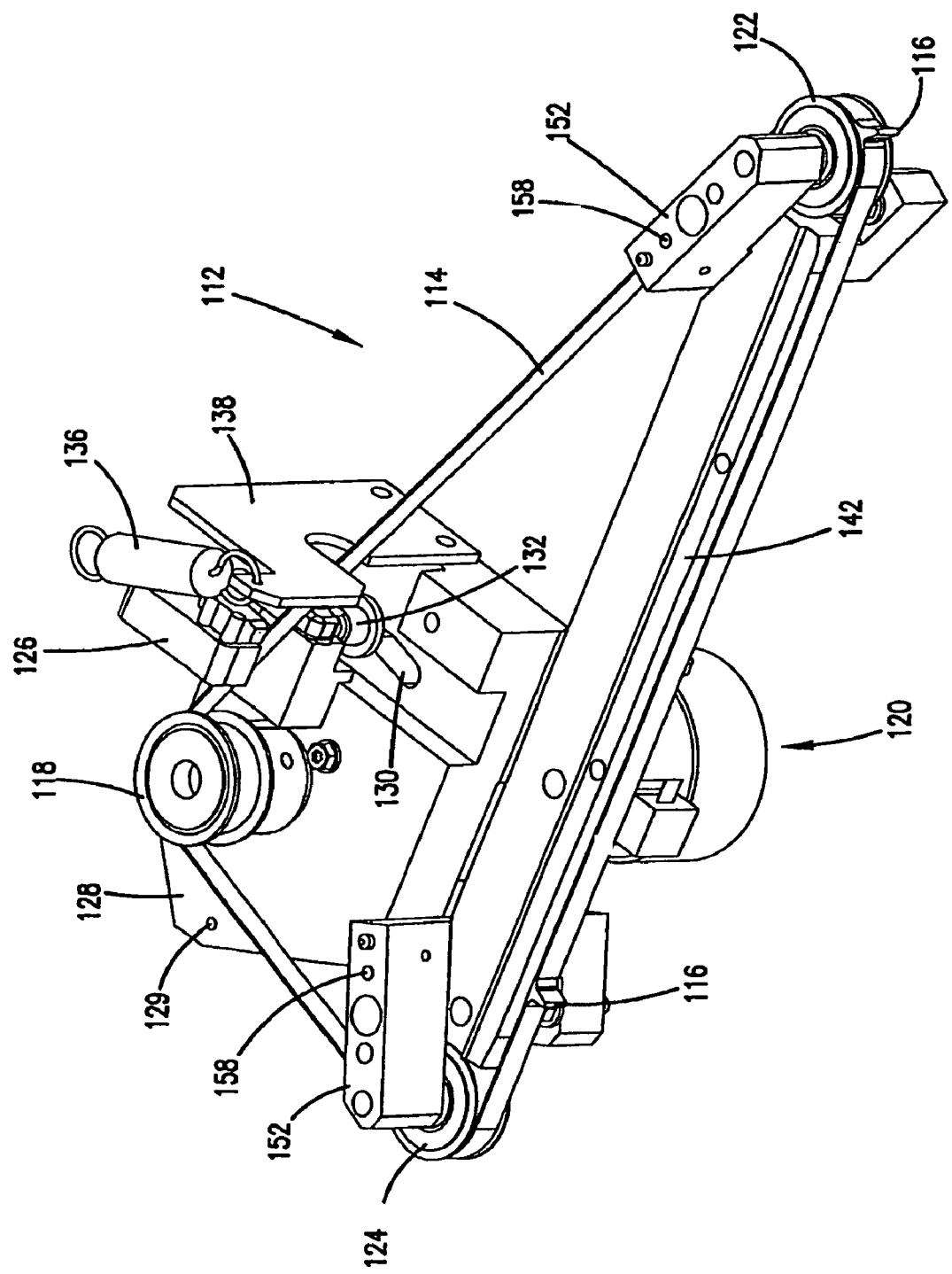
FIG. 18 is a perspective view of the drive assembly used in the magnetic stripe module.

As shown in FIGS. 17 and 18, the belt 114 is engaged with a drive pulley 118 which drives the belt 114. The drive pulley 118 is rotatably driven by a motor 120, preferably a DC servo motor. In addition, the belt 114 passes around idler pulleys 122, 124 positioned adjacent the inlet and outlet of the module 100 (see FIGS. 16-18). The idler pulley 122 is positioned above the drive roller 102b, as shown in FIGS. 16 and 20, such that, upon rotation of the belt 114, the tab 116 can engage the rear edge of the card after the card is driven into the module by the drive rollers 102a, 102b. Further rotation of the belt 114 drives the card through the module 100 to the module exit for pick-up by the next module.

The belt 114 is subject to wear and must be replaced as needed. In addition, the tabs 116 can break off from the belt 114 and/or become damaged, thereby necessitating belt replacement. Therefore, the belt 114 is mounted so as to be readily replaceable as required. As seen from FIG. 18, when belt replacement is necessary, the belt can be lifted upward out of engagement with the pulleys and replaced with a new belt. To determine whether a tab 116 has broken off, during operation the belt 114 passes through a tab sensor 126 which senses the tabs 116, or absence thereof, and passes a signal to the controller 22 when a tab is missing, so that the system operator can be notified that the belt should be replaced.

To prevent the sensor 126 from interfering with belt removal, the sensor 126 and the mounting block 128 upon which the sensor 126 is mounted, are mounted so as to movable between an operative position, shown in FIG. 18, and a removal position (not shown). The block 128 includes a slot 130 formed therein, and a cap screw 132 extends through the slot 130 and into threaded engagement with a suitable threaded hole (not shown) provided in a support plate 134 of the module (FIG. 17). The block 128 is pivotable about a pivot shaft 129, with pivoting of the block 128 and the sensor 126 mounted thereon limited by the ends of the slot 130. A bias spring 136 is connected at one end to a plate 138 that is fixed to the block 128 and connected at its opposite end to a post 140 that is fixed to the plate 134. During use, the block 128 is pivoted to the position shown in FIG. 18 by the bias spring 136 and the cap screw 132 tightened to maintain proper belt tension. When belt removal is necessary, the cap screw 132 is loosened allowing the block 128 to pivot. The block 128 is then positioned away from the post 140 to allow the belt 114 to be removed without interference from the sensor 126 or the plate 138.

As further shown in FIG. 18, a back-up bar 142 is positioned behind a portion of the belt 114. The tabs 116 on the belt 114 means that these areas of the belt will be stiffer depending upon the size of the tab used. These stiffer portions will produce a drive speed variation as they curve around any of the pulleys. The bigger the tab is and/or the smaller the pulleys are, the greater the speed variation will be. It is best, therefore, to use big pulleys and small tabs. However, as the tab becomes small, it will be weaker and may not be stiff enough to provide solid drive to the rear edge of the card particularly in cases where card movement may be obstructed. As a result, the small tab may bend and go behind the card, resulting in a card jam. Therefore, the backsides of the tabs are constructed to make the tabs stiffer when driving the card forward through the module 100. Preferably, the backsides of the tabs are provided with a fillet to increase the stiffness thereof. The frontsides of the tabs 116 are generally planar and project from the belt 114 generally at right angles thereto to provide optimum forward driving engagement with the rear edge of the card.

However, as will be described further below, it is often necessary to reverse the belt to drive the card in reverse within the module 100. During card reversal, the filleted backside of the tab will contact the leading edge of the card. It is possible that the fillet on the backside of the tab 116 may cause the tab to slip behind the card. The back-up bar 142 prevents this by limiting the rearward movement of the tab 116 and belt 114 during reversal, and maintaining contact between the backside of the tab and the leading edge of the card.

The module 100 further includes separate write and read units 144, 146. The write unit 144 is disposed upstream of the read unit 146, with the write unit 144 programming predetermined data on the magnetic stripe on the card, and the read unit 146 thereafter reading the data on the magnetic stripe to determine the adequacy of the programming operation. The data to be programmed onto the magnetic stripe of the card by the write unit 144 is provided to the module 100 by the controller 22, the data being specific to the intended use of the card. The read unit 146 reads the data on the magnetic stripe to determine any deficiencies in writing operation of the write unit 144.

Many conventional systems utilize a single write/read unit for both writing and reading. In these systems, the card is initially driven through the unit in a write pass. Thereafter, the card must be reversed and driven back through the unit for a read pass. The requirement for forward and backward movement increases the programming operation time, thereby detracting from the overall throughput rate of such a system. In addition, the forward and backward movements increase wear on the module and on the cards themselves. Further, the single head utilized cannot be optimized for both writing and reading functions so optimal writing and reading may not be achieved.

The separate write 144 and read 146 units eliminates the requirement to reverse the card travel direction for a read operation, which results in an increase in the throughput rate of the module 100 and a decrease in wear. Moreover, the write head and read head used in the units 144, 146 can be selected to optimize the writing and reading operations. As shown in FIG. 20, the write and read units 144, 146 each include a pressing device 148, such as a roller, positioned opposite the write and read heads (not shown) for supporting the side of the card opposite the magnetic stripe. The magnetic stripe of the card faces the write and read heads and passes between the head and the pressing device 148. The construction and operation of write and read units is well known to those of ordinary skill in the art, and further description thereof is not provided. An apparatus that utilizes separate write and read units is disclosed in U.S. Pat. No. 4,937,438.

The write and read units 144, 146 and the upper guide track 110*a* are supported on a plate 150. During use, the plate 150 is supported in a horizontal position as shown in FIGS. 16 and 17 and is fixed to a pair of supports 152 by cap screws 154. Extending from the back end of the plate 150 is a pair of pins 156. The pins 156 allow the plate 150 to be disposed in a service position, which is shown in FIG. 20, to facilitate access to the write and read heads of the units 144, 146. The supports 152 include holes 158, shown in FIG. 18, that are positioned to receive the pins 156. By loosening the screws 154, the plate 150 can be rotated vertically to the position shown in FIG. 20, with the pins 156 aligned with and received within the holes 158, to thereby maintain the plate 150 in the service position.

Once the write unit 144 is finished programming, the card is transported by the belt 114 and tab 116 to the read unit 146. If the read unit 146 determines that the programming of the magnetic stripe is satisfactory, the card is driven by the belt 114 toward the exit where the card waits for the next module to complete its personalization operation(s). If the next module is ready to receive the programmed card, the belt 114 completes driving the card from the module 100. The drive belt 114 is arranged such that the tab 116 drives the leading edge of the card into engagement with input rollers in the next module. This eliminates the need for exit rollers in the module 100.

If the read unit 146 determines that an error has occurred in the magnetic stripe programming, the belt 114 can be reversed to drive the card back through the write unit 144 so that the magnetic stripe on the card can again be passed through the red unit 146 or through the write unit 144. If the magnetic stripe is reprogrammed, the card can once again be driven through the read unit 146 to determine the adequacy of the programming operation.

An eject mechanism 160 is also provided to allow the operator an easy way to remove a jammed card from the card track when the module 100 is not able to move the card out to the next module. This could occur because of a fault in the module 100 or a fault in the downstream module. U.S. Pat. No. 4,518,853 discloses a card eject mechanism in a magnetic stripe encoding apparatus where the eject mechanism is under electronic control to act as a collection place for defectively programmed cards.

Figure 19:
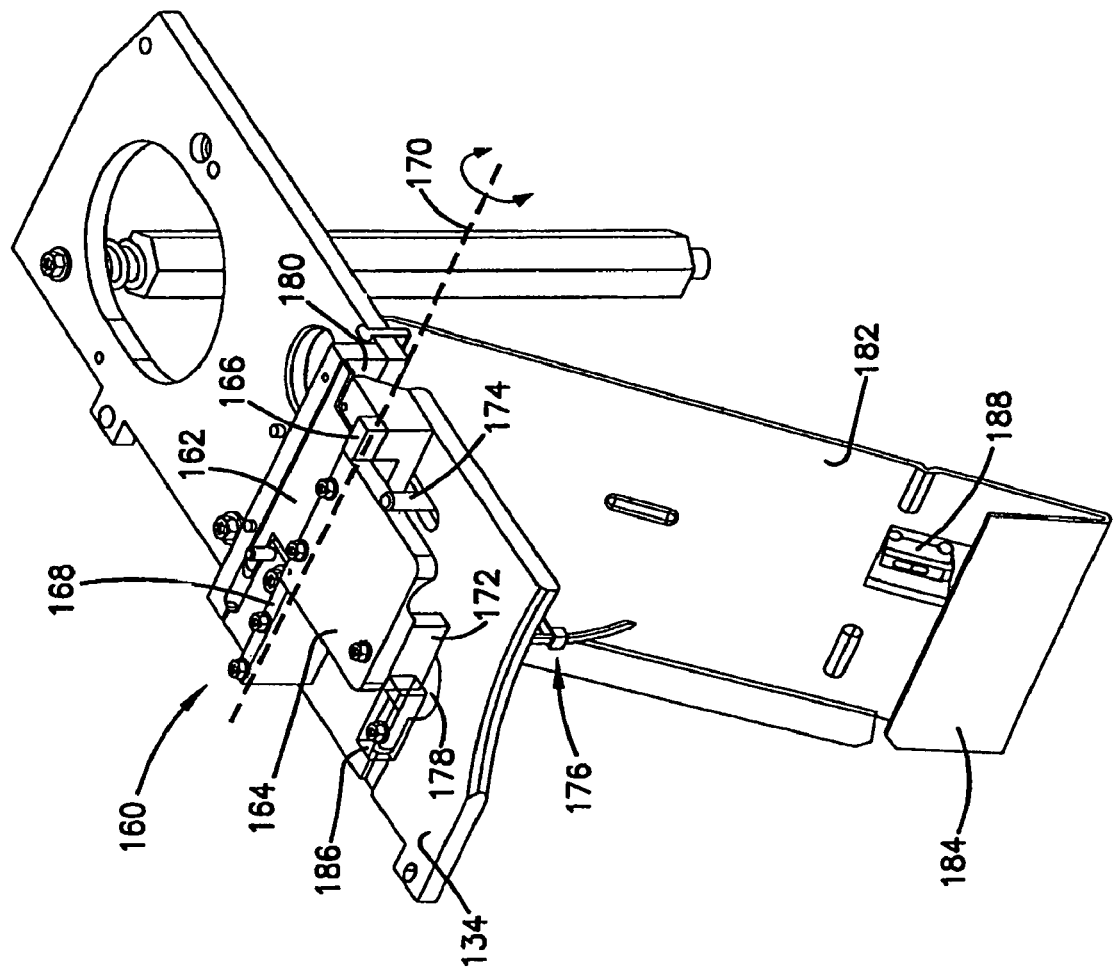
FIG. 19 is a perspective view of a portion of the magnetic stripe module illustrating details of the card eject mechanism.

The eject mechanism of the present invention is best seen in FIG. 19. In the preferred embodiment, the eject mechanism 160 is designed to be manually actuated by the system operator, based upon a signal provided by the read unit 146 and the controller 22.

With reference to FIG. 19, the eject mechanism 160 comprises a pivoting door 162 that interrupts the lower guide track 110*a* and supports the bottom edge of the card downstream from the read unit 146. The door 162 is connected to the end of a pivot block 164 that is pivotally supported by supports 166, 168 for pivoting movement about pivot axis 170. A spacer 172 is connected to the bottom of the pivot block 164 and engages with the plate 134 to act as a stop to define the standard, or non-eject, position of the door 162 and block 164 shown in FIG. 19. A spring 174 is connected to the pivot block 164 for biasing the block 164 to the non-eject position.

An actuating mechanism 176, best seen in FIG. 19, is disposed below the plate 134 and is arranged to contact the eject mechanism 160 for pivoting the door 162 to an eject position. The actuating mechanism 176 projects upwardly through a hole 178 provided in the plate 134 and contacts the pivot block 164 to cause pivoting of the block 164 and the door 162 about the axis 170 when the mechanism 176 is moved upwardly. Actuation of the actuating mechanism 176 preferably occurs by the system operator pressing a button associated with the controller 22, preferably a button on the keyboard 23.

Rather than using an actuating mechanism, the system operator may be required to manually pivot the door 162 by reaching into the module 100. In this case, when a card is to be ejected, the system is preferably paused while the system operator proceeds to the module 100 to manually pivot the door 162 and eject the card.

When the door 162 is pivoted to the eject position, the card is able to fall downward through a channel 180 in the plate 134. The ejected card falls onto a chute 182 which leads to a holding bin 184. Preferably, a sensor 186 is provided to detect if the door 162 is partially open (e.g. the card did not fall completely through the channel 180). Further, a sensor 188 is provided in the holding bin 184 to detect the presence of the card in the bin 184. If the door 162 is partially open or if a card is detected in the bin 184, operation of the system will not proceed until the card has been removed.

Laser Module

The laser module 700 is illustrated in detail in FIGS. 21-26. The module 700 is designed to perform laser personalization on the cards in which information, such as card holder information like the card holder's name, or information such as logos or the name of the card issuing authority, is added to the card by a laser beam projected onto the card. Laser personalization and the process by which a laser generates personalization information on a card is well known to persons of ordinary skill in the art. If a card does not require laser personalization, the card can simply be passed through the module 700 to the next module. Preferably, the laser module 700 is designed to personalize up to 3000 cards per hour.

Figure 21:
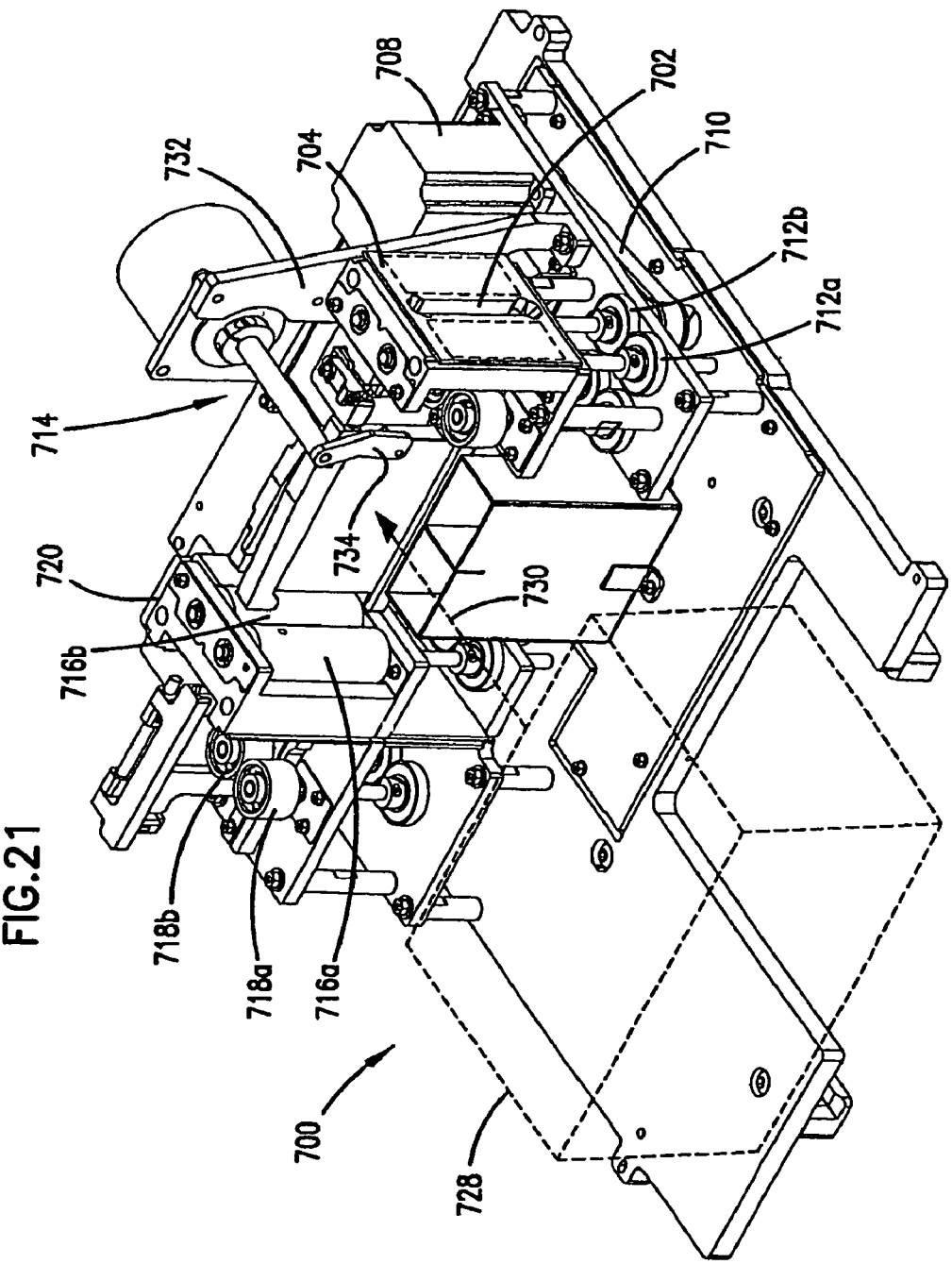
FIG. 21 is a front, right perspective view of interior portions of the laser module illustrating details thereof.

Turning to FIGS. 21-22, the details of the laser module 700 are shown. As is conventional in laser personalization systems, the interior of the module that contains the laser system and the region of the module where the card is personalized is designed to contain all laser light thereby preventing personnel from exposure to such light. A card enters the module 700 through an inlet slot 702 provided in a wall 704 of the light-tight region of the module 700. A first pair of input drive rollers 706a, 706b engage the leading edge of the card and drive the card to a second pair of input drive rollers 708a, 708b which complete the input of the card into the module 700.

As seen in FIG. 22 and in dashed lines in FIG. 21, the drive rollers 706a, 706b extend substantially the entire height of the wall 704 so that the rollers 706a, 706b engage substantially the entire surface of the card along the height thereof. In addition, each roller 706a, 706b is rotatably driven by a motor 708, preferably a stepper motor, via a drive mechanism that includes a drive belt 710 and gears 712a, 712b. Further, the front roller 706a is biased toward the back roller 706b in order to contain laser light within the interior of the module 700.

Each roller 708a, 708b is also rotatably driven by the motor 708 via a suitable drive train mechanism. The rollers 708a, 708b are shorter than the rollers 706a, 706b to allow a card pusher mechanism 714, described below, to engage the trailing edge of the card to completely push the card into and out of the personalization region.

A first pair of output drive rollers 716a, 716b engage the leading edge of the card after personalization, and drive the card through a slot 717 into a second pair of output drive rollers 718a, 718b which drive the card into the next module. The rollers 716a, 716b, like the rollers 706a, 706b, engage substantially the entire surface of the card along the height thereof, and the front roller 716a is biased toward the rear roller 716b in order to contain laser light within the interior of the module 700. Each output roller 716a, 716b, 718a, 718b is also driven by a motor 720, preferably a stepper motor 708, via suitable drive trains.

Between the rollers 706a, 706b and output of the module 700, the card is guided at its top and bottom edges by top and bottom guide tracks 722, 724, respectively. The guide tracks 722, 724 maintain a consistent travel path through the module 700, with the plane of the card being oriented generally vertically.

FIGS. 21-22 illustrate the card in a personalization region 726 ready to be personalized by a laser mechanism 728 that is positioned to project a laser beam 730 onto appropriate portions of the card surface. In order to achieve effective personalization, precise and repeatable positioning of the cards in the region 726 is required. Misalignment of a card in the region 726 will lead to incorrect location of the personalization on the card.

The card is pushed into the personalization region by the card pusher mechanism 714 which includes a push pin 732 that projects rearwardly from one end of a drive arm 734. The other end of the arm 734 is connected to and rotatably driven by a drive shaft 736 that is driven by a motor 738, preferably a stepper motor.

The card is guided in the personalization region 726 by a pivoting card stop 740 at the top edge of the card and a track 742 at the bottom edge of the card. The card stop 740 and track 742 are separate from the guide tracks 722, 724 and separate from the structure that supports the rollers 708a, 708b, 716a, 716b. This allows the card stop 740 and track 742, and the card held thereby, to be tilted and/or rotated by a suitable mechanism (not shown). These movements are often necessary when the card surface to be personalized is not completely planar to ensure that the laser beam 730 contacts the card surface at right angles to the card surface being personalized.

The card stop 740 is constructed to repeatably and precisely position the card in the region 726. The stop 740, which is shown in FIGS. 21-23, is mounted on a pivot pin 744 for pivoting movement about the axis of the pin 744. In addition, the stop 740 is biased downward (i.e. in a counterclockwise direction about the pin 744) by a suitable bias mechanism (not shown) in order to force the card downward into the track 742, thereby securely holding the card in position during personalization.

As shown in FIG. 23, the stop 740 defines a channel 746 in which the upper edge of the card travels. The channel 746 includes a horizontal portion 748 at the beginning of the channel 746, a downwardly sloping portion 750, an upwardly sloping portion 752, and a downwardly sloping portion 754 adjacent the exit end of the channel 746. The shape of the channel 746 is such that, after the card is initially pushed into a preliminary or rough position by the pusher mechanism 714 as discussed below, the bias force of the stop 740 will force the card backward to a final, personalization position.

When the card first enters the personalization region 726, the arm 734 of the pusher mechanism 714 is rotated upward to allow the rollers 708a, 708b to drive the card partially into the region 726. As the rear edge of the card approaches the nip of the rollers 708a, 708b, the shaft 736 is rotated by the motor 738 to bring the pin 732 down into engagement with the rear edge of the card. Once the rear edge leaves the nip, the pin 732 will begin pushing the card into the region 726 to a preliminary, rough position.

As the card is pushed by the pin 732, the upper edge of the card disposed in the channel 746 of the stop 740, along with the sloped portions of the channel 746, forces the stop 740 upward (i.e. the stop 740 pivots in a clockwise direction), against the bias force on the stop 740. The card is pushed by the pin 732 until the upper, front edge of the card is engaged with the sloping portion 754 of the channel 746, at which point the pin 732 stops and then backs up away from the card. The sloped portion 754, under the bias force that biases the stop 740 downward, then moves the card backward to the card's final, personalization position. Therefore, the pusher mechanism 714 only needs to roughly position the card in the region 726, with the stop 740 then finally and precisely locating the card in a consistently repeatable position in the region 726.

After personalization by the laser mechanism 728 is complete, the pin 732 once again begins pushing the rear edge of the card. Continued pushing by the pin 732 forces the leading edge of the card out of the stop 740 and the channel 746 and into the nip of the rollers 716a, 716b. When this occurs, the rollers 716a, 716b take over driving the card and drive the card to the rollers 718a, 718b for subsequent discharge from the module 700 to the next module. As with the other modules, the card waits at the exit of the module 700 until the next module is done personalizing its current card and is ready to output that card.

Details of the laser mechanism 728 are shown in FIGS. 24-27. The laser mechanism 728 is constructed to permit easier set-up than in previous laser mechanisms used in laser personalization systems. Further, the laser mechanism 728 has fewer parts than previous laser mechanisms, and is designed to maintain laser adjustments, even when the laser mechanism is moved.

Figure 27:
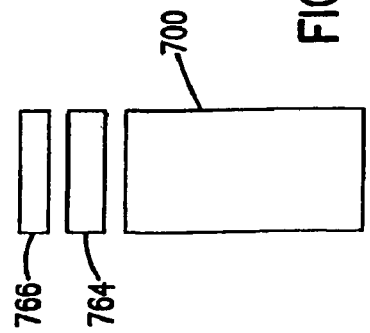
FIG. 27 is a schematic depiction of the laser module and the arrangement of the laser power sources.
Figure 25:
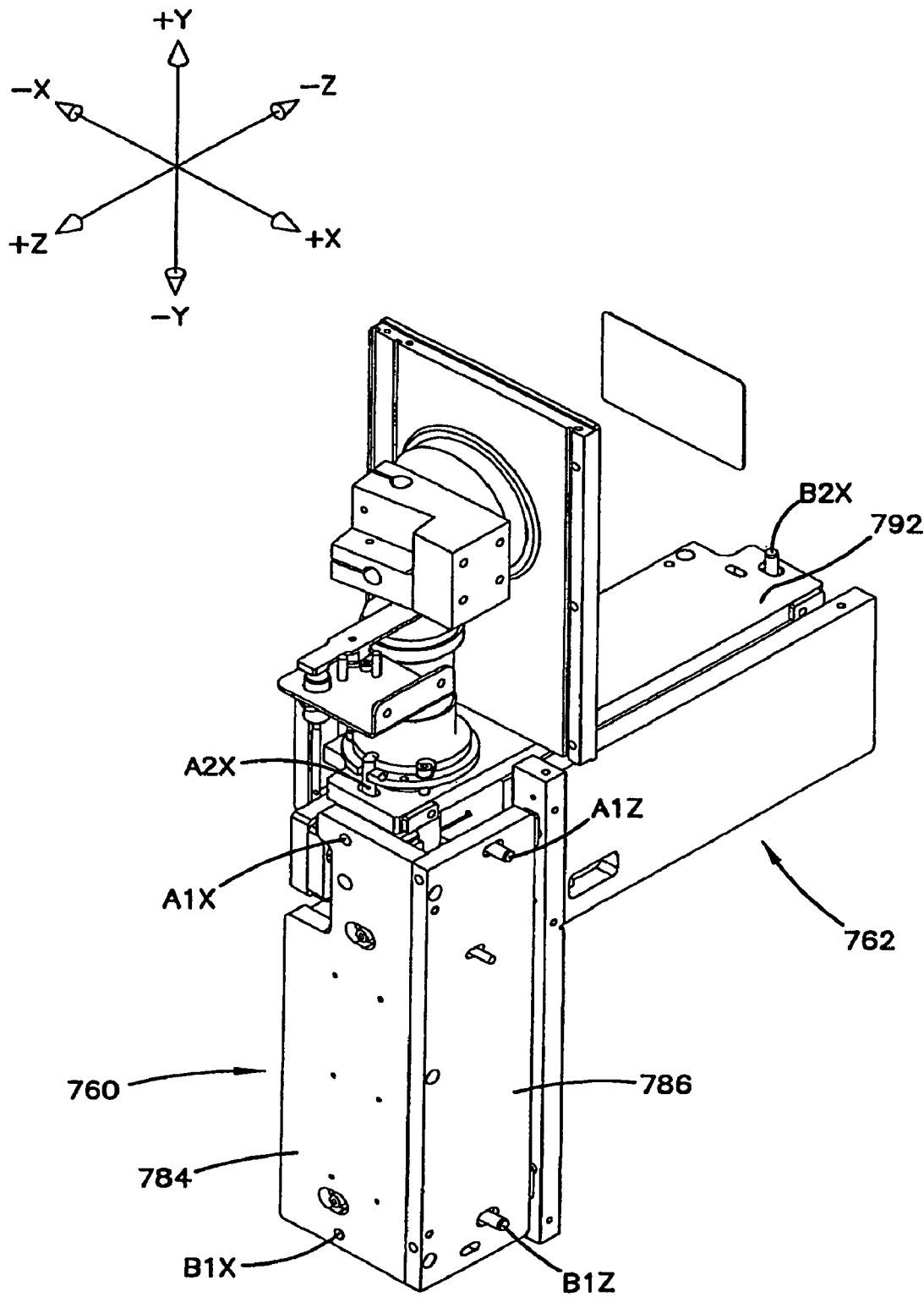
Figure 26:
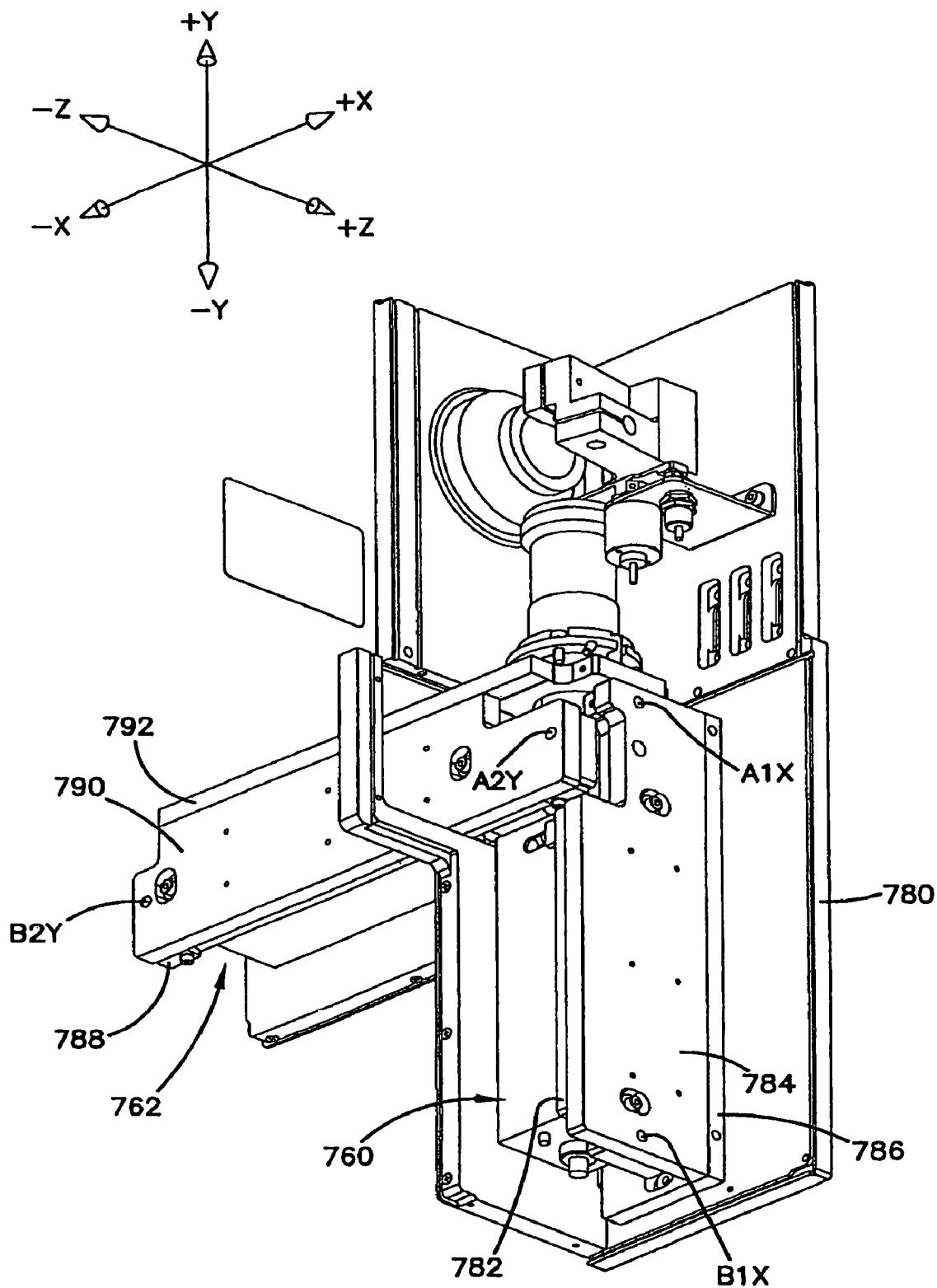

Preferably, the laser mechanism 728 utilizes a pair of lasers 760, 762, shown in detail in FIGS. 24-26, that are operated out of phase from each other during the laser personalization process. The use of two lasers 760, 762 operated out of phase permits an approximate doubling of the speed of the laser personalization process compared to the use of a single laser. Each laser 760, 762 requires its own power source 764, 766 which, as shown in FIG. 27, are mounted behind the module 700.

As shown in FIGS. 24-26, each laser 760, 762 outputs a laser beam 730, with the beams traveling through a beam splitter cube 768, then being expanded in a beam expander 770, and thereafter being deflected by a galvo mechanism 772 through a focusing lens 774 and onto the card. A safety stop shutter 776, shown in the closed position, is provided to selectively block passage of the beam 730 after the beam expander 770. The construction and operation of lasers, a beam splitter cube, a beam expander, a galvo mechanism, a focusing lens, and a safety stop shutter are well known in the art, and are not further described herein.

The lasers 760, 762 are mounted to permit easy and accurate adjustments of the lasers. Each laser 760, 762 is adjustably mounted as described below at both its front and rear ends for adjustments along at least two axes. In particular, the laser 760 is mounted for adjustments along the "x" and "z" axes, while the laser 762 is mounted for adjustments along the "x" and "y" axes. For the laser 762, the "y" direction is the same as the "z" direction after reflection in the beam splitter cube 768.

Figure 28:
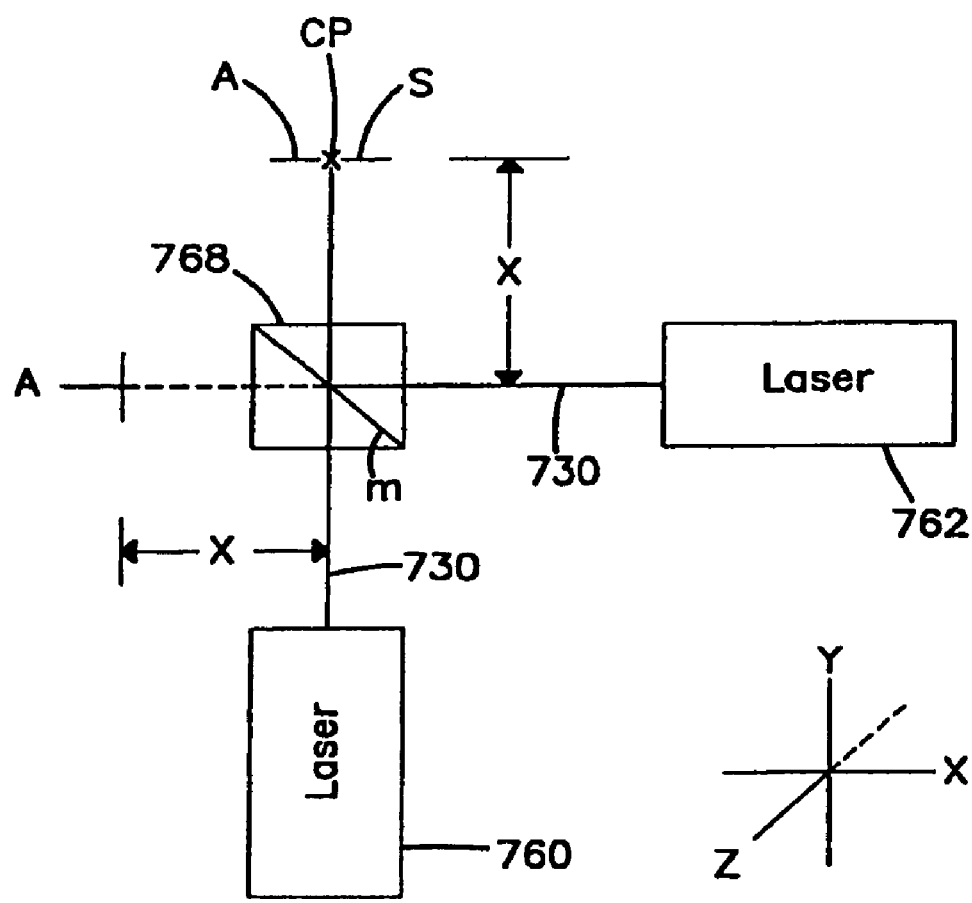
FIGS. 28-29 are schematic depictions of portions of the laser mechanism illustrating the laser adjustment concept.
Figure 29:
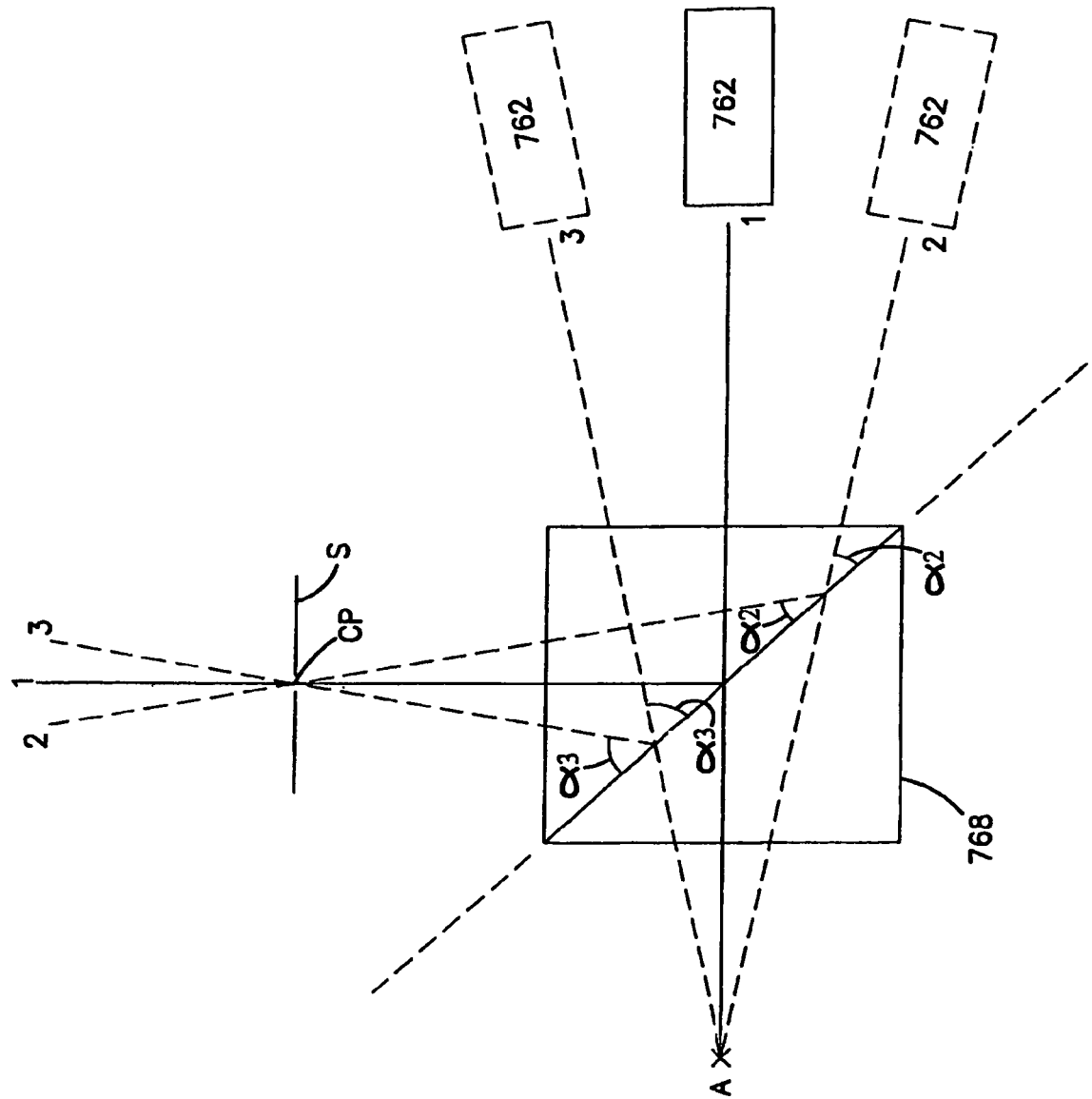

With reference initially to FIGS. 28-29, the concept of the laser adjustments will be described. In previous laser systems, when one or more of the lasers was moved, a painstaking process was required in order to achieve proper positioning of the lasers so that the laser beams pass through a common axis prior to entering the beam expander. This difficulty in adjustment is due to the fact that adjustment of each laser along two axes is necessary. For conventional lasers having a single adjustment location, this means that after adjusting a laser along a first axis, adjustment of the laser along the second axis changes the just made adjustment along the first axis. The laser then needs to be re-adjusted along the first axis, which changes the second axis adjustment which therefore needs to be re-adjusted. By repeating this process numerous times, a final adjustment can eventually be reached.

It has been discovered that by adjustably mounting each laser at both the front and rear ends thereof, faster adjustment of the lasers 760, 762 can be achieved. In particular, through suitable selection of the front end adjustment positions of the lasers, by first adjusting the front end of each laser until the laser beams pass through a common axis prior to passing through the beam expander 770, the rear ends of the lasers can subsequently be adjusted without affecting the front end adjustments so that the beams continue to pass through the same axis.

In FIG. 28, the common point through which the laser beams 730 are to pass is designated by CP. To measure whether the beams 730 are hitting the common point CP, a pin hole or quadrant sensor S can be located at the common point CP during the adjustment process. The front end adjustment point "A" of the laser 760 is located at the common point CP, which is spaced a distance X from the mirror m of the beam splitting cube 768. The rear end of the laser 760 is separately adjustable. By first adjusting the front end of the laser 760 until the beam 730 passes through the common point CP, as sensed by the sensor S, subsequent adjustments of the rear end of the laser 760 can be made without changing passage of the beam 730 through the common point CP.

For the laser 762, the front end adjustment point "A" is located as shown in FIG. 28, with "A" located a distance X from the mirror m. The rear end of the laser 762 is separately adjustable. Because the distance X of the adjustment point "A" for the laser 762 is equal to the distance X of the adjustment point "A" for the laser 760, by first adjusting the front end of the laser 762 until the beam 730, which is deflected by the mirror m of the beam splitter 768, passes through the common point CP, as sensed by the sensor S, subsequent adjustments of the rear end of the laser 762 can be made without changing passage of the beam 730 through the common point CP. This concept is illustrated in FIG. 29, which shows three different beam paths, labeled 1-3, for the laser 762. In each case, because of the common adjustment point "A" of the front end of the laser 762, regardless of subsequent adjustments of the rear end of the laser 762, the laser beams 730 continue to pass through the common point CP.

With reference now to FIGS. 24-26, the mounting of the lasers 760, 762 will be described. In describing the mounting and adjustments of the laser 760, 762, the front end adjustment positions of each laser 760, 762 will be designated by the letter "A" in FIGS. 24-26, while the rear end adjustment positions will be designated by the letter "B". Further, the laser 760 will be designated by the numeral "1", and the laser 762 will be designated by the numeral "2", and the adjustment directions will be designated by "x", "y" or "z". Further, the laser mechanism 728 includes a first support plate 778 (shown in dashed lines in FIG. 24), and a second support plate 780. The laser 760 is connected to and supported by a first mount plate 782, a second mount plate 784, and a third mount plate 786. Further, the laser 762 is connected to and supported by a first mount plate 788, a second mount plate 790, and a third mount plate 792.

For the laser 760, the front end of the laser 760 includes locator pins A1X and A1Z defining the front end adjustment locations, as shown in FIGS. 24-26. The rear end of the laser includes locator pins B1X and B1Z defining the rear end adjustment locations. The locator pins A1X and B1X are fixed to the second mount plate 784 and extend through slots provided in the first mount plate 782, so that the plate 784 can move relative to the plate 782 to allow adjustment of the laser 760 in the "x" direction. As evident from FIG. 25, the plate 784 is connected to the plate 786, so that the plate 786 moves in the "x" direction with the plate 784. The locator pins A1Z and B1Z are fixed to the plate 786 and extend into slots in the support plate 780 to allow adjustment of the laser in the "z" direction.

For the laser 762, the front end includes locator pins A2X and A2Y defining the front end adjustment locations, as shown in FIGS. 24-26. The rear end of the laser includes locator pins B2X and B1Y defining the rear end adjustment locations. The locator pins A2X and B2X are fixed to the mount plate 792 and extend into slots provided in the plate 778, so that the plate 792 can move relative to the plate 778 to allow adjustment of the laser 762 in the "x" direction. The locator pins A2Y and B2Y are fixed to the plate 790 and extend through slots in the plate 788 so that the plate 790 can move relative to the plate 788 to allow adjustment of the laser 762 in the "y" direction.

Adjustments of the lasers 760, 762 about the respective locator pins can be accomplished using adjustment mechanisms similar to those used in previous laser systems. A person having ordinary skill in the art would know how to implement the conventional adjustment mechanisms with the lasers 760, 762.

Graphics Module

Monochrome images often are applied to personalized cards. Graphics, such as a photo, logo, account number or other personalized information that would not be applied using the normal three color process, may be applied using these particular graphics modules. Previous designs have employed a card path for entry and processing of cards into the module. Typically, separate roller assemblies are employed for entering a card and for transferring the card along the card path for processing. In the past, separate motors, such as stepper motors, were employed to control each of the roller assemblies. Further, the position of the card is referenced from the trailing edge of the card for processing. Further, a print ribbon supply from a supply roll is fed adjacent to a printhead used for printing on the card, to a take up roll.

Although these designs may be suitable for their purpose, improvements may still be made upon graphics modules used in card personalization systems. For example, there is still a need to solve card handoff problems between rollers and improve overall consistency in the handoff of cards between rollers. In addition, there is a need to provide improvements to graphics modules in determining the position and location of a card within the module. Further, there is need to provide a graphics module where print ribbon is easily metered and efficiently used. The following description illustrates the features and improvements made upon existing designs of a graphics module in accordance with the principles of the present invention.

FIGS. 30-33 illustrate a graphics module 600. If a card does not require any processing of graphics using the graphics module 600, the card may be simply passed through the module 600 to the next module. Preferably, the module 600 is capable of applying graphics on a card up to 3000 cards per hour.

Figure 30:
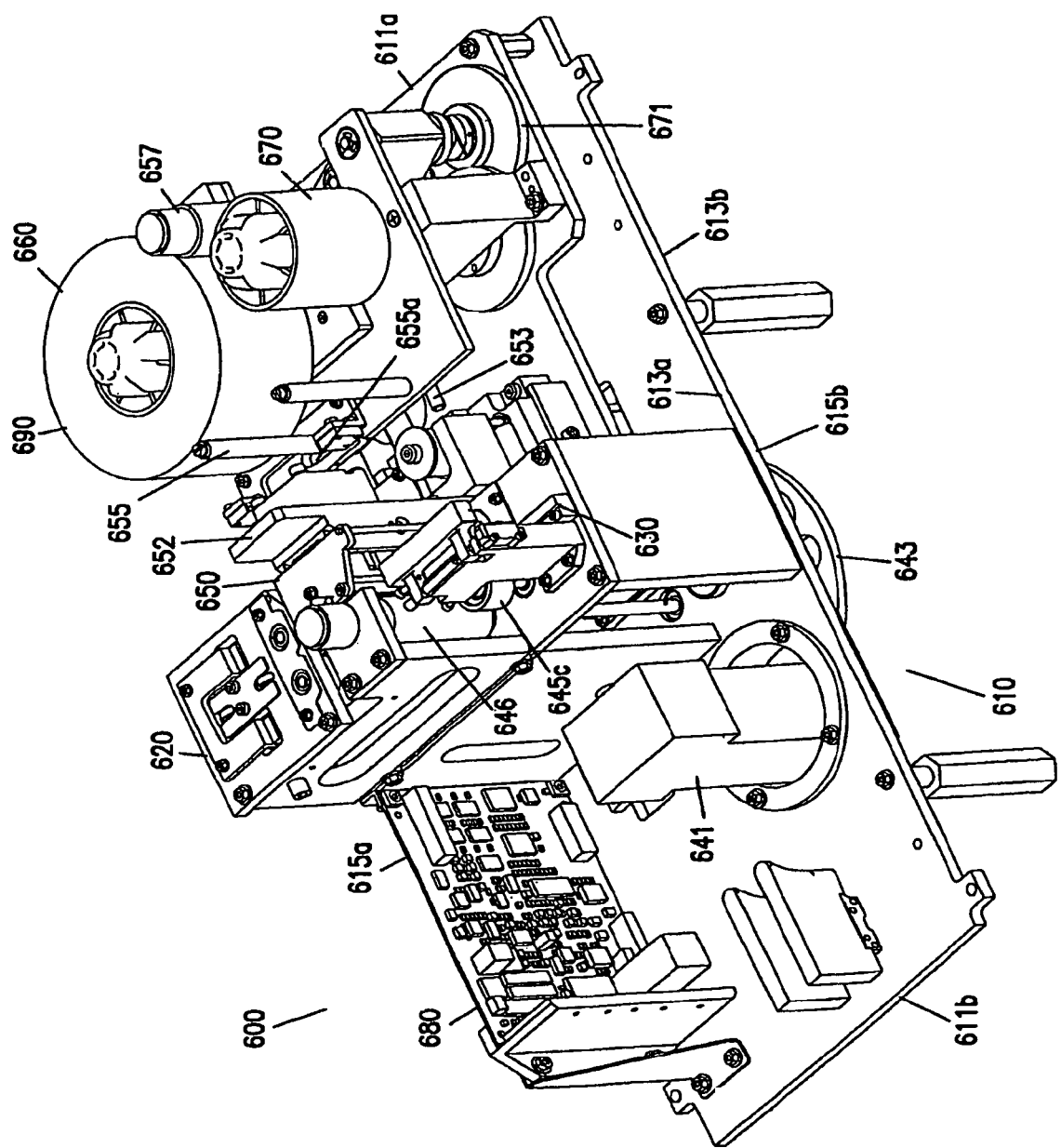
FIG. 30 represents a rear perspective view of one embodiment of a graphics module in accordance with the principles of the present invention.
Figure 31:
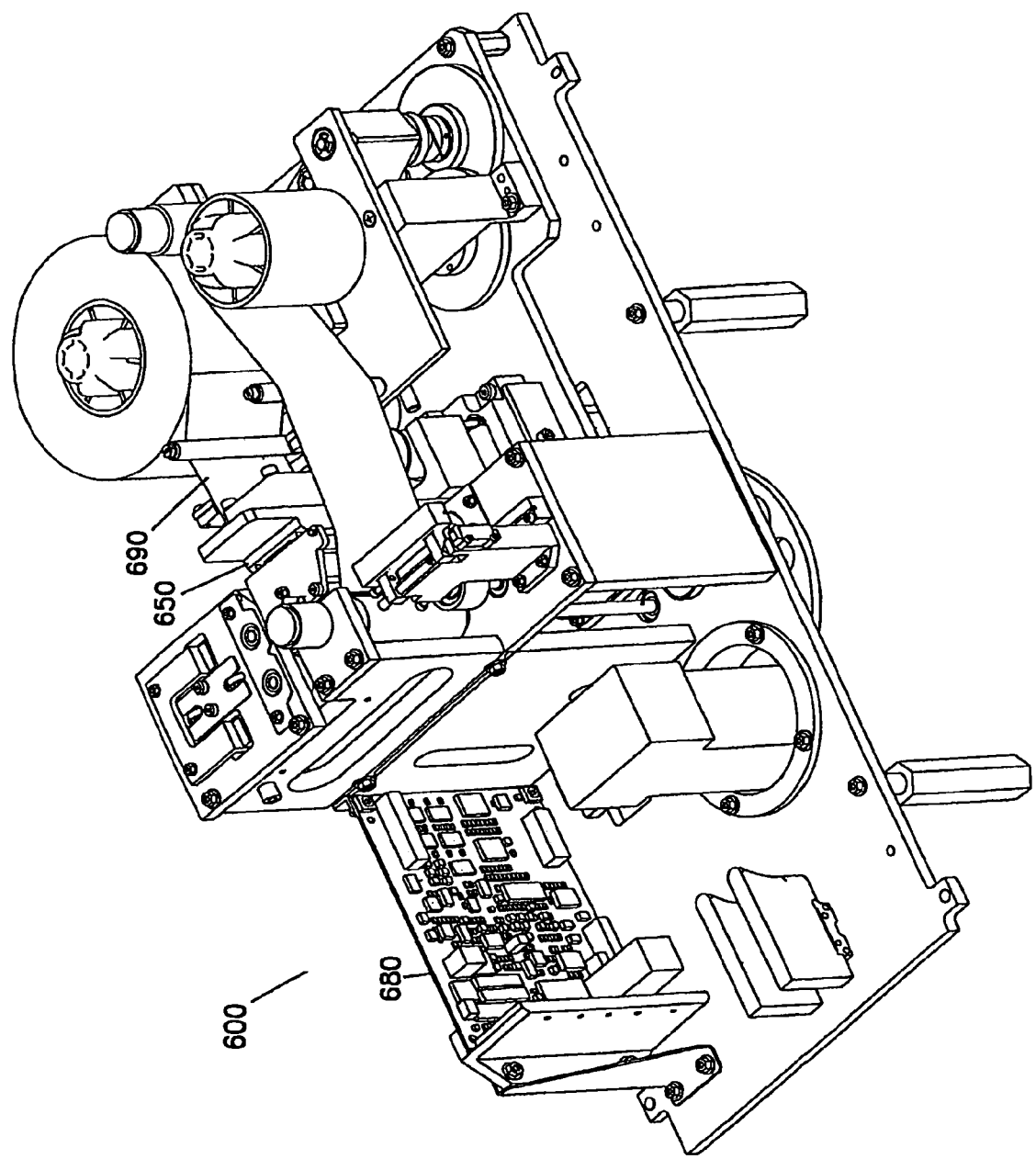
FIG. 31 represents a rear perspective view of the graphics module of FIG. 30 with a print ribbon incorporated.

FIGS. 30-31 illustrate perspective views of one preferred embodiment for a graphics module 600 used in the card personalization system of the present invention. The graphics module 600 includes a frame 610 having ends 611a, 611b, a top 613a, and a bottom 613b. The frame also includes an upstream side 615a and a downstream side 615b. A card path 630 is disposed between the ends 611a, 611b. At the upstream side 615a, the card path 630 includes a photo cell 620 incorporating a sensor (not shown) that senses an entry of a card input into the graphics module 600. FIG. 31 illustrates the graphics module 600 having a print ribbon 690 incorporated through the module 600.

Figure 32:
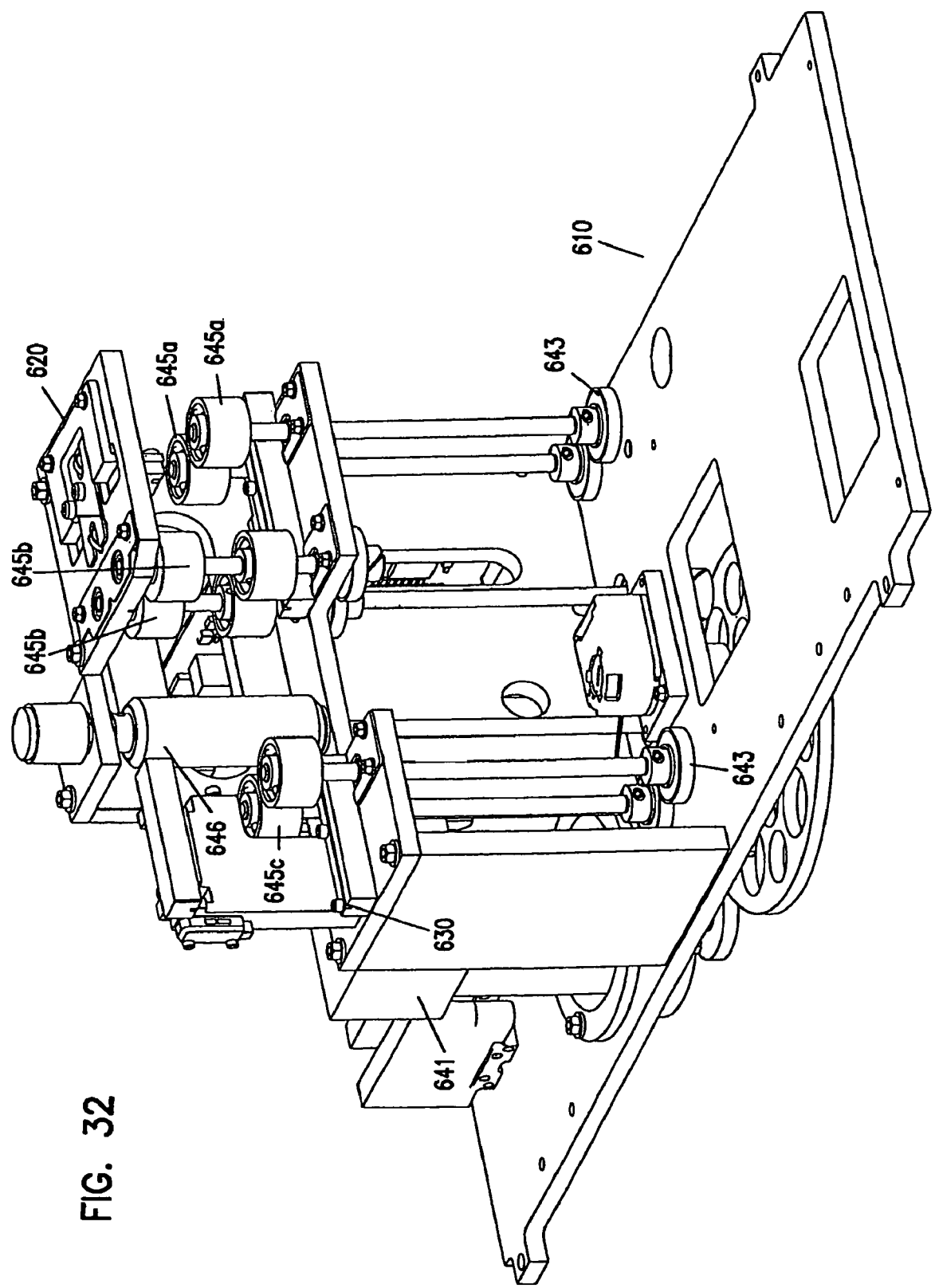
FIG. 32 represents a front perspective view of one embodiment of a roller configuration of a card path for the graphics module of FIG. 30.

Entry rollers 645a, as best shown in FIG. 32 are employed for entry of the card into the graphics module 600 for processing of the card. The card is transferred or passed to mid-module transport rollers 645b (FIG. 32) that move the card along the card path 630 during a printing stage. Preferably, the entry rollers 645a operate at a higher speed when passing a card than the transport rollers 645b. Particularly, the card is moved by the entry rollers 645a at a higher speed than when the card is moved by the processing rollers 645b, when the speed of the card is dropped down for printing. Preferably, as shown in FIG. 32, a pair of rollers is employed for the entry rollers 645a, and another pair of rollers 645b, are employed for the transport rollers. However, it will be appreciated that more rollers may be employed as suitable for the transport of a card along the card path. Roller drives 643 drive both rollers of the roller pairs 645. As shown in FIGS. 30 and 32, roller drives 643 are shown that drive the entry rollers 645a, the transport rollers 645b, and the exit rollers 645c.

A motor 641 is operatively connected to the roller drives, such as 643, in rotating the rollers. Preferably, one motor 641 is employed to control the rotation and speed of the entry rollers 645a, the transport rollers 645b, the exit rollers 645c and the print roller 646. More preferably, the motor 641 is a DC servo motor rather than a stepper motor that is more suitable for rapid speed changes especially when the changes are over a large range of speeds. The use of one motor eliminates the need for multiple stepper motors and presents improved handoff and transfer of the cards between the rollers within the module 600. The motor 641 operates at high speed for entry and transport of a card then reduces the speed so that the module 600 may begin printing the necessary personalization information. Preferably, a card passing through the module 600 is always in the grip of at least one set of rollers. For instance, a card that is in the grip of the entry rollers 645a would enter the transport rollers 645b, before the card would be released from the entry rollers. This eliminates the potential for a handoff problems in card transfer between different roller sets employing separate motors and controls. With the positive control of the card through roller hand offs the position of the card within the module 600 can be reliably predicted.

Figure 33:
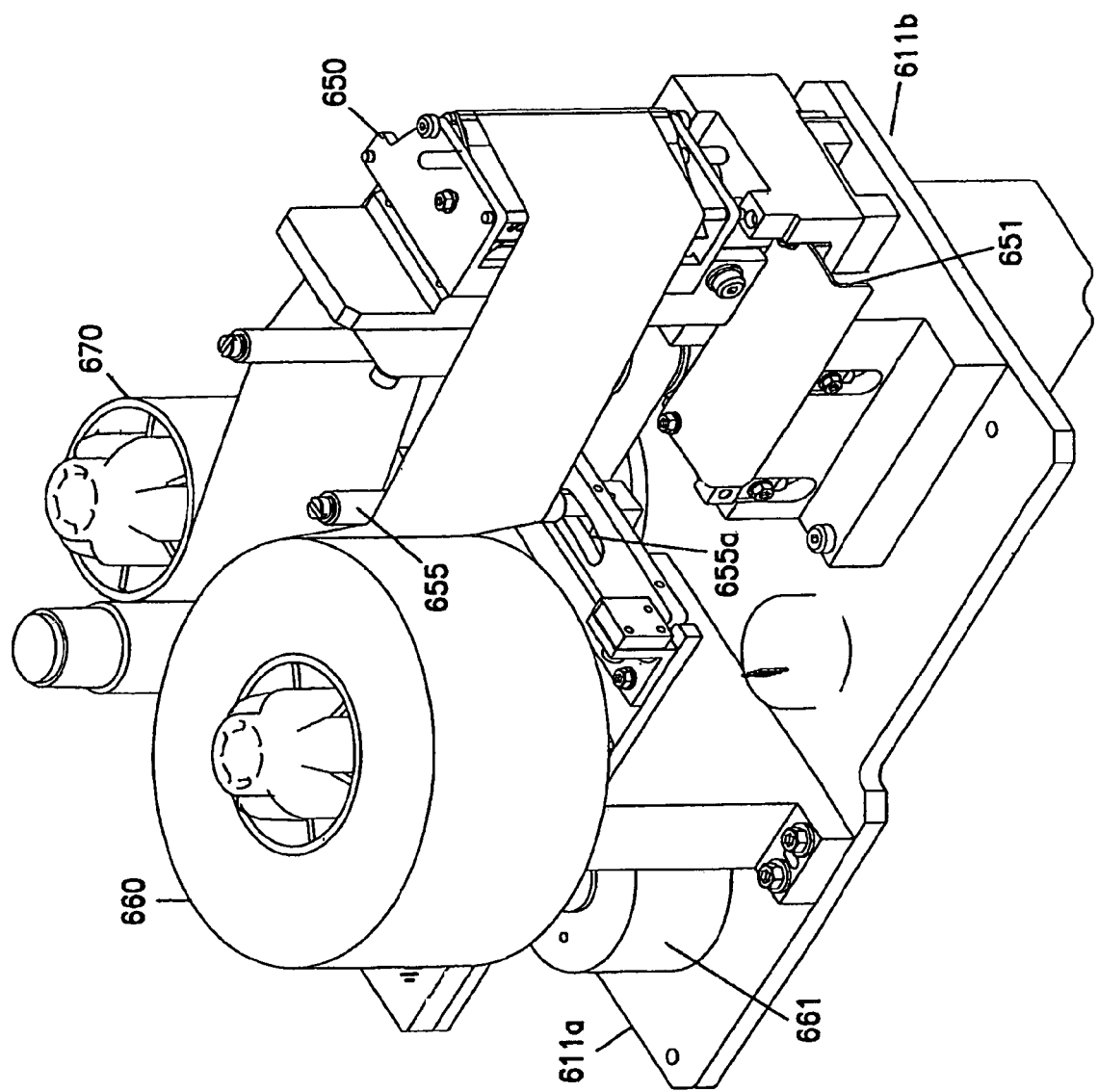
FIG. 33 represents a perspective view of a printhead in a print position for the graphics module of FIG. 30.

A printhead 650 disposed between the transport rollers 645b and the exit rollers 645c and along the card path 650. Preferably, the printhead 650 is movable to and from the card path 650, along the track 651, as best shown in FIG. 33, in a direction perpendicular to path 630. More, preferably, the printhead 650 may reside in one of three positions including a ready position, a printing position and a ribbon loading position. The ready position constitutes a position where the printhead 650 has been wrapped with the proper ribbon 690 for applying the personalized graphics information, and may reside a short distance (card thickness plus clearance) from the print roller 646. The printing position of the printhead 650 is when the card is moving at the reduced speed along the card path 630 and is in proper position for graphics printing proximate to the card path 630. The printhead 650 would reside at the card path pressing the ribbon and card against the print roller 646 so printing may occur. FIGS. 30 and 33 illustrate the graphics module 600 in the print position. The ribbon loading position or load position occurs when the printhead 650 resides above the end of the track 651, farthest from the print roller 646. The loading position enables for loading/unloading of ribbon product from the supply and take up spools.

In the print position, the printhead 650, having the print ribbon product wrapped adjacent to the printhead 650, presses against the card being processed. Preferably, the printhead 650 is a thermal roller. Pressure is applied against the ribbon and card for a suitable amount of time so that the print ribbon product may be transferred and adhere onto the card. After the necessary personalization graphic(s) have been input onto the card, the printhead 650 and ribbon 690 are removed away from the card, and the card may be put in position for release from the graphics module 600.

When in the loading position, the printhead 650 and carriage 651 are moved away from the card path 630 far enough to contact and push a release bar 653. The release bar 653 is operatively connected with a capstan 657, and may push the capstan 657 when being moved by the carriage 651 into its loading position. In this configuration, the capstan 657 is moved away from supply roll 660 and take up roll 670, so that each of the rolls 660, 670 may be removed of used ribbon product or loaded with additional ribbon product. Preferably, the capstan 657 normally is biased against the take up roll 670, when the printhead 650 is in a position other than the loading position, such as in the ready or printing positions. FIG. 30 illustrates the capstan biased against the take up roll 670.

When the capstan 657 is in its normally biased position against the take up roll 670, the amount of ribbon needed for printing a particular graphic image can easily and accurately be measured. Preferably, the capstan 657 resides about the outer diameter of the take up roll 670. Particularly, by positioning the capstan 657 about the outer diameter of the roll 670, the amount of rotation required by the capstan 657 to meter a specific amount of ribbon product used for printing on the card, is consistent regardless of the diameter of the take up roll 670. In addition, the take up roll 670 rotates accordingly to take up the used print ribbon product, and maintains compact and controlled tack up roll 670 during regular print and take up conditions.

The graphics module 600 also includes an accumulator 655 or tensioning member that maintains tension in the print web. The accumulator 655 is pivotable about a pivot region 655a and contacts the print web before being fed to the printhead 650 and take up roll 670. The accumulator 655 is biased against the print web so that the print web maintains a suitable tension in the print web. Further, the accumulator 655 enables the take up roll 670 to reverse its rotation and feed print ribbon backwards past the printhead 650 while still maintaining tension in the print web. For example, in the event of a print error, the take up roll may reverse its rotation, and the accumulator 655 automatically pivots against the print web, accordingly without the need for the supply roll to reverse its rotation. Tension in the web is maintained and unused print web may be saved. The accumulator 655 provides additional ribbon saving capability to the graphics module 600. Particularly, the accumulator 655 provides a ribbon saving feature when the take up roll reverses its rotation to recover previously unused print web.

As above with the input hopper, a controller, such as 22 described above, is used to provide the necessary data information in controlling the graphics module settings. Preferably, a controller 680 is disposed on the frame 610 of the module 600, and is in communication with the main controller in controlling the module 600. A electro-mechanical break 661, as shown in FIG. 33 controls the resistance torque applied to the supply roll 660. Preferably an electro-mechanical break is used to provide a necessary torque to resist the free rotation of the supply roll 660 maintaining tension in the web. More preferably, a larger diameter of the supply roll 660 requires more torque in order to maintain a constant tension in the web. On the other hand, a smaller diameter requires less torque to achieve the same tension. Therefore, as the print web supply on the supply roll 660 diminishes, the necessary torque required on the supply roll 660 also decreases. Moreover, tension in the web is further maintained in the event of power failure, as the break 661 controlling the supply roll 660 torque is not connected to the interlock of the card personalization system. Thus, if a power failure occurs, tension in the print web may be maintained.

In addition to other advantages, the graphics module of the present invention provides improved card transfer between rollers and increased ribbon saving features. One motor is used to drive all the entry, transfer and exit rollers along with the print roller. A card processed in the graphics module is always in the grip of at least one set of rollers. Such configuration also allows for improved monitoring of the position and location of a card. The graphics module of the present invention can be more conveniently and accurately metered. Further, the tension of the print web can be maintained during many instances of operation.

Output Hopper

An output hopper is needed to collect processed and personalized cards. Typically, an output hopper includes trays for collecting cards that have passed through the processing modules of a card personalization system, and are ready for exit. Cards are exited off of a card path, using a card feeder, and collected into output trays. A card feeder pushes a processed card off the card path and into a card collection tray. Typically, a plurality of collection trays is employed, where at least one collection tray is used as a reject tray.

Although these designs may be suitable for their purpose, improvements may still be made to an output hopper. There is still a need for an output hopper that provides increased reliability in exiting a card off of the card path for collection. Further, there is a need to provide improved efficiency in recognizing that a card is ready for exiting off of the card path. The following description illustrates the features and improvements made upon existing designs of an output hopper in accordance with the principles of the present invention.

As illustrated in FIGS. 1 and 2, the output hopper 50 of the system 10 is positioned adjacent to and immediately downstream from the last module 40 for collecting cards. It will be appreciated that one or more similar output hoppers may also be located within the system at other locations, including between two or more of the modules 40. In such a configuration, cards can be collected at various points along the card path of the system, allowing the cards to bypass one or more of the modules 40. Thus, multiple output hoppers can exist within the card personalization system 10, including between modules 40.

FIGS. 34-41 illustrate the output hopper 50 according to the present invention. Preferably, the hopper 50 is capable of collecting and stacking cards at a rate of up to 3000 cards per hour.

Figure 34:
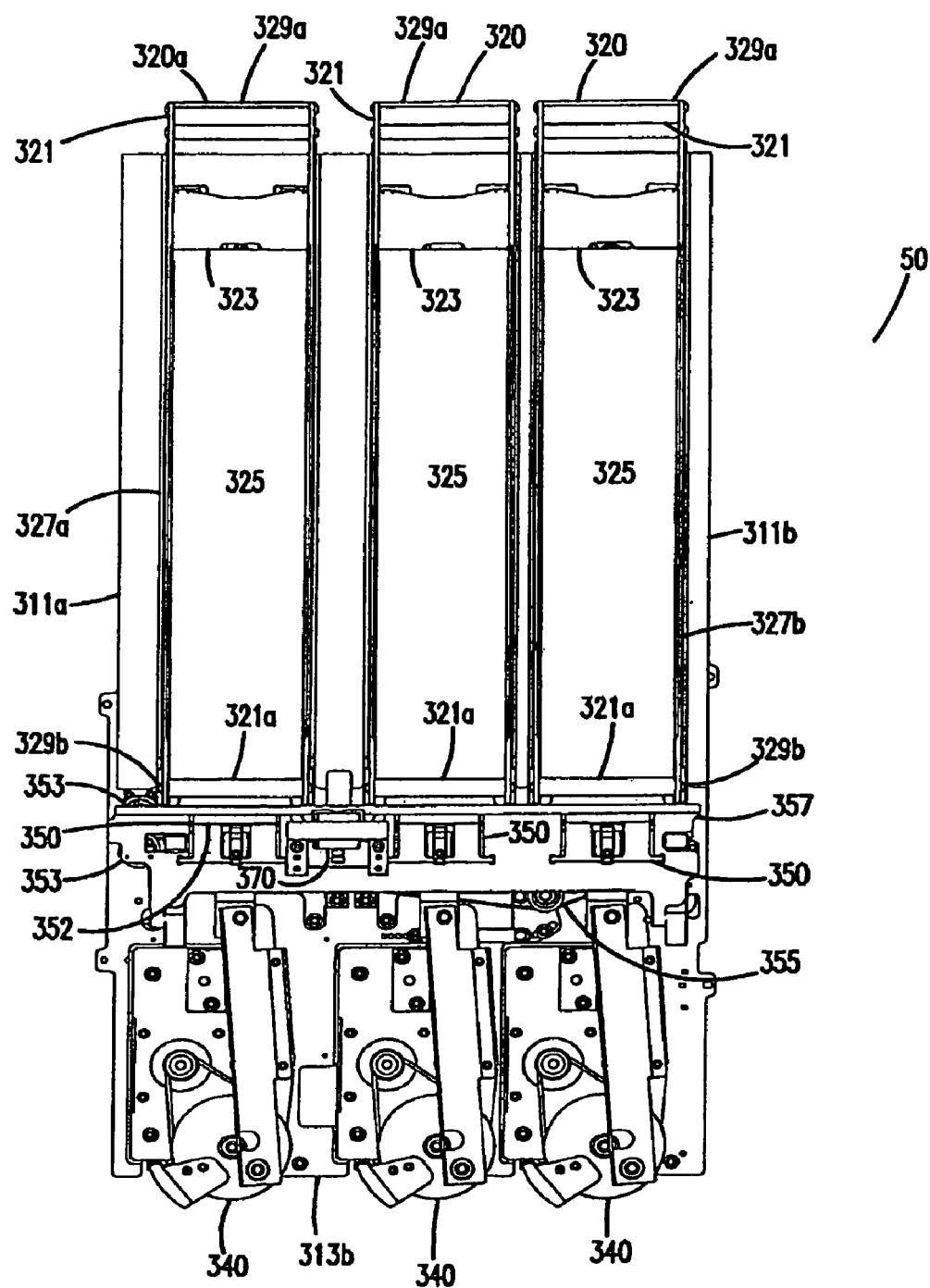
FIG. 34 represents a top view of one embodiment of an output hopper in accordance with the principles of the present invention.

FIG. 34 illustrates a top view of the output hopper 50. The output hopper includes a frame 310 having a front 313a, a back 313b, and an upstream side 311a, and a downstream side 311b. A card collection tray 320 is releasably connected to the frame 310, and is disposed from the front 313a towards the back 313b of the frame 310. Preferably, a plurality of card collection trays 320 is employed, where at least one collection tray 320a is used as a reject tray. As shown in FIG. 34, three collection trays are illustrated; two collection trays 320 for correctly personalized cards, and one reject tray 320a for incorrectly processed cards. However, it will be appreciated that any suitable number of trays may be employed as needed for each card personalization system.

Each collection tray 320, 320a includes at least one handle 321, 321a. As shown in FIG. 34, the handle 321 is disposed at a front 329a of each collection tray, and the handle 321a is disposed at the back 329b of each collection tray. However, it will be appreciated that any suitable number or configuration of handles may be employed. Each tray also includes a card retainer 323 which supports the cards in the card tray to keep the cards in an organized stack. The card retainer 323, held in the card tray 320 320a by a track, can slide along the length of the card tray.

A magnetic stripe reader unit 370 may be employed along the card path 351 downstream of the reject collection tray 320a and upstream of the collection trays 320. The magnetic stripe reader unit 370 is used to verify that the card in the output hopper module is the correct card to be transferred into a card collection tray. Each card is transferred through the reader unit 370 and moved in position in front of the appropriate card tray. The card is then exited into the card tray if the read/verify test is successful. Any processed card that fails the read/verify test is moved backwards on the card path 352 and exited into the reject collection tray 320a. The reader can read any track of data on the magnetic stripe of a card. The details and features of a magnetic stripe reader 370 in accordance with the principles of the present invention are provided in the discussion below.

FIGS. 34, 36 to 41 illustrate one preferred embodiment of a card path 352 defined by tracks 351, 357 capable of guiding cards through the module, guiding cards out of the card path 352 for transfer into a card collection tray, and providing upward bias force on cards for reading magnetic stripes with the magnetic stripe reader 370. The lower card track 351 is spring loaded in order to bias cards upward against the upper fixed card track 357. The lower track 351 also is split at the midpoint of the magnetic stripe reader 370. The card path 352 defined by the tracks 351,357 extends between the upstream side 311a and downstream side 311b.

Entry rollers 353 are disposed at the upstream side 311a, and employed for entering processed cards into the output hopper 50 along the card path 351. A tab belt 355 moves processed cards along the card path 351 to the respective card collection trays for exiting. The tab belt 355 includes tabs 355a that contact side edges of processed cards to drive the card along the card path 351.

Figure 36:
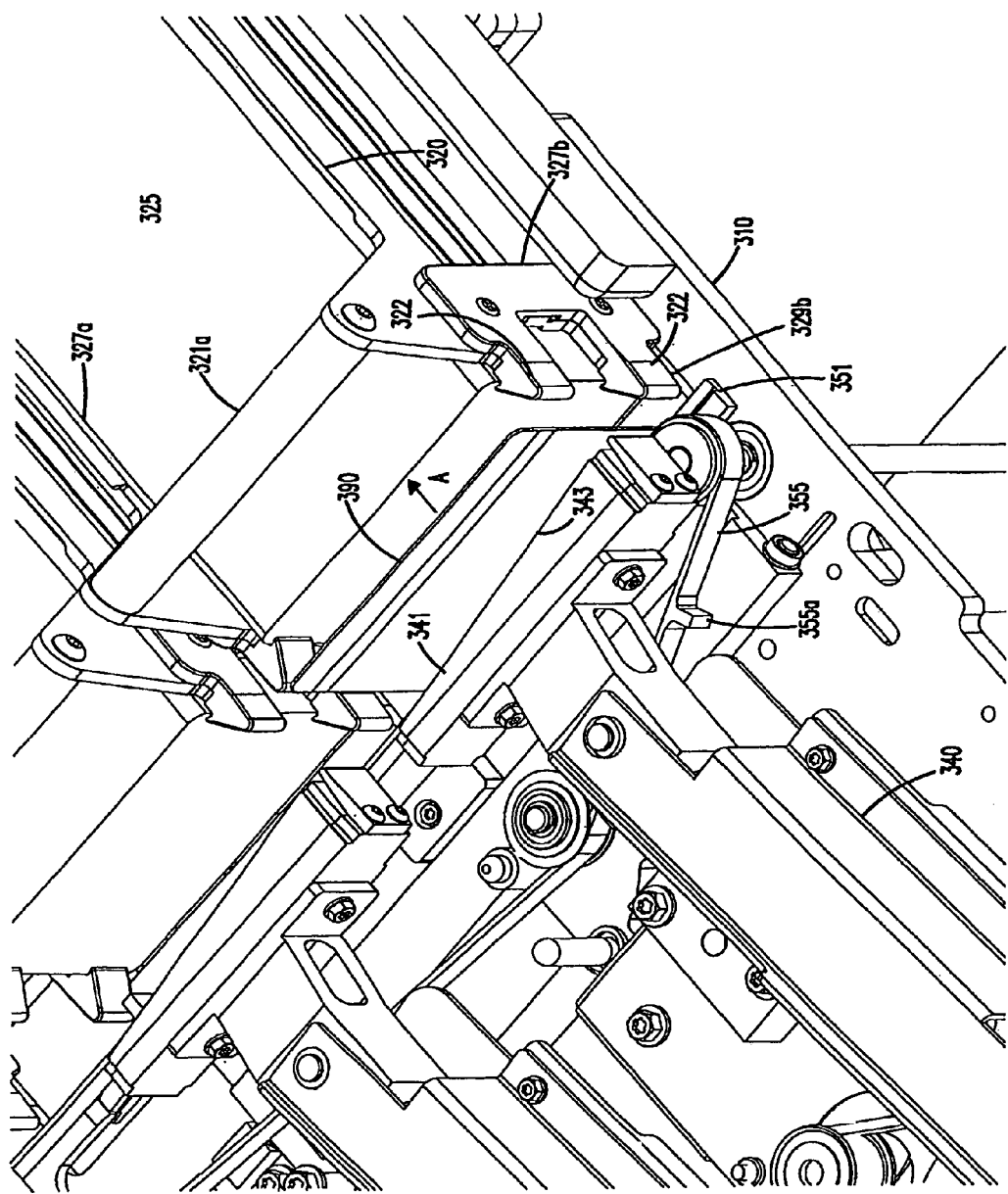
FIG. 36 represents a perspective view of one embodiment of a card feeder exiting a card in accordance with the principles of the present invention.
Figure 37:
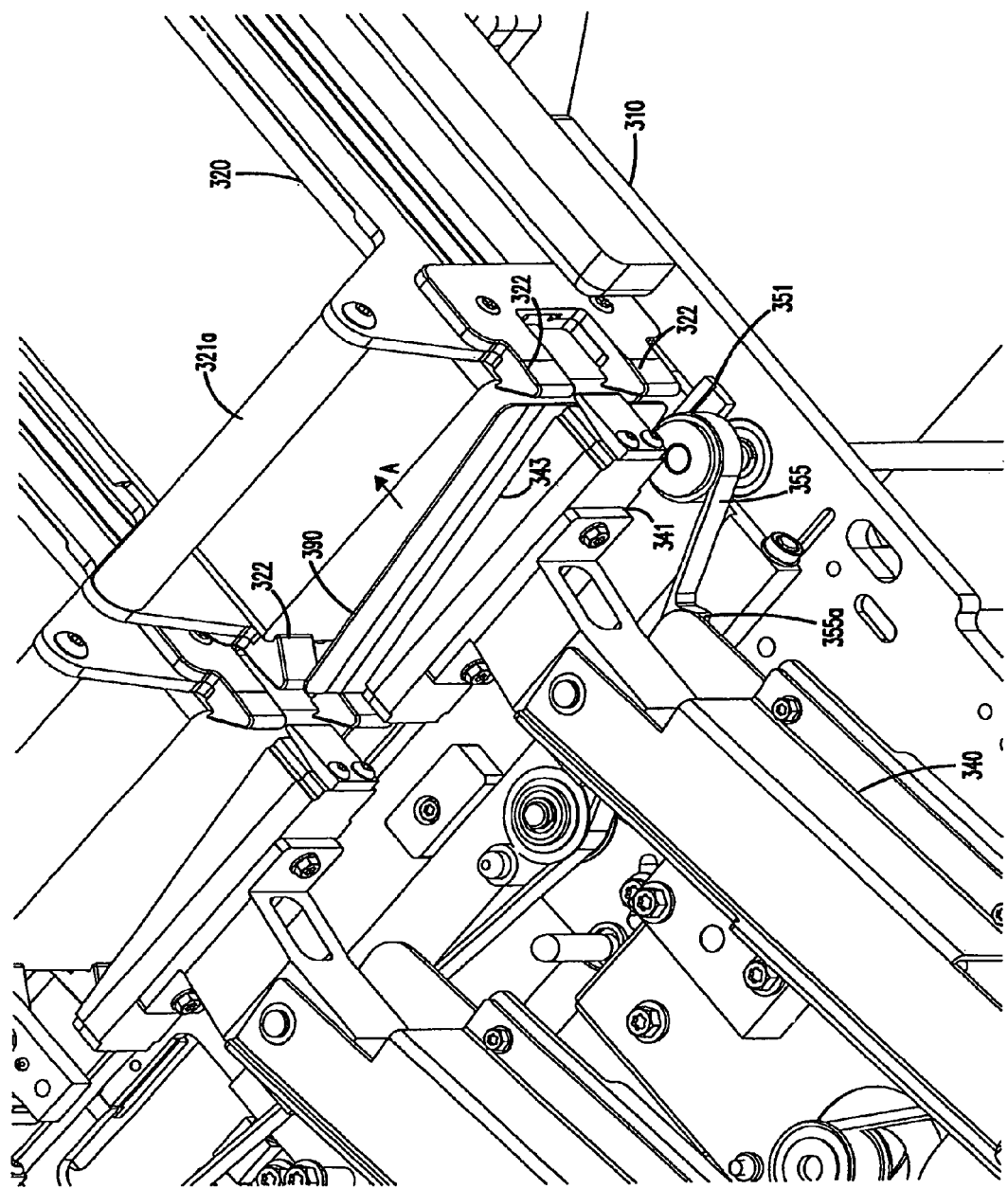
FIG. 37 represents a perspective view of the card feeder of FIG. 36 exiting a card.
Figure 38:
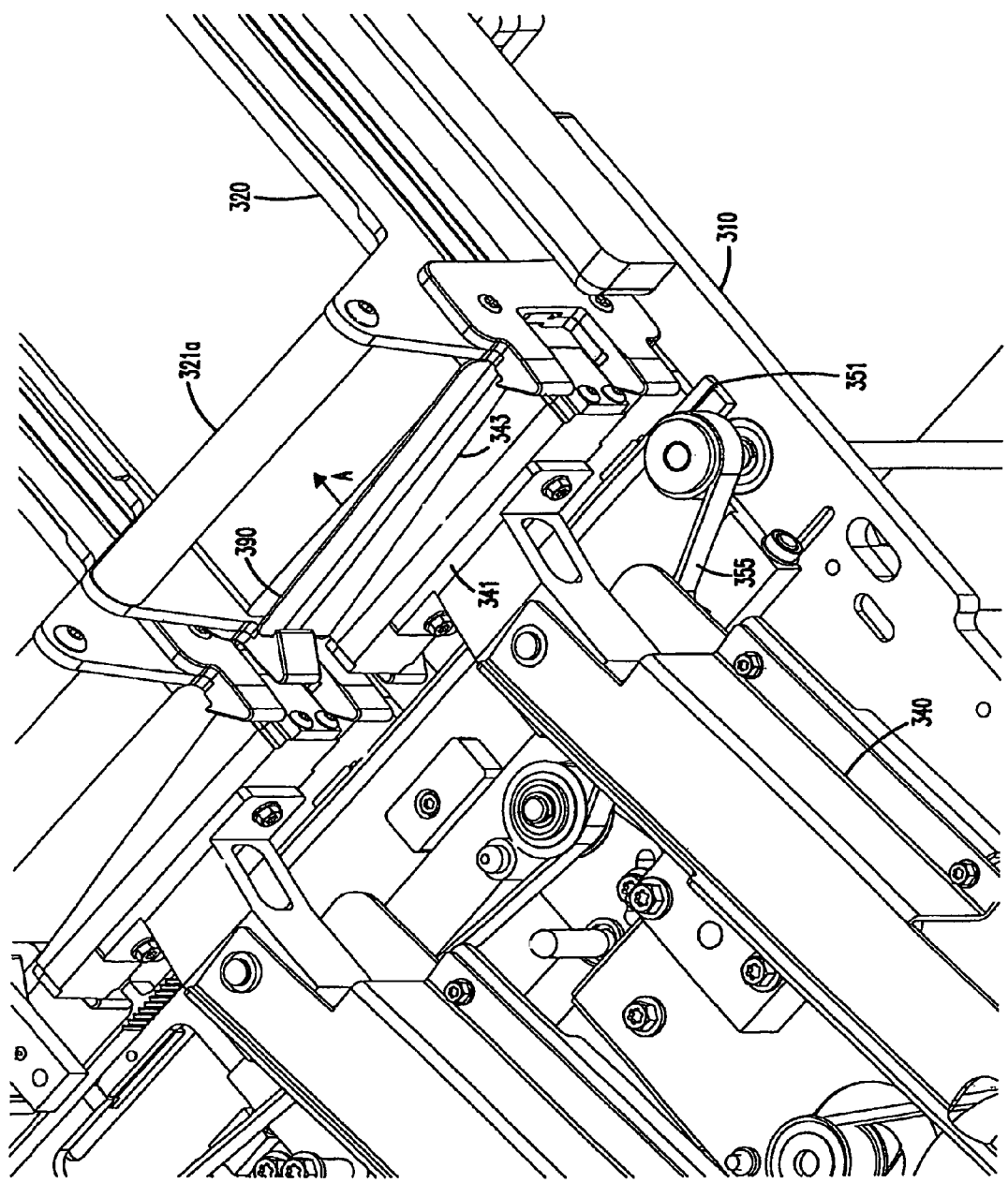
FIG. 38 represents a perspective view of the card feeder of FIG. 36 exiting a card.

FIGS. 36 to 38 illustrate one preferred embodiment of a card feeder 340 used to exit a card off of the card path 351 and into a card collection tray 320, 320a. As a processed card 390 is transferred along the card path 351, the appropriate card feeder 340 is activated and moves its pusher arm forward so that the card stop blocks the card path 351. This ensures the card 390 is positioned in front of the appropriate card collection tray with the leading edge of the card aligned with the back end 329b of the respective card collection tray 320. Each card feeder 340 includes a head portion 341 that is substantially elongated. Preferably, the card feeder 340 is at least the same length of a card 390. The head portion 341 contacts the card 390 and pushes the card 390 off the card path 351 towards and into the collection tray 320 (FIGS. 37 and 38). The collection tray 320 includes at least one retention member 322 defined on each side 327a, 327b of the collection tray 320. The retention members 322 securely maintain exited cards, such as 390, fed into the collection tray 320. Preferably, there is a separate card feeder 340 for each collection tray 320.

Figure 39:
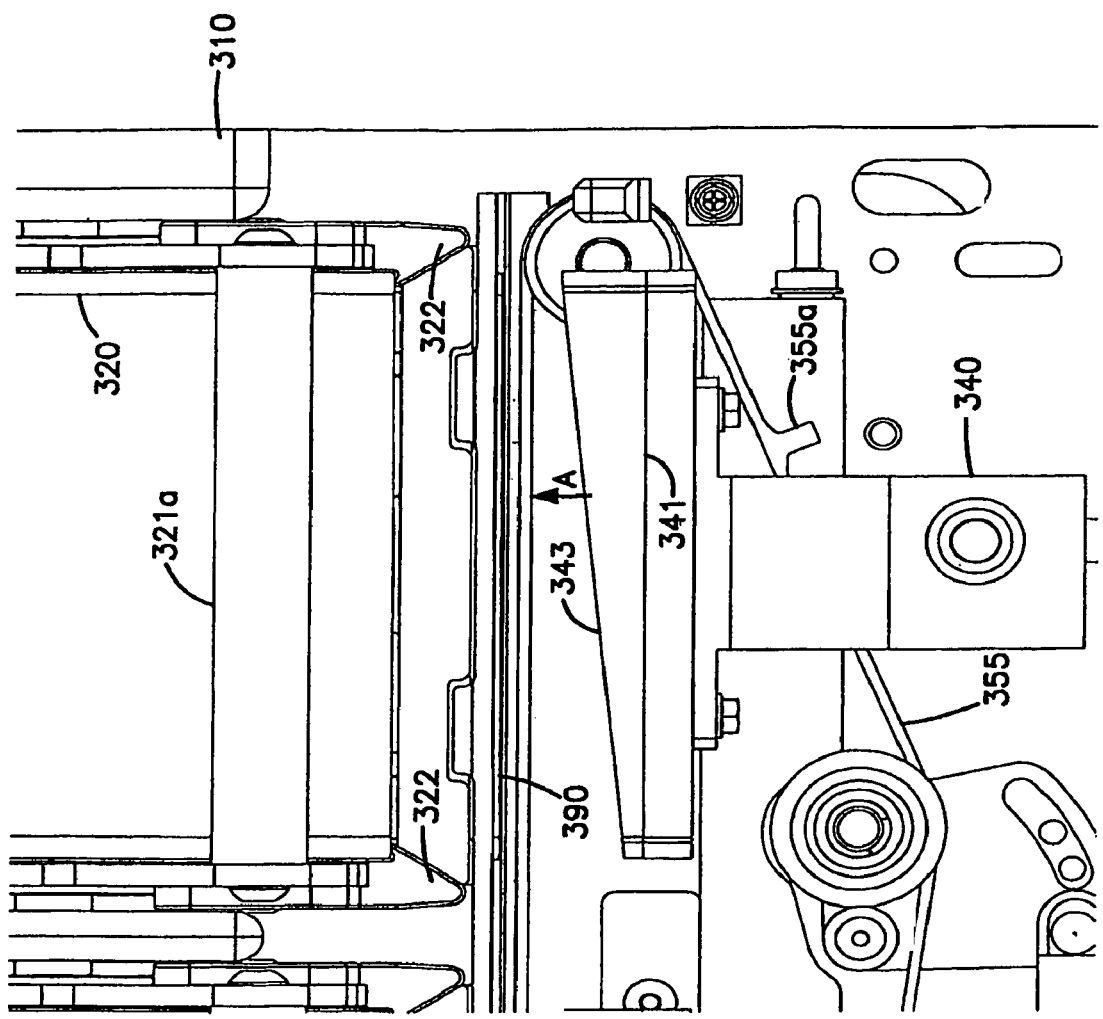
FIG. 39 represents a top view of one embodiment of a card feeder exiting a card in accordance with the principles of the present invention.
Figure 40:
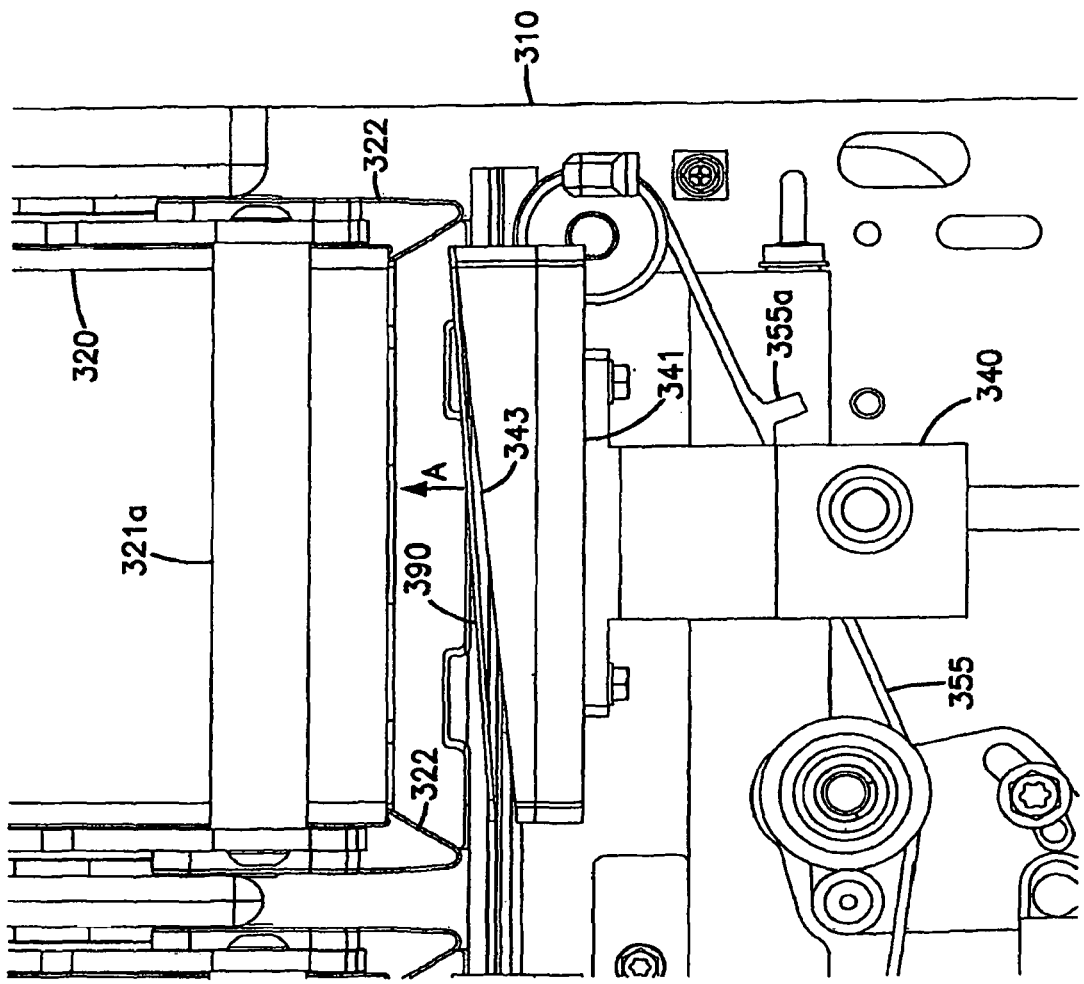
FIG. 40 represents a top view of the card feeder of FIG. 39 exiting a card.
Figure 41:
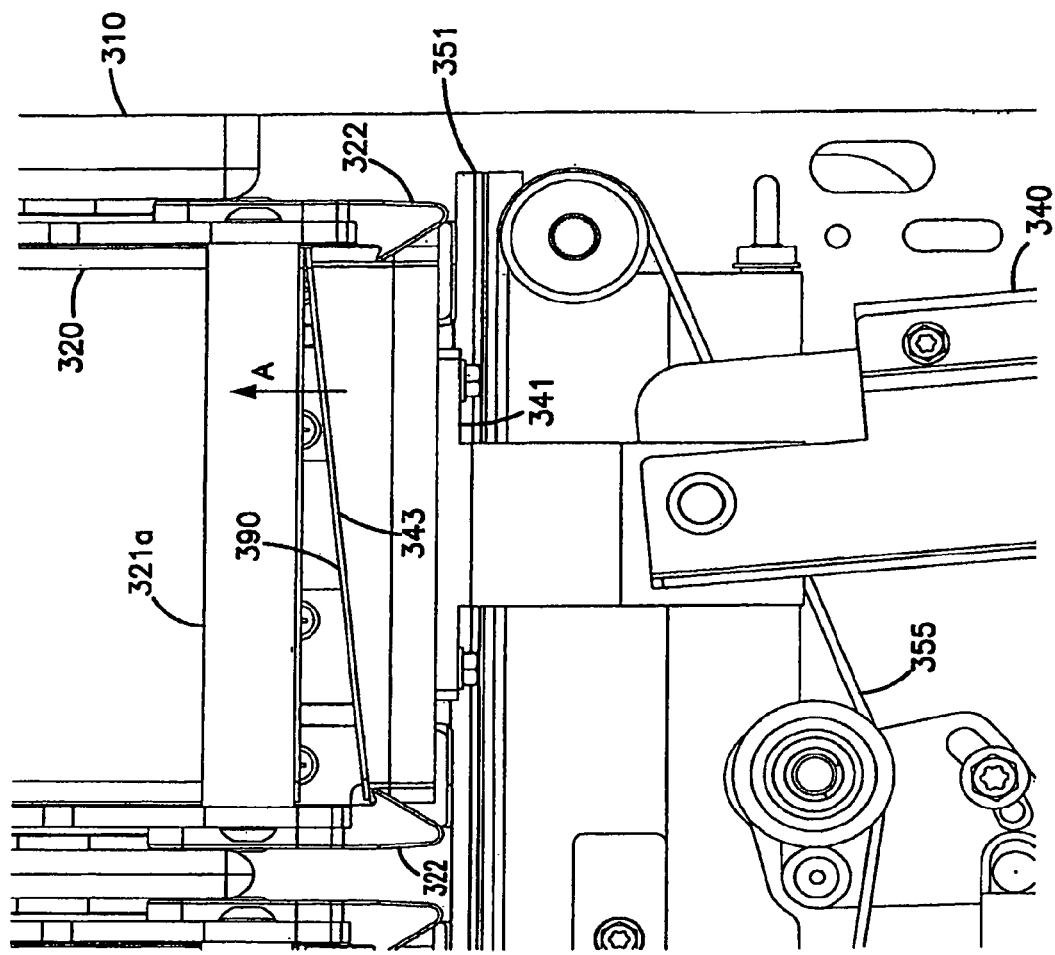
FIG. 41 represents a top view of the card feeder of FIG. 39 exiting a card.

One preferred approach to feed cards into respective collection trays is to employ a ramped or slanted surface 343 on the head portion 341 of each card feeder 340. The slanted surface 343 contacts the card 390, as shown in FIG. 37, and pushes the card 390 off of the card path 351. As shown in FIG. 38, the card 390 is slanted due to the contact with the ramped surface 343 of the head portion 341, and the card 390 passes retention members 322 residing on one side 327b of the collection tray 320. As the card feeder 340 pushes the card 390 into the trough 325 of the collection tray 320, the card 390 passes retention members 322 of the other side 327a of the collection tray 320. The arrow A represents the direction of card travel and movement of the card feeder 340. FIGS. 36 to 38 illustrate a card feeder 340 for a collection tray 320. However, it will be appreciated that similar structures may be employed for other collection trays, such as reject tray 320a. FIGS. 39 to 41 represent top views of the card 390 being pushed off the card path 351, and fed into the collection tray. Similar features are illustrated in FIGS. 39 to 41 already discussed above, and are not further described.

Figure 69:
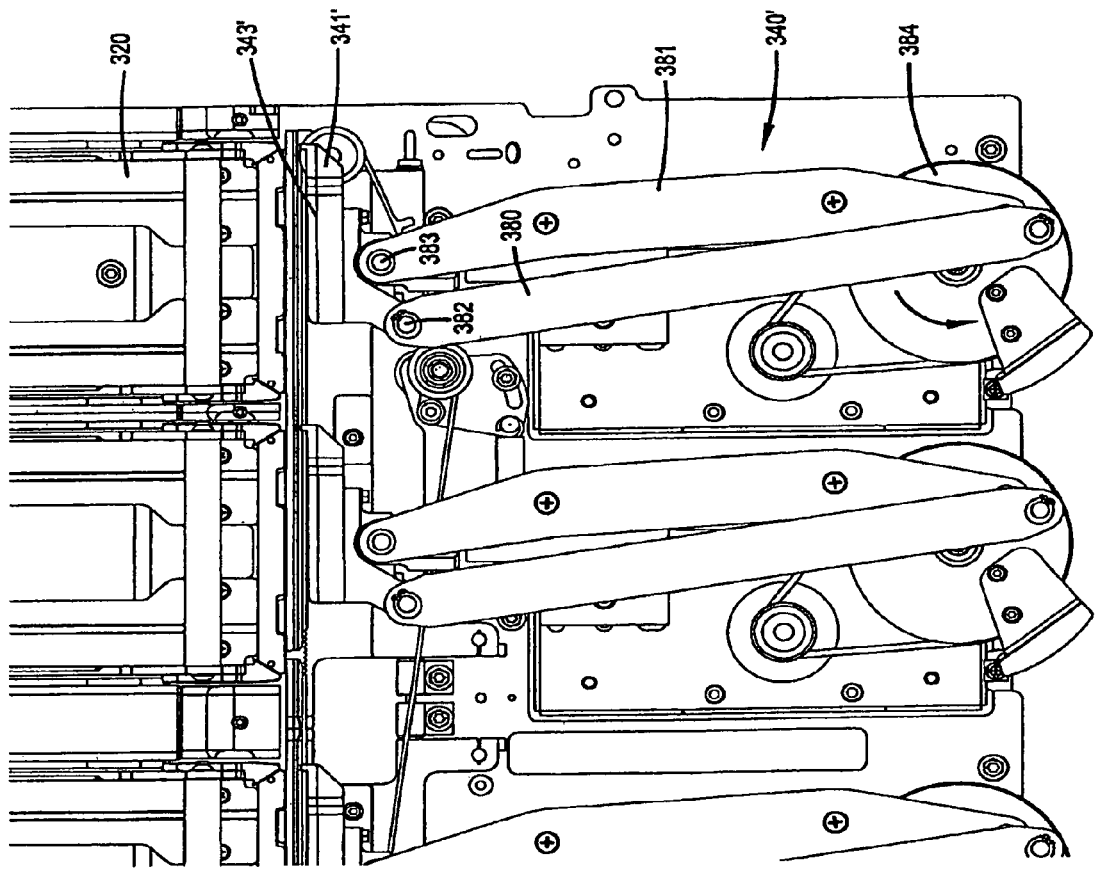
FIGS. 69, 70, and 71 illustrate an alternate embodiment of a card feeder mechanism in the output hopper.
Figure 70:
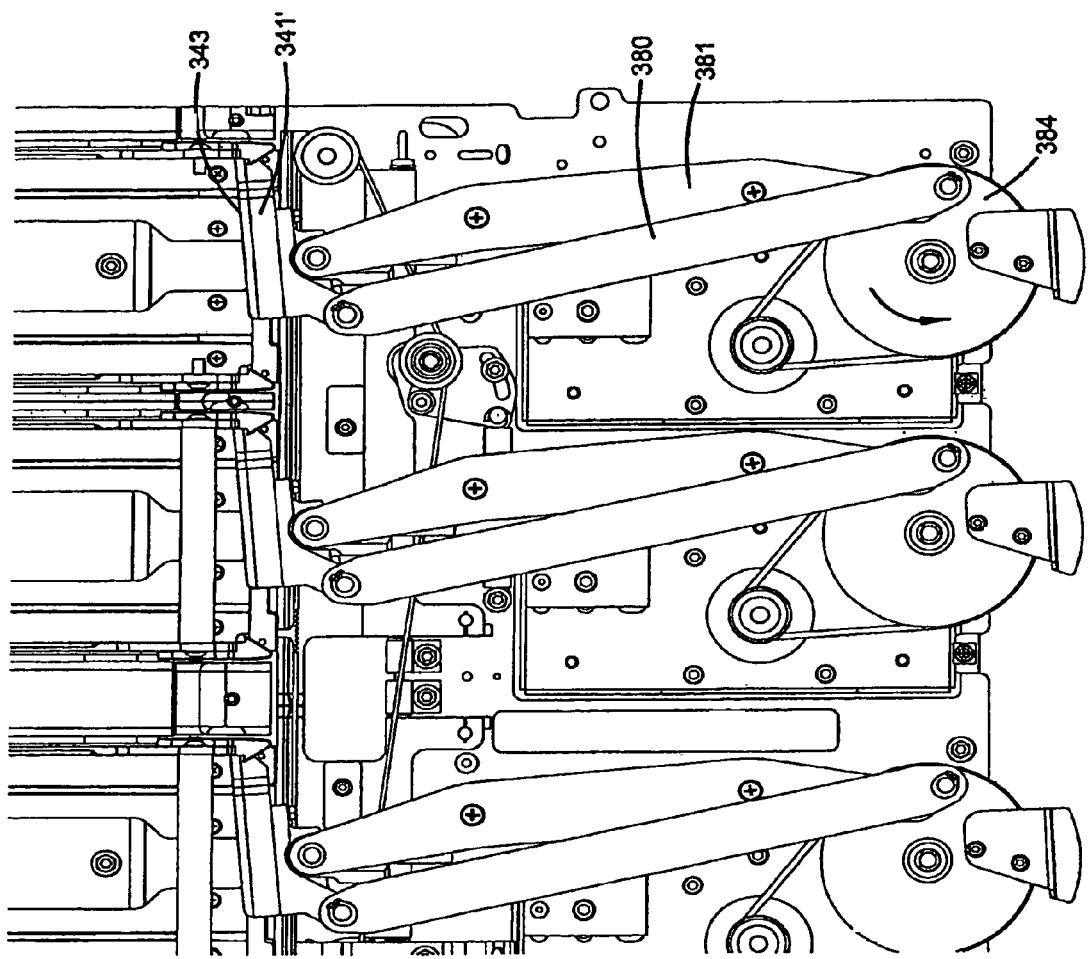
Figure 71:
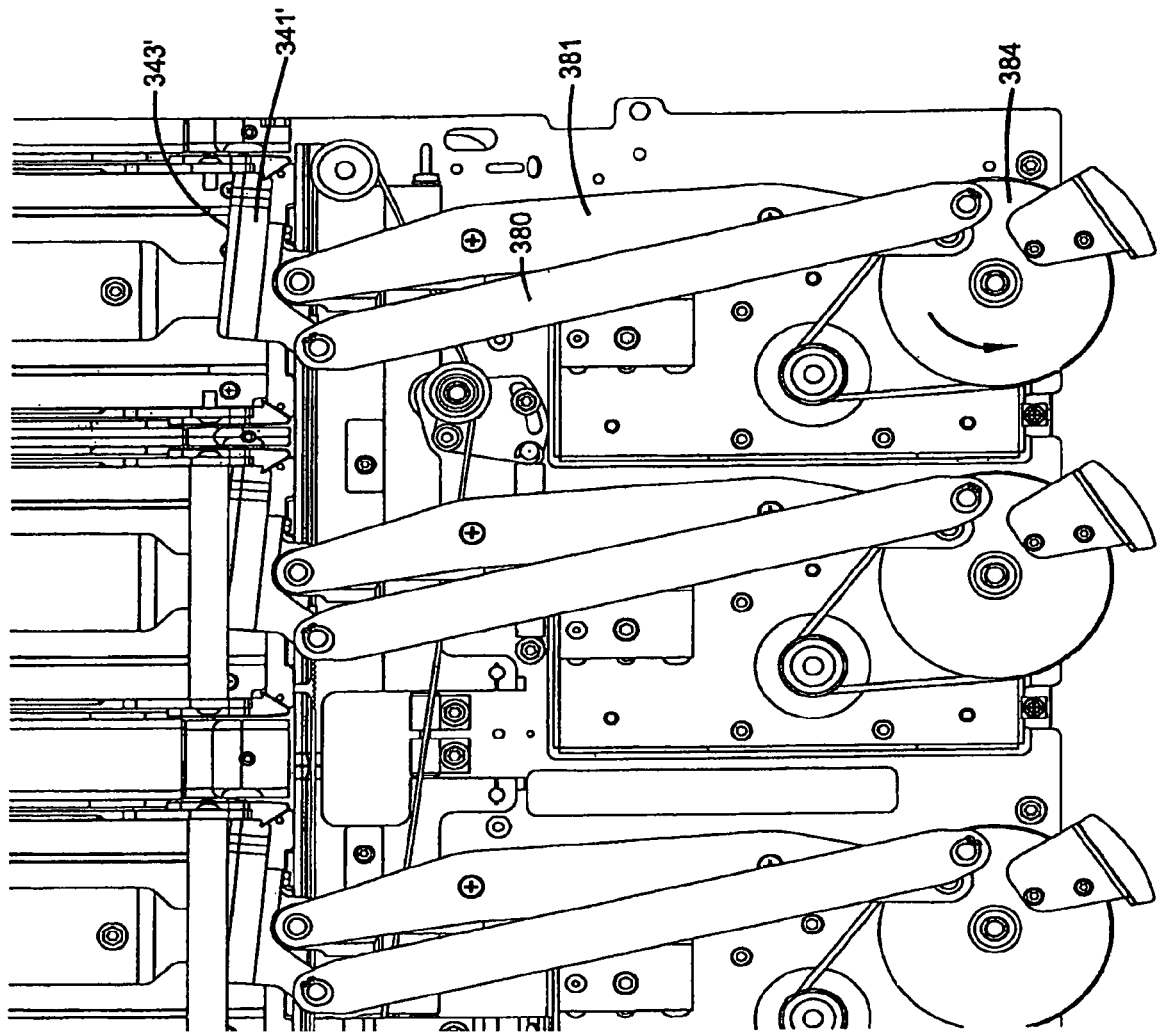

FIGS. 69-71 illustrate an alternate embodiment of a card feeder 340' for pushing cards into the collection trays 320, 320a. In this embodiment, the head portion 341' of the card feeder 340' has a planar surface 343' rather than a ramped surface 343. The head portion 341' is mounted to be tilted at an angle while pushing a card into a tray. The head portion 341' is connected to the end of link arms 380, 381 via pivots 382, 383, respectively. The opposite ends of the link arms 380, 381 are connected to a drive wheel 384 that is rotatable in a counterclockwise direction as viewed from above in FIG. 69.

At the home position of the card feeder 340' illustrated in FIG. 69, the head portion 341' and surface 343' are parallel to the card path. As illustrated in FIG. 70, rotation of the drive wheel 384 causes the head portion 341' to be pushed toward the tray. At the same time, the head portion 341' is titled by the link arms 380, 381 so that the surface 343' is disposed at an angle for pushing the card into the tray. Continued rotation of the drive wheel 384 drives the head portion 341' further toward the tray 320 while the link arms 380, 381 tilt the surface 343' in the opposite direction to complete the insertion of the card into the tray, as shown in FIG. 71. Once the card is inserted, the drive wheel 384 continues rotating back to the home position ready for another card insertion cycle.

Figure 35A:
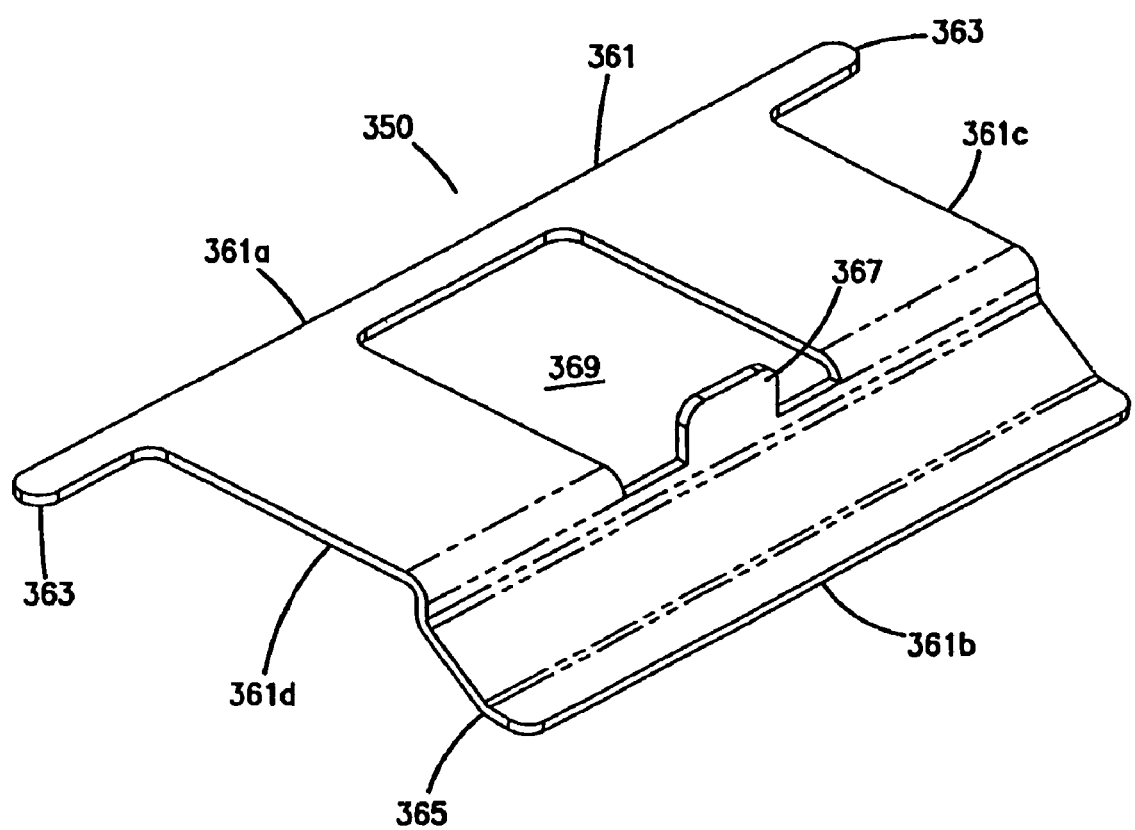
FIG. 35a represents a perspective view of one embodiment of a card in sensor bracket for the output hopper of FIG. 34 in accordance with the principles of the present invention.
Figure 35B:
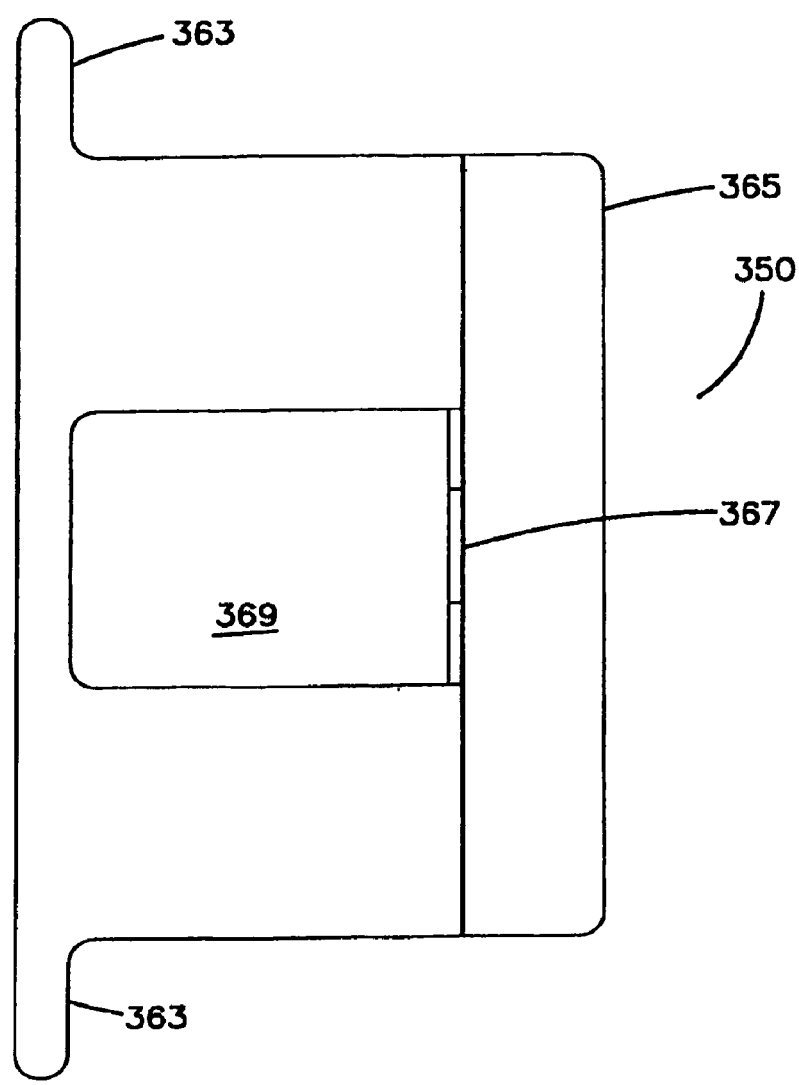
Figure 35C:
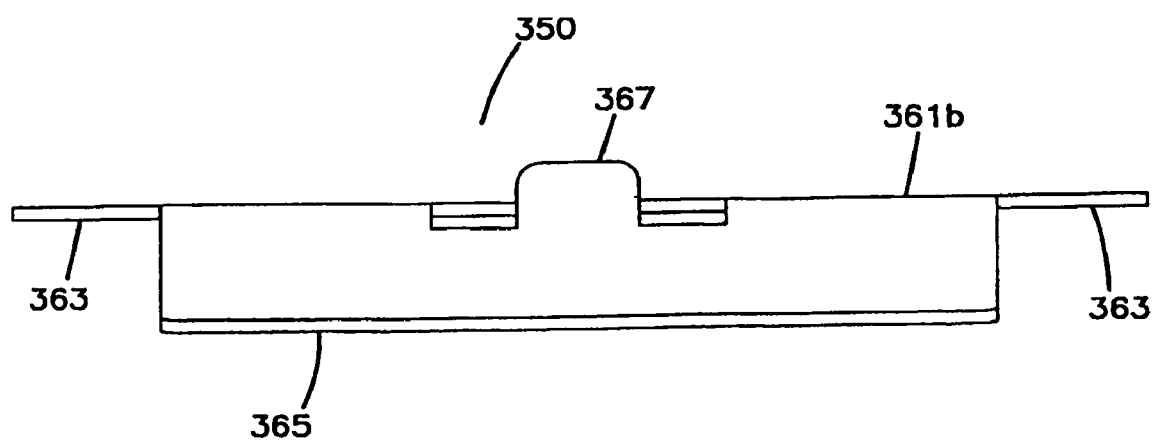
Figure 35D:
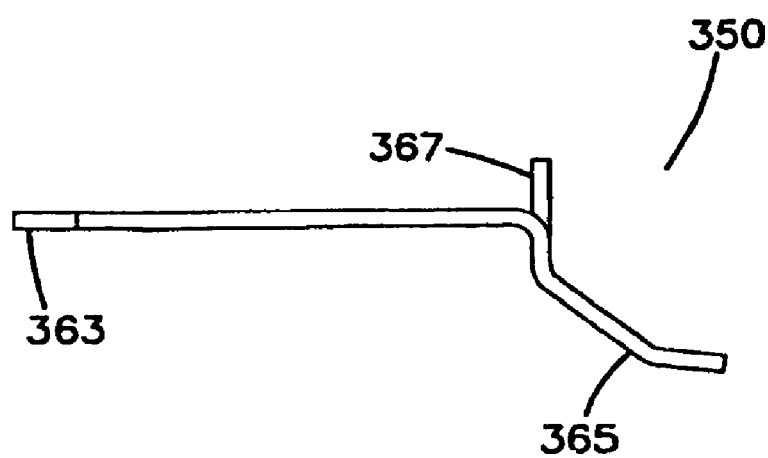

FIGS. 35a-35d illustrate one preferred embodiment of a card in sensor bracket 350. The card in sensor bracket 350 includes a substantially planar body 361 having a first end 361a, a second end 361b, and sides 361c, 361d. The first end 361 includes side flanges 363, and the second end 361b includes an angled flank 365. Each collection tray includes a sensor bracket, such as sensor bracket 350 as shown in FIG. 34. Each sensor bracket is connected to the frame 310, for example through a common mounting plate 357, and resides above the card path 351, so that processed cards may pass along the card path 351 under each sensor bracket 350. The sensor bracket includes a space 369 so that a suitable sensor (not shown) may be incorporated therein to sense a processed card waiting to be fed into a collection tray. A projection 367 extends substantially perpendicular from the planar body 361. FIGS. 35b-35d illustrate top, front, and side views of the sensor bracket, respectively.

It will be appreciated the output hopper of the present invention may also be configured to receive and exit cards in the card path of the system between other processing modules. This would allow for multiple output modules to exist within a card personalization system, where a disposed output module may operate between other processing modules.

In addition to other advantages, the output hopper of the present invention is cost effective and maximizes the number of card collection trays within the module space. The process of exiting cards utilizing the card feeder, card track and card collection trays of the present invention provides a fast, reliable method of exiting cards in a minimal amount of space. Card exiting features such as the ramped surface on the head portion of the card feeder, tongues on the lower track guides and the card tray retention members provide more reliability in feeding cards into collection trays. Further, the card in sensor bracket allows for an improved structure for sensors to sense a card as it is fed into a collection tray.

Magnetic Stripe Readhead Unit

FIGS. 42-45 illustrate a magnetic stripe readhead unit 500. Magnetic stripe readhead units read personalized information off of magnetic stripe portions residing on personalized cards. Typically, such magnetic stripe readhead units are mounted on frames and are disposed along the card path. The readhead units contact passing cards reading the information stored on the magnetic stripe. Typically, readhead units are used in card personalization systems for verifying that the correct personalized information is stored on the magnetic stripe of a card. If a card does not have a magnetic stripe or reading a magnetic stripe is not required, the card may be simply passed through the unit 500.

Although these designs may be suitable for their purpose, improvements may still be made upon a magnetic stripe readhead unit. There is still a need for a magnetic stripe readhead unit that provides sufficient clearance for cards, while maintaining suitable contact against the magnetic stripe of the card. In addition, a readhead unit mounting structure is needed that prevents unnecessary and undesirable movement of the readhead, while providing increased convenience in assembly and cost effective parts. The following description illustrates the features and improvements made upon existing designs of a magnetic stripe readhead unit in accordance with the principles of the present invention.

Figure 42:
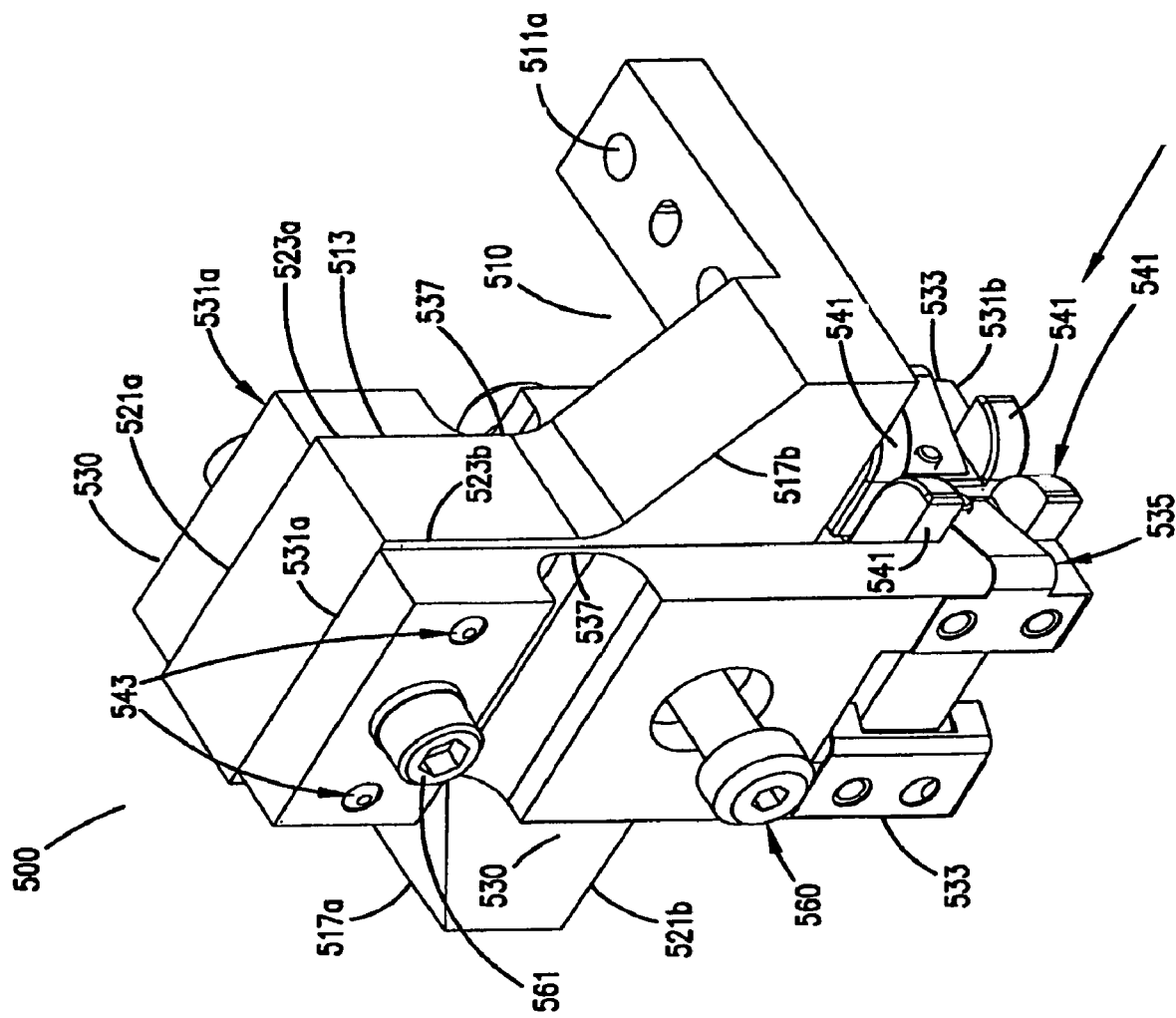
FIG. 42 represents a perspective view of one embodiment of a magnetic stripe readhead unit in accordance with the principles of the present invention.

FIG. 42 illustrates one preferred embodiment of a magnetic stripe readhead module 500, referred hereafter as reader unit. The reader unit 500 includes a frame 510 having a top 521*a*, a bottom 521*b*, sides 517*a*, 517*b*, and a front 523*a* and a back 523*b*. The side 517*b* defines a winged portion having a mounting projection 511 extending substantially perpendicular from the side 517*b* outward from the front end 523*a* of the frame 510. It will be appreciated that side 517*a* includes an identical structure and arrangement as the side 517*b*, in providing a symmetrical frame 510. The mounting projection 511 includes mounting holes 511*a*, which can enable fasteners such as screws to mount the frame 510 to another structure. For example, FIG. 34 illustrates a magnetic stripe reader unit mounted to the frame of the output hopper 50. Preferably, the reader unit 500 is mounted between a reject tray and the collection trays for correctly processed cards, such as shown in FIG. 34 (collection trays 320, 320*a*).

Both the front end 523*a* and the back end 523*b* include a readhead holder 530 mounted thereon. Locating pins 543 illustrated on the back end 523*b* provide alignment for the holder 530 to the frame 510, and enable the readhead to be accurately positioned without the need for added adjustments. As shown in FIG. 42, locating pins 543 are illustrated on the back 523*b*. However, it will be appreciated that the front end 523*a* includes the identical locating pin structure as the back end 523*b*. A shoulder screw 560 employs a compression spring (not shown) so a uniform force is applied by both readheads 550 (shown in 43) residing on the readhead holders 530.

Figure 43:
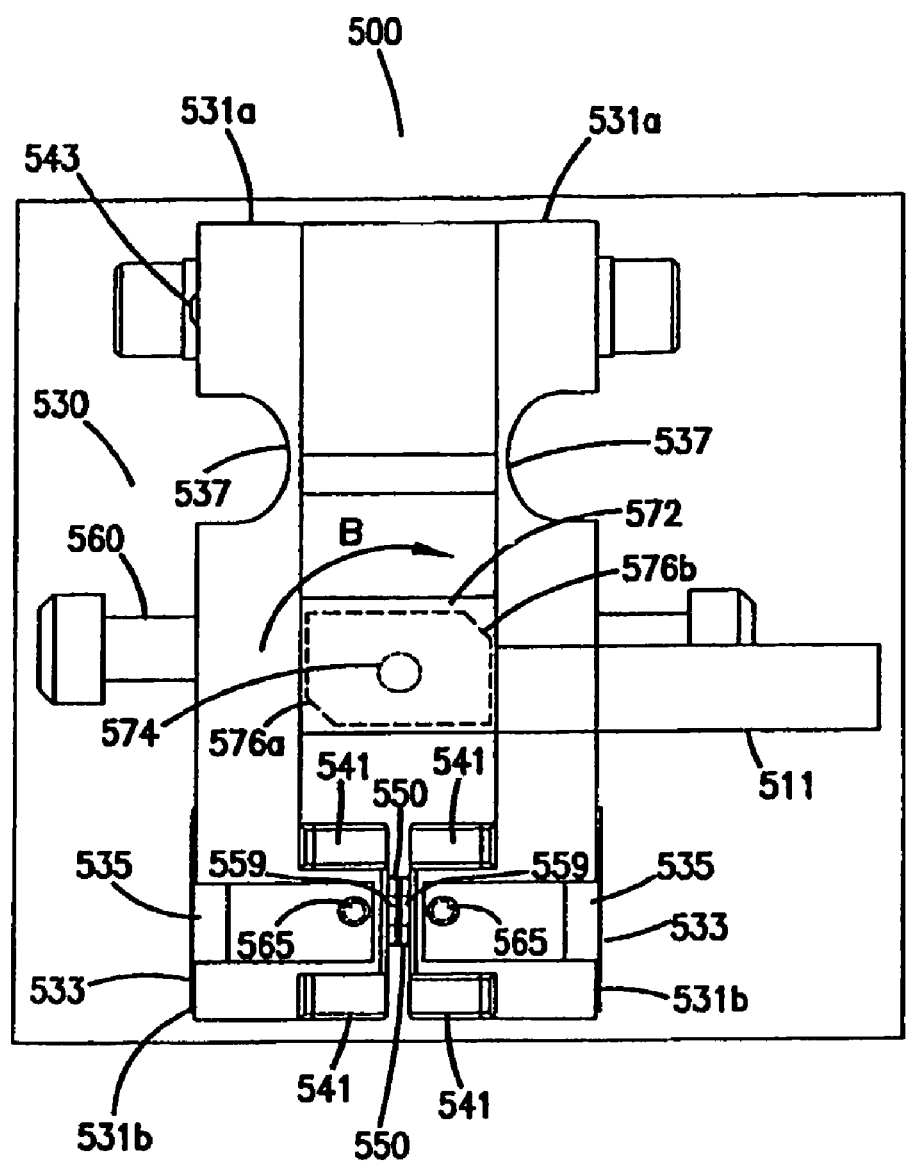
FIG. 43 represents a side view of the magnetic stripe readhead unit of FIG. 42.

Preferably, both readhead holders 530 include a top 531*a* and a bottom 531*b*. A fastener 561, such as a screw, resides toward the top 531*a*, and mounts the readhead holders 530 onto the frame 510. The bottom 531*b* of the readhead holder 530 includes a readhead support 533 having at least one card guide 541 disposed on sides of the readhead support 533. Further, a spring 535 disposed about the side of the readhead holder 530 biases the readhead 550 in the card travel direction indicated by arrow A. FIGS. 42 and 43 illustrate a spring 535, support 533 and card guides 541 on one side of the readhead holder 530. However, it will be appreciated that both readhead holders 530 include identical spring 535, readhead support 533 and card guide 541 structures. As best shown in FIG. 43, a readhead 550 is removably connected to the readhead holder 530 through pivot pins 565. The pivot pins 565 connect to the sides of the readhead holder 530 and are biased in the card direction by the springs 535.

Further, as best shown in FIG. 43, a cam mechanism 572 is fixed to a shaft 574, which is pivotally mounted within the frame 510. The shaft 574 can be operated between a first position (as shown in FIG. 43) and a second position (not shown) indicated by direction of arrow B. The first position, as shown in FIG. 43, the cam 572 is not in contact with the readhead holder 530, thereby enabling the reading of information on the card. As the shaft 574 is rotated in the direction of arrow B, the cam 572 also rotates so that areas 576*a*, 576*b* come into contact with the readhead holder 530 to pivot the readhead holder 530 away from the card track so that the readhead 550 and readhead portion 559 do not contact the card surface. In cases where a readhead module such as 500 processes cards without magnetic stripes, moving the head out of the card track is advantageous for the purpose of eliminating unnecessary wear of the readhead portion 559 of the readhead 550.

Figure 43A:
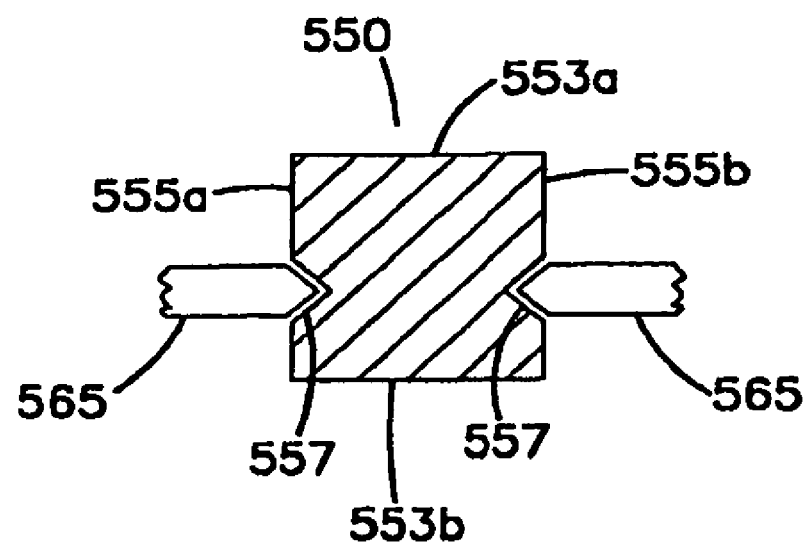
FIG. 43a represents a cross sectional view of one embodiment of a readhead in the magnetic stripe readhead unit of FIG. 43 in accordance with the principles of the present invention.

As best shown in FIG. 43*a*, a readhead 550 includes notches 557 in sides 555*a*, 555*b* of the readhead 550. The readhead 550 is pivotally connected to the pins 565 on each readhead holder 530 through the notches 557. Preferably, the readhead unit 500 can read on both the front 523*a* and back 523*b* sides. As above, a spring force biases the readhead in the card travel direction A, and is applied by springs, such as springs 535 of the readhead holder 530 shown in FIGS. 42 and 43.

Preferably, the readhead holders 530 are constructed of an at least partially flexible material, so that the holders 530 may bend outward from the frame 510 as a card travels through the readhead unit 500. However, the material of the readhead holder 530 preferably is rigid enough to prevent twisting relative to the face of the card to maintain suitable contact of the readhead portion 559 against a magnetic stripe located on a card. More preferably, the readhead holders 530 include a pivot region 537 disposed between the top 531*a* and the bottom 531*b*. The pivot region 537 includes portion of the readhead holder 530 that is thinner than the rest of the readhead holder. The pivot region 537 enables the readhead holder to bend at the pivot region 537 and function as a hinge. The pivot region 537 can bend enough to allow clearance of cards passing through the reader unit 500. Preferably, the readhead holders 530 may bend while still maintaining suitable contact of the readhead portion 559 against a magnetic strip located on a card.

Figure 44:
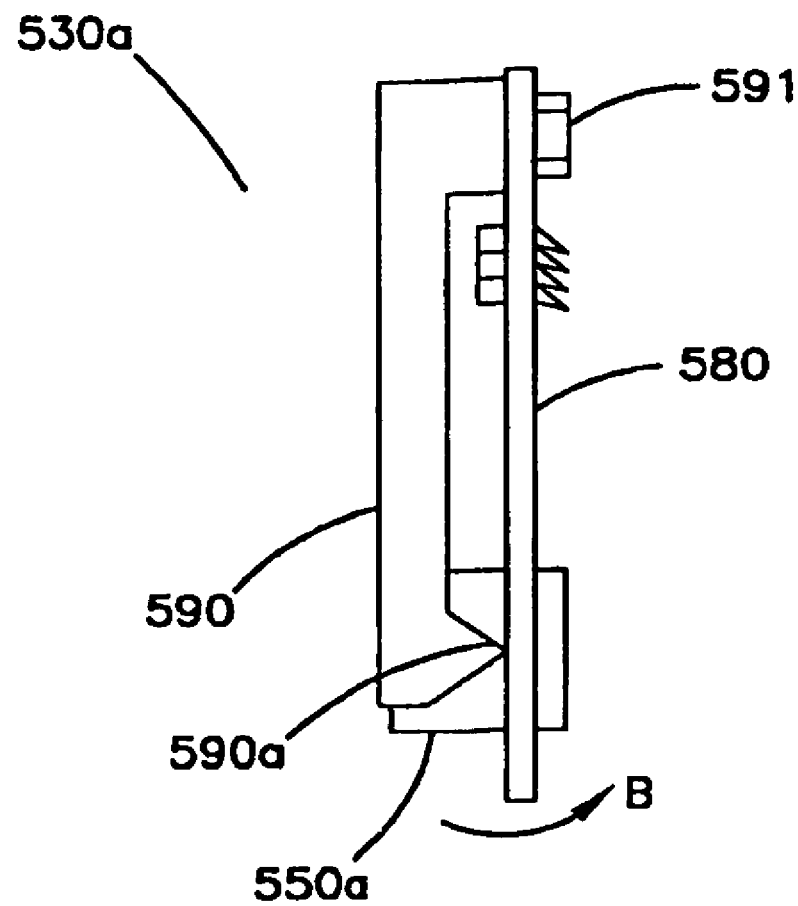
FIG. 44 represents a side view of one embodiment of a readhead holder in accordance with the principles of the present invention.

FIG. 44 illustrates another preferred embodiment of a readhead holder. The readhead holder 530*a* includes a rigid frame 590 having a resilient plate 580. Pointed ends 590*a* of the rigid frame 590 contact against the plate 580. Preferably, the pointed ends 590*a* rest directly against the plate 580. A readhead 550*a* is mounted on the plate 580. The plate 580 is mounted onto the frame 590 through a fastener 591, such as a screw or bolt. The plate 580 constrains movement of the readhead 550a in the card travel direction and in a direction upwardly and downwardly perpendicular to the card travel direction. Further the plate 580 may resiliently bend to and from the magnetic stripe of the card to allow clearance of passing cards, while maintaining suitable contact with its read portion against the magnetic stripe of passing cards.

Figure 45A:
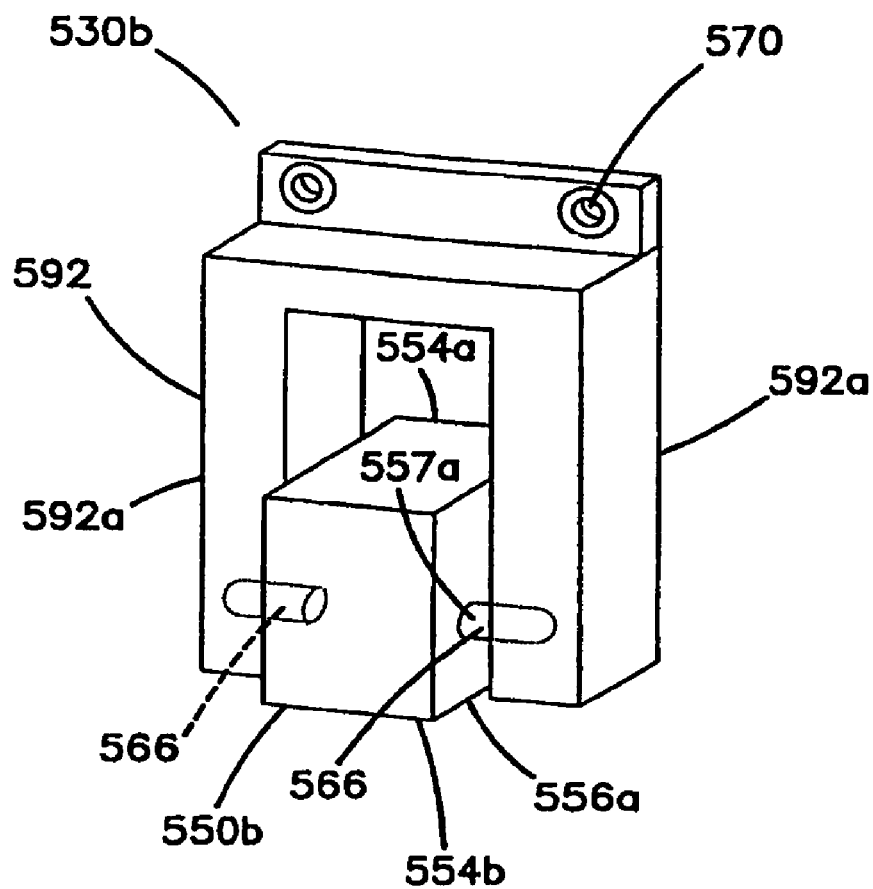
FIGS. 45a-c illustrate an alternative embodiment of a readhead and a readhead holder.
Figure 45B:
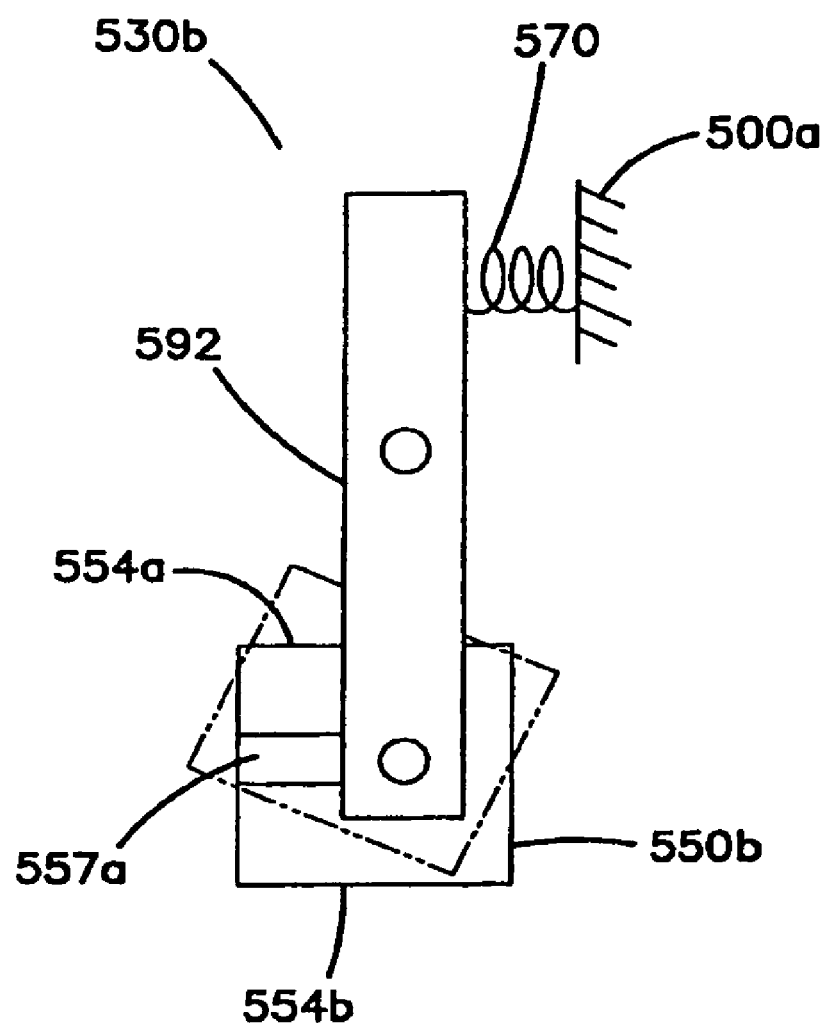
Figure 45C:
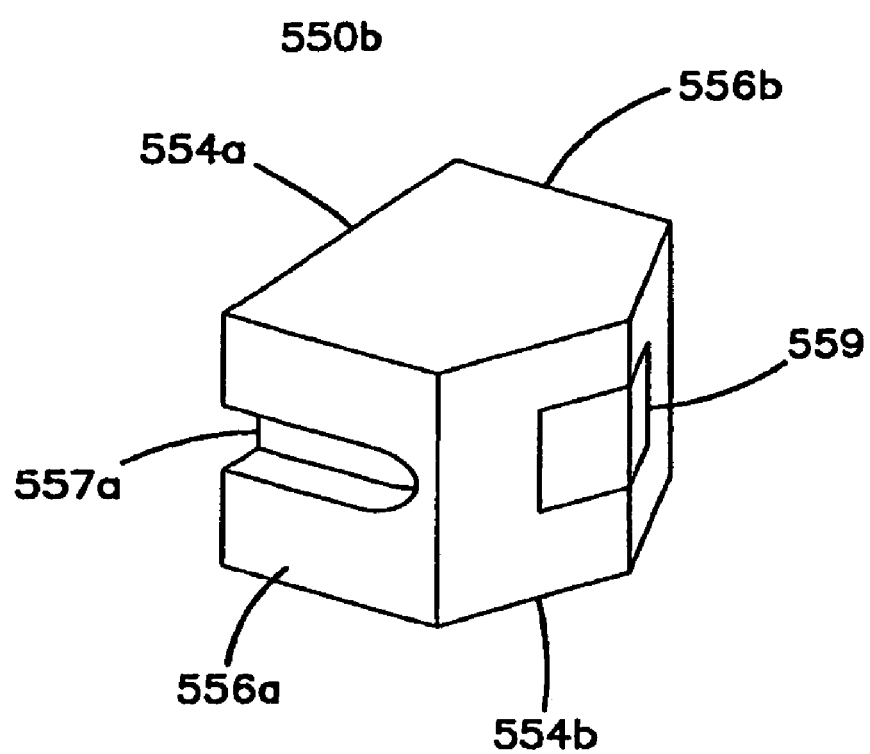

In another embodiment of a readhead holder, FIGS. 45a-c illustrate a readhead holder 530b having a frame 592 that includes supports 592a. The supports 592a include pins or bellows 566 that are operatively connected to the readhead 550b at the slotted notch 557a (also shown in FIG. 45c). The readhead 550b is rotatably connected to the readhead holder 530b through the pins 566 (FIG. 45b). As best shown in FIG. 45b, the readhead holder 530b can be operatively connected to a frame of a readhead unit schematically depicted as 500a. Preferably, the readhead holder 530b is connected to the frame 500a, and is biased using a spring 570 (FIG. 45b). FIG. 45c illustrates the readhead 530b that includes a top 554a and a bottom 554b. The slotted notch 557a is shown disposed on the side 556a. It will be appreciated that side 557b includes an identical slotted notch as side 557a.

In addition to other advantages, the readhead unit 500 provides improved frame structures and supports for constraining movement of a readhead while still maintaining suitable contact against the magnetic stripe of passing cards. Further, the readhead unit of the present invention provides a structure that is convenient to assemble, and eliminates the need for adjustments. In addition, the readhead unit provides an easily replaceable readhead without replacing the entire readhead unit. The design offers unit that occupies minimal space, having few parts, and is cost effective.

Figure 72:
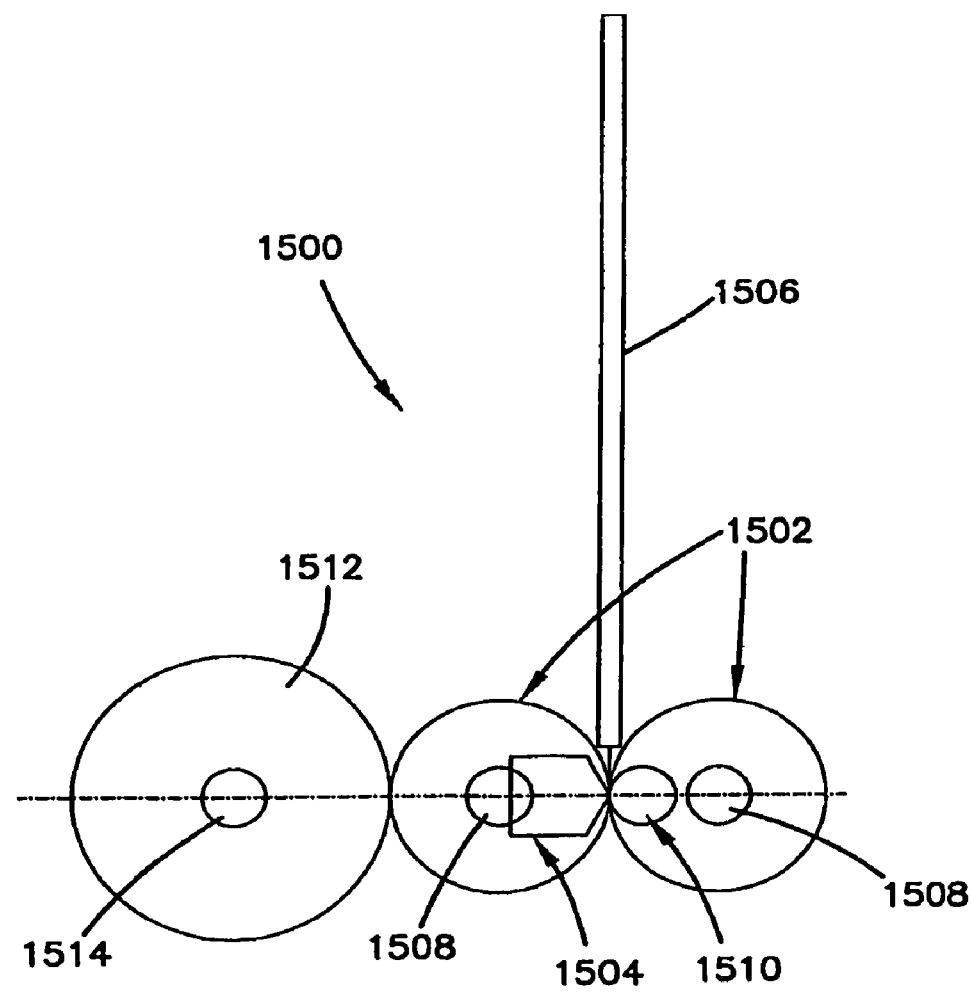
FIG. 72 is a top view of an alternative embodiment of a magnetic stripe reader that can be used in the output hopper.

An alternative embodiment of a magnetic stripe reader 1500 for use in the output hopper 50 is illustrated in FIG. 72. The reader 1500 could be used in other modules as well for reading the magnetic stripe on the card. The reader 1500 is designed to reduce or eliminate vibrations of the card as the magnetic stripe is being read by the readhead, thereby making data recovery from the magnetic stripe by the readhead more reliable.

One source of these vibrations comes from the use of rigid upper and lower card guide means. The upper and lower card guide means can never be exactly parallel to each other or the surfaces are not flat with the result that there is a space between the card and the guide means at one end or the other. This space allows the end of the card to move up and down at that end resulting in similar forward/backward motion of the card at the readhead. This makes accurate timing of the data difficult and reduces the reliability of the reading function.

In the past, problems of this type have been eliminated or reduced by using a compliant bias spring member at either the top or bottom card guide means. This compliant bias spring member contacts the card along the entire edge thereby reducing or eliminating any space between the card and the guide means. However, in some cases it is not possible to use compliant bias spring members, or additional card motion stability may be required.

In the reader 1500 illustrated in FIG. 72, a pair of rubber rollers 1502 are mounted below the readhead 1504, one roller 1502 at the front of the card 1506 and one roller 1502 at the back of the card. The rollers 1502 are mounted on suitable bearings on fixed pins 1508. In addition, a roller 1510 is mounted opposite the readhead 1504. The readhead 1504 and roller 1510 are preferably mounted in one of the previously described holders, for example one of the holders 530, 530a, or 530b.

The centers of the rollers 1502 are spaced apart a distance to provide compression of the rubber of the rollers 1502. As a result, there is some resistance to the card 1506 as it passes through the rollers 1502. This results in a damping effect on the motion of the card thereby eliminating or reducing rapid motion changes in the card relative to the readhead 1504 with an increase in read reliability.

An additional rubber roller 1512 also with a suitable bearing on a fixed pin mount 1514 can optionally be used. The roller 1512 is spaced from the roller 1502 it contacts to provide compression of the rubber. The additional roller 1512 contributes more damping and smoothing of the card motion relative to the readhead 1504. In this case, it has been found that the variations in motion of the card are reduced from about 25% to 5%, and the read reliability was increased from 1 error in 20 cards to 1 error in 10,000 cards.

Magnetic Head

The present invention also includes improvements relating to magnetic heads that are used for writing or recording data to, and reading data from, magnetic stripes on the cards.

In one improvement, a chip having memory is placed in the magnetic head, such as the magnetic head of the write unit 144 or the magnetic head of the read unit 146, or on the readhead 550. Placing a chip in the magnetic head allows the system 10 to access information about the head, such as part number, capabilities, install date, number of cards passed by the head, etc. This information can be used, for example, to initiate maintenance, and to keep track of magnetic head service life and performance. This information can be very useful to improve reliability of a module incorporating the head and therefore the system as, a whole. This type of information is very difficult to obtain by conventional means as it requires manual entry and correlation to each specific head, and heads could easily be exchanged invalidating the data or leading to wrong conclusions.

Figure 54:
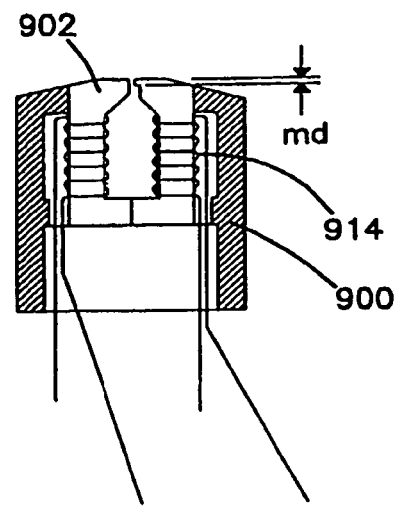
FIG. 54 illustrates a prior art magnetic head.

In another improvement, the magnetic head can include wear detection capability. In magnetic heads that are commonly used for recording, wear takes place as cards are repeatedly passed by in contact with the face of the head. A conventional magnetic head 900 is illustrated in cross-sectional side view in FIG. 54. The magnetic performance of a head changes slightly for the better as it wears down but it becomes more difficult to maintain good contact with the card as the head wears. As the flat area 902 from wear gets larger, small changes in the angular alignment between the head and the card will move the center of the head out of intimate contact with the card leading to performance degradation. Also, once the head has worn down to the bottom of the magnetic depth md (typically less than 0.02 inches) further wear produces a sudden failure of the head.

The inclusion of a wear indicator sensor in a magnetic head would allow the head to be replaced before sudden failure, or on a regular service interval since advance warning would be provided by the sensor. When the head is new, the value of the head is calibrated and then recorded in the system 10, or the module in which the head is utilized, or loaded into a memory chip provided in the head as discussed above. As the head wears, the value of the head changes, and based on a set value, notification would be made to the system 10 that the head should be serviced within a set period of time.

Figure 56:
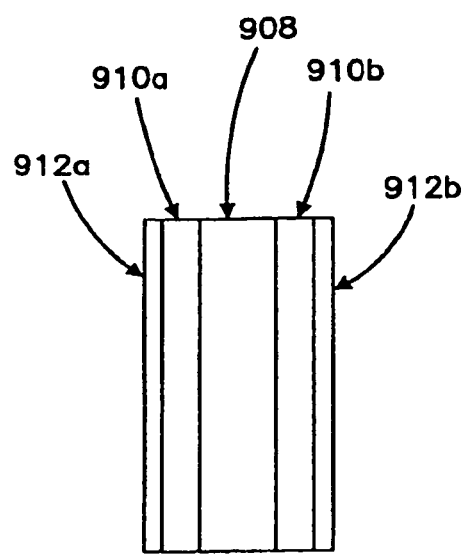
FIG. 56 is an edge view of the resistance wear sensor of FIG. 55.
Figure 55:
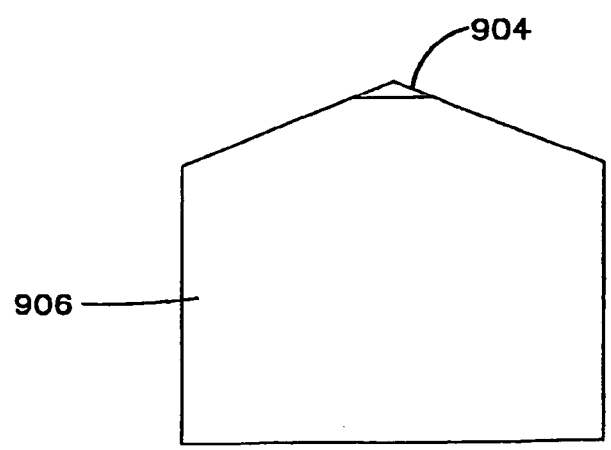
FIG. 55 is a side view of a magnetic head having a resistance wear sensor.

In the preferred embodiment, illustrated in FIGS. 55 and 56, a sensor 904 is placed at the contact face of a magnetic head 906. A semi-conducting material 908 is placed between two layers of conductive material 910a, 910b, that are surrounded by electrical insulators 912a, 912b. The resistance measured across conductive material 910*a* and 910*b* depends on the area of the semi-conducting material 908 so that as material 908 is worn away, the resistance will increase. In this way, head wear can be measured that closely resembles the mechanical wear of the head 906.

In an alternate embodiment, suitable materials are used to create a capacitive element for monitoring head wear. In yet another embodiment, an external circuit is used to measure the inductance of the electrical winding 914 used for writing or reading during idle times of the machine cycle. Inductance will change slowly as the head wears but will then change rapidly as the magnetic bottom is worn through.

Cleaning Module

FIGS. 57-60 illustrate a cleaning mechanism 1000 of a cleaning module that forms one of the modules 40 within the system 10. The cleaning module, via the cleaning mechanism 1000, is designed to clean both sides of the card in order to remove contaminants from the card surfaces. Contamination, such as foreign particles, dirt and oil, on the card surfaces can interfere with a personalization task and degrade the resulting quality of the personalization. The cleaning module is preferably located before the graphics module 600 and the laser module 700, because the tasks performed by these modules are particularly susceptible to card contamination. However, the cleaning module could be located at any location in the system 10 downstream from the input hopper 30. In addition, the system 10 could utilize more than one cleaning module.

Many conventional cleaning modules and cleaning mechanisms used therein include a pair of cleaning rollers between which a card is passed to remove contaminates from each side of the card. The contaminates are thereafter removed from the cleaning rollers using stripper tape that contacts each cleaning roller to strip or remove the contaminates from the rollers. An example of a conventional cleaning module and cleaning mechanism is disclosed in U.S. Pat. No. 5,401,111. The stripper tape is typically provided from a supply roll, and after stripping contaminates from the rollers, is wound onto a take-up roll. Thus, stripper tape is a consumable item that needs periodic replacement.

To extend the life of the stripper tape, the tape is often re-used by taking the used tape of the take-up roll and using it as the supply roll. This has disadvantages because it requires user intervention in order to physically remove the take-up roll and place it onto the supply roll spool for re-use.

The cleaning mechanism 1000 is designed to resolve this and other deficiencies of conventional card cleaning mechanisms. The cleaning mechanism 1000 is designed to automatically re-use stripper tape 1002 before the stripper tape is wound onto a take-up roll 1004. Thus, the life of a supply roll 1006 of the stripper tape is extended, which reduces the frequency with which user intervention with the cleaning mechanism 1000 is required.

Figure 57:
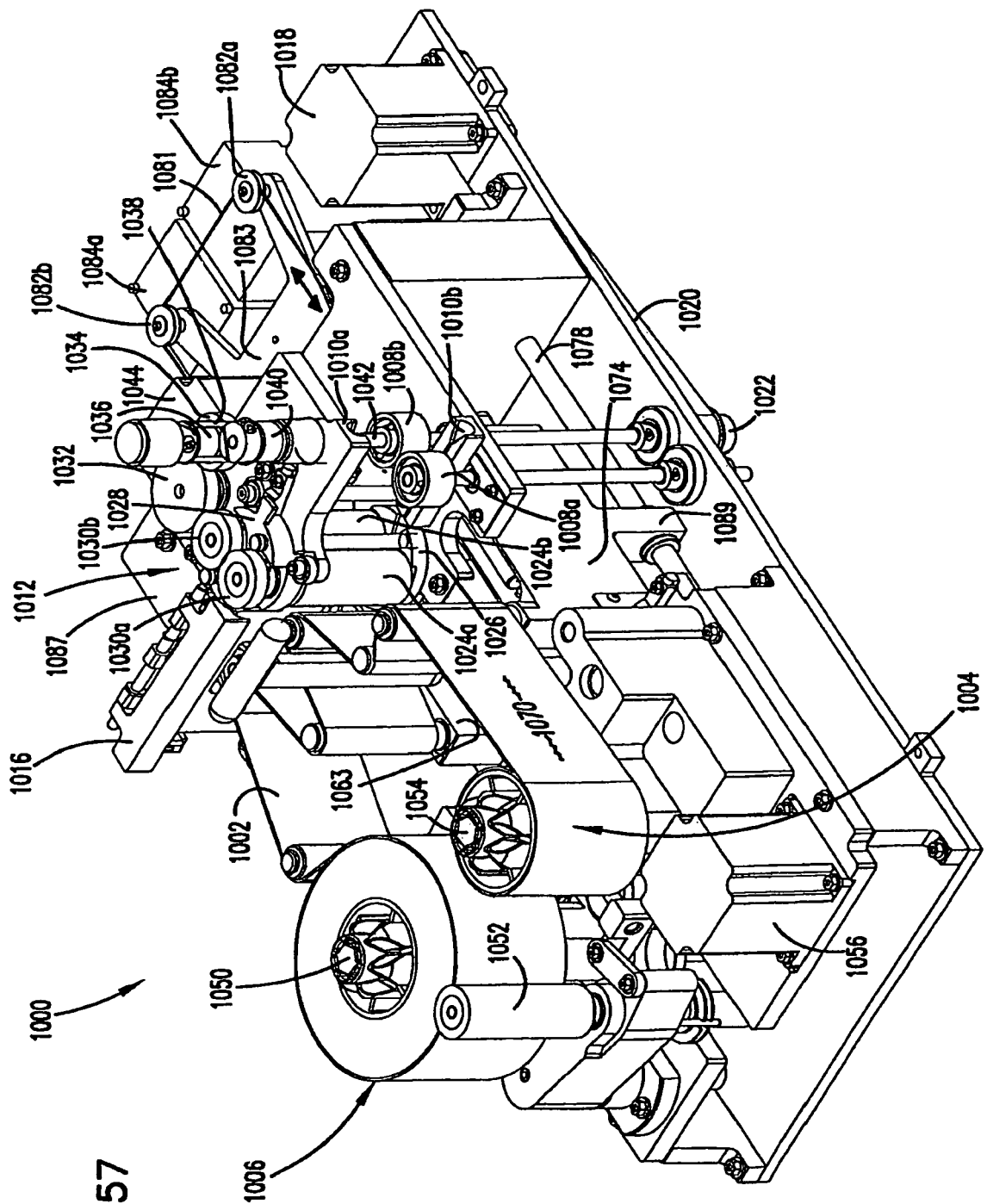
FIG. 57 is a perspective view of the cleaning mechanism within the cleaning module in accordance with the principles of the present invention.

Turning now to FIG. 57, the specifics of the cleaning mechanism 1000 will be described. A pair of input rollers 1008*a*, 1008*b* are provided at the entrance to the module to receive cards from an upstream module and drive the cards into the cleaning mechanism 1000. Upper and lower input guides 1010*a*, 1010*b* help guide the cards into the nip between the rollers 1008*a*, 1008*b* and define upper and lower card tracks that define a card path leading to a cleaning roller assembly 1012.

Figure 58:
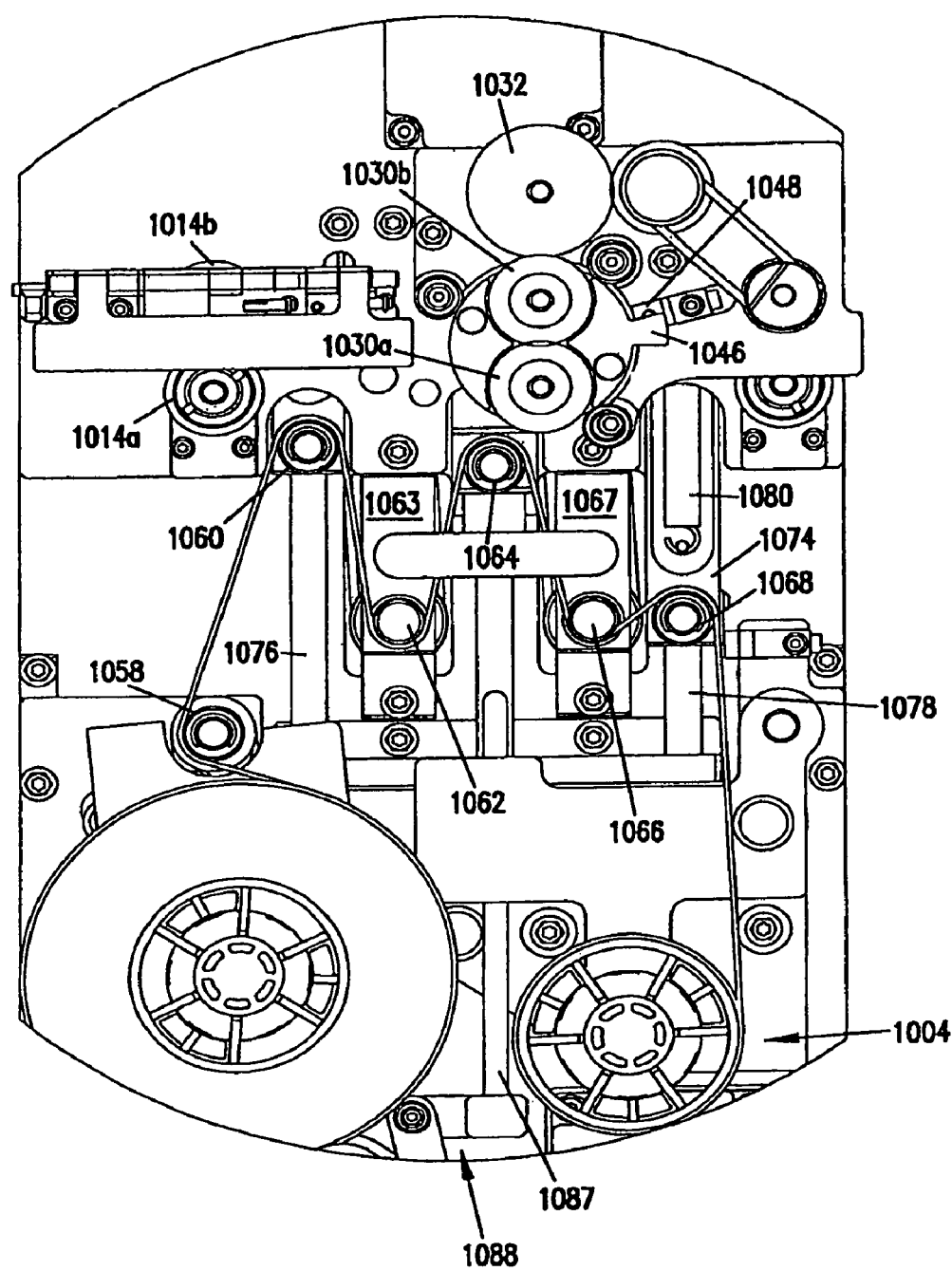
FIG. 58 is a top view of the cleaning mechanism in a stand-by operational state.
Figure 59:
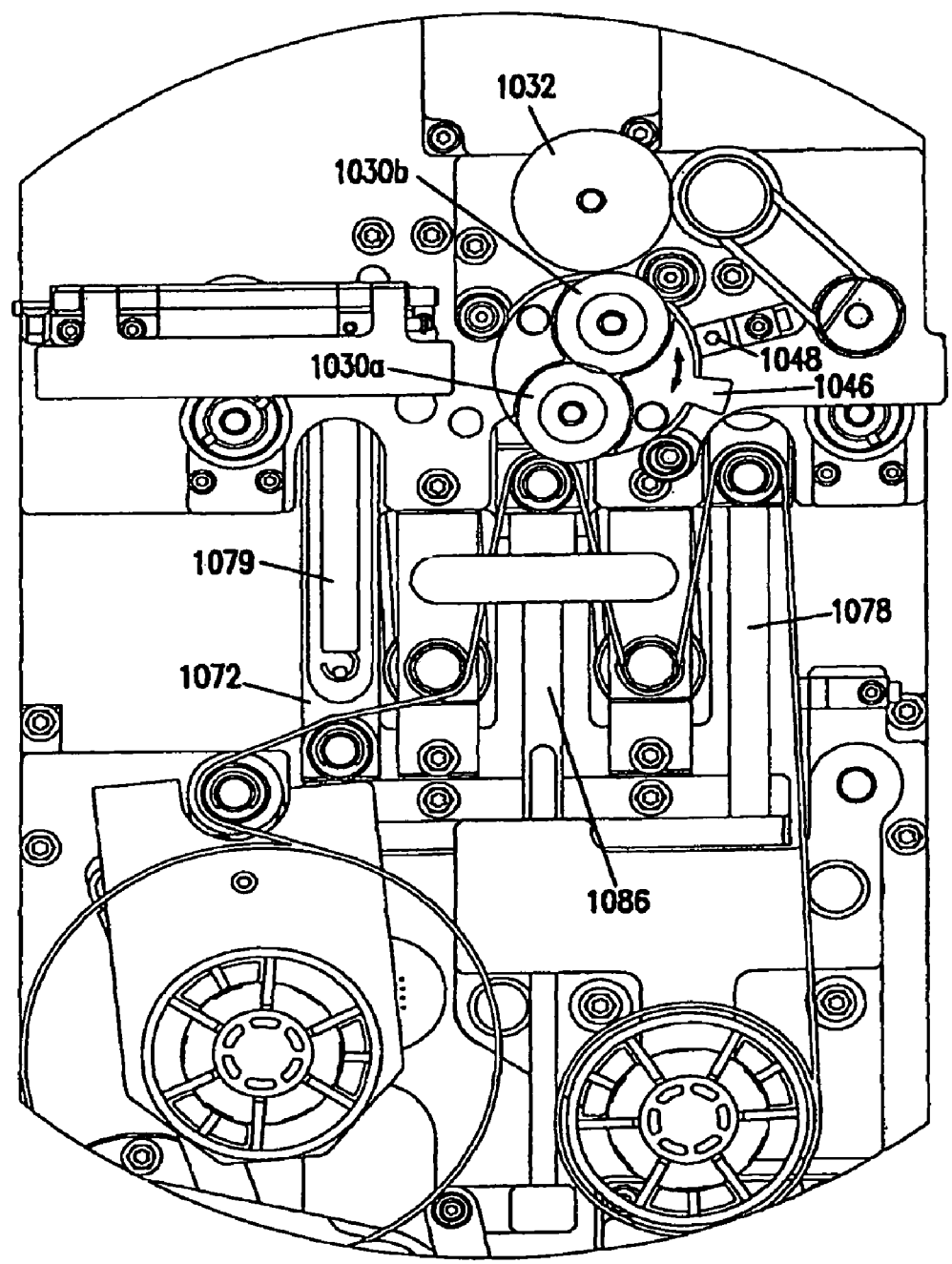
FIG. 59 is a top view of the cleaning mechanism in a cleaning state.
Figure 60:
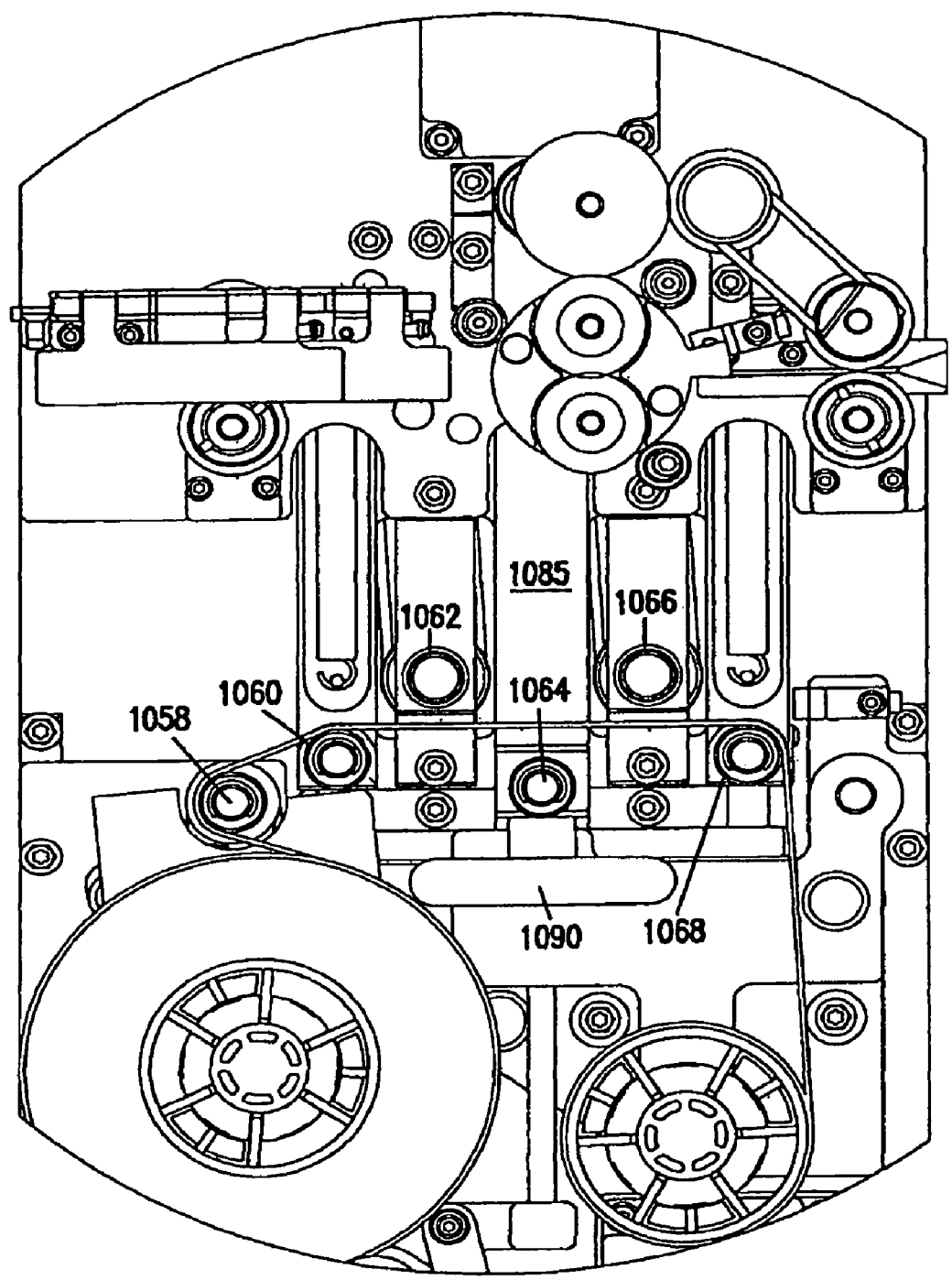
FIG. 60 is a top view of the cleaning mechanism in a tape replacement state.

A pair of output rollers 1014*a*, 1014*b*, illustrated in FIGS. 58-60, are provided adjacent the exit side of the mechanism 1000 for driving cards from the cleaning module on to the next module. An upper card guide 1016 and a lower card guide (not shown) disposed opposite the guide 1016 guide the cards as they exit the roller assembly 1012 and define a card path leading to the exit of the module.

As shown in FIG. 57, the input rollers 1008*a*, *b* and the output rollers 1014*a*, *b* are driven by an electric motor 1018, for example a stepper motor, via a drive belt 1020 and pulley 1022 for the rollers 1008*a*, *b* and a similar drive belt and pulley (not shown) for the rollers 1014*a*, *b*. The input rollers 1008*a*, *b* and output rollers 1014*a*, *b* are preferably driven at the same speed, for a reason which will become apparent below.

The input rollers 1008*a*, *b* drive cards into the cleaning roller assembly 1012 which includes a pair of cleaning rollers 1024*a*, 1024*b* (FIG. 57). Cards pass through the nip of the cleaning rollers 1024*a*, *b* so that the roller 1024*a* contacts one side of the card and the roller 1024*b* contacts the other side of the card. The outer surfaces of the cleaning rollers 1024*a*, *b* are tacky or sticky so that contaminates on the card surfaces are picked up by, and adhere to, the cleaning rollers. The use of cleaning rollers having tacky outer surfaces is described in U.S. Pat. No. 5,401,111. The diameter of each roller 1024*a*, *b* is selected so as to be approximately equal to, or greater than, the length of the card, so that outer surface portions of the rollers that have already contacted a portion of the card do not rotate around to contact another portion of the card.

With continued reference to FIG. 57, the cleaning rollers 1024*a*, *b* are mounted for rotation on a turret body that includes a lower turret plate 1026 and an upper turret plate 1028. Each turret plate defines a track therein for guiding the upper and lower edges of the cards as the cards travel through the rollers 1024*a*, *b*. Drive wheels 1030*a*, 1030*b*, which are in driving engagement with each other, are connected to the rollers 1024*a*, *b*, respectively, for driving the rollers 1024*a*, *b* in synchronous, opposite rotation. The drive wheels 1030*a*, *b* are preferably rubber wheels, although other drive wheel types could be used. The drive wheels 1030*a*, *b* are driven by a drive chain that includes a driving wheel 1032, for example a rubber wheel, in driving engagement with the drive wheel 1030*b*, a rubber wheel 1034, a first pulley 1036 connected to the wheel 1034, a belt 1038, and a second pulley 1040 that is connected to and driven by a shaft 1042 extending from the input roller 1008*b*. As a result, the rotation of the cleaning rollers 1024*a*, *b* is synchronized with, and at the same rotational speed as, the rotation of the input rollers 1008*a*, *b* and the output rollers 1014*a*, *b*. Therefore, as a card is driven by the input rollers 1008*a*, *b* into the cleaning rollers 1024*a*, *b*, and from the cleaning rollers into the output rollers 1014*a*, *b*, a smooth transition of the card is achieved.

The turret body comprising the turret plates 1026, 1028 is rotatable about a central longitudinal axis through the center of the plates 1026, 1028, with the axis extending parallel to the longitudinal axes of the cleaning rollers 1024*a*, *b*. The cleaning rollers 1024*a*, 1024*b*, which are rotatably mounted on the plates 1026, 1028, rotate with the plates 1026, 1028. Rotation of the turret body is used to disengage the drive connection between the drive wheel 1030*b* and the driving wheel 1032, and to position the cleaning rollers 1024*a*, 1024*b* for subsequent engagement by the stripper tape 1002 to remove contaminates from the cleaning rollers. The turret body is rotated by an electric motor 1044, for example a stepper motor, through a suitable drive mechanism, such as a belt and pulley, that is connected to a shaft that extends downwardly from the turret plate 1026. An example of a mechanism for rotating a turret body is disclosed in U.S. Pat. No. 5,401,111.

A tab 1046 is connected to the upper turret plate 1028, as shown in FIGS. 58-60. A sensor 1048 senses the tab 1046 to determine a home position of the turret body. The home position of the turret body is illustrated in FIG. 58, where it is seen that the sensor 1048 will sense the tab 1046. Removal of contaminates from the cleaning rollers 1024*a, b* occurs by rotating the turret body either clockwise or counterclockwise from the home position. Preferably, the turret body is rotated to a first cleaning position so that contaminates are first removed from the cleaning roller 1024*a*, followed by rotation of the turret body to a second cleaning position to remove contaminates from the cleaning roller 1024*b*.

In order to remove contaminates from the cleaning roller 1024*a*, the turret body is first rotated in a clockwise direction by the motor 1044 to the first cleaning position shown in FIG. 59. In the first cleaning position, the driving wheel 1032 is no longer engaged with the drive wheel 1030*b*, thereby disengaging the cleaning roller drive mechanism and preventing the cleaning rollers from being driven. After the cleaning roller 1024*a* is cleaned, the turret body is then rotated approximately 180 degrees in a counterclockwise direction from the position shown in FIG. 59 to the second cleaning position. In the second cleaning position, the cleaning roller 1024*b* occupies the position formerly occupied by the cleaning roller 1024*a* in the first cleaning position, and the first cleaning roller occupies the position formerly occupied by the second cleaning roller. As with the first cleaning position, at the second cleaning position the driving wheel 1032 is not engaged with either drive wheel 1030*a* or 1030*b*, so that the cleaning rollers cannot be driven. After the cleaning roller 1024*b* is cleaned, the turret body is rotated, preferably in a counterclockwise direction, back to the home position, at which point another card can be driven into the cleaning rollers 1024*a, b* for cleaning.

Details of the stripper tape 1002 and the movements thereof will now be described with reference to FIGS. 57-59. The stripper tape 1002 is supplied from the supply roll 1006 and used stripper tape is wound onto the take-up roll 1004. The supply roll 1006 is disposed on a non-driven, rotatable spindle 1050 which rotates when stripper tape 1002 is pulled from the roll 1006. An encoder is connected to the spindle shaft to detect supply roll rotation and predict the amount of tape remaining on the roll. A capstan roller 1052 is biased against the outer surface of the supply roll 1006 to resist rotation of the supply roll 1006. The take-up roll 1004 is disposed on a spindle 1054 that is rotatably driven by an electric motor 1056, for example a stepper motor. When it is time to take-up a portion of used stripper tape 1002, the electric motor 1056 is actuated to rotate the spindle 1054 thereby causing rotation of the take-up roll 1004 to wind a specific amount of used stripper tape onto the take-up roll.

Turning to FIG. 58, which shows a stand-by position of the stripper tape, it is seen that the stripper tape leads from the supply roll 1006 and initially passes around a fixed guide roller 1058, then around a first movable roller 1060, around a first rotatable tape drive roller 1062, around a movable backing roller 1064, around a second rotatable tape drive roller 1066, and finally around a second movable roller 1068 before proceeding to the take-up roll 1004. The stripper tape 1002 has one surface 1070 (shown in FIG. 57) that is coated with a substance that is more adhesive than the surface of the cleaning rollers 1024*a, b*. The adhesive surface 1070 is arranged to face away from the backing roller 1064 so that it faces the cleaning rollers 1024*a, b*. By contacting the adhesive surface 1070 with the outer tacky surface of the cleaning rollers, contaminates are removed from the cleaning rollers so that the cleaning rollers can perform a cleaning operation on a new card.

With reference to FIGS. 58 and 59, the movable rollers 1060 and 1068 are mounted on slide blocks 1072, 1074, respectively, which are each slidably supported on a pair of rods 1076, 1078, respectively. Only one rod of each pair is visible in the drawings. The roller 1060 is therefore movable along the axes of the rod pair 1076 with the slide block 1072 between the position shown in FIG. 58 and the position shown in FIG. 59. Likewise, the roller 1068 is movable along the axes of the rod pair 1078 with the slide block 1074 between the position shown in FIG. 58 and the position shown in FIG. 59. A spring 1079 (see FIG. 59) is connected at one end thereof to the slide block 1072, and a spring 1080 (see FIG. 58) is connected at one end thereof to the slide block 1074. The opposite ends of the springs 1079, 1080 are interconnected by a cable 1081 which passes around a pair of pulleys 1082*a*, 1082*b* that are mounted on a plate 1083. The springs 1079, 1080 and the cable 1081 synchronize movements of the rollers 1060, 1068 so that, if the roller 1060 moves from the position in FIG. 58 to the position in FIG. 59, the roller 1068 will also move from the position in FIG. 58 to the position in FIG. 59. The purpose of the movements of the rollers 1060, 1068 will be discussed below.

The rotatable tape drive rollers 1062, 1066 are fixed in position unlike rollers 1060 and 1068. However, the rollers 1062, 1066 are rotatably driven by respective electric motors 1084*a*, 1084*b* through suitable drive mechanisms (not shown) provided under respective roller drive housings 1063, 1067. The outer surfaces of the rollers 1062, 1066 have a contact surface reducing, knurled texture which allow the rollers 1062, 1066 to grip and release the adhesive surface 1070 of the stripper tape 1002, and, when the rollers 1062, 1066 are rotated in the appropriate direction, pull stripper tape from the supply roll 1006.

The backing roller 1064 is mounted on a slide block 1085 (best seen in FIG. 60) that extends under the turret body and is connected to the plate 1083, so that the slide block 1085 and plate 1083 move in unison. The slide block 1085 is slidable along the axes of rod pair 1086 (only one rod is visible in FIGS. 58 and 59), and is selectively driven along the rod pair 1086 by an electric drive motor 1087 (see FIG. 57) through a suitable drive mechanism (not shown). The backing roller 1064 is therefore movable from the stand-by position, shown in FIG. 58, to a cleaning position, shown in FIG. 59, where the adhesive surface 1070 of the stripper tape 1002 is brought into contact with the outer surface of the cleaning roller 1024*a*.

The backing roller 1064 is also movable to the position shown in FIG. 60 when loading of a new stripper tape supply roll is necessary. As the backing roller 1064 moves to the position shown in FIG. 60, the slide block 1085 contacts the free end of a rod 1087 whose opposite end actuates a lever mechanism 1088 associated with the capstan roller 1052. The slide block 1085 pushes the rod 1087 backward which, through the lever mechanism 1088, forces the capstan roller 1052 out of engagement with the supply roll 1006 to facilitate removal of the previous supply roll and loading of a new supply roll. Further, as the slide block 1085 moves to the position shown in FIG. 60, arms (not shown) projecting from each side thereof contact the slide blocks 1072, 1074, for example by engaging a flange 1089 on the slide block 1074 and a similar flange (not shown) on the slide block 1072 (see FIG. 57). Contact between the arms of the slide block 1085 and the slide blocks 1072, 1074 force the slide blocks 1072, 1074 to the position shown in FIG. 60. Rather than mechanically driving the roller 1064 to the loading position shown in FIG. 60, a handle 1090 can be connected to the slide block 1085 to allow manual actuation of the roller 1064 to the loading position.

The positions of the various rollers in FIG. 60 facilitates loading of new stripper tape, because the tape does not need to be threaded through the relatively tortuous tape path formed by the rollers in the stand-by position shown in FIG. 58. Instead, the tape 1002 is simply passed around the roller 1058, passed between the rollers 1060, 1064, 1068 and the rollers 1062, 1066, and wound onto the take-up roll. Once the new tape is loaded, the roller 1064 is driven back to the stand-by position shown in FIG. 58, with the rollers 1060, 1068 automatically returning to their stand-by positions.

The cleaning cycle of the cleaning mechanism 1000 will now be described with reference to FIGS. 58 and 59. With the stripper tape 1002 in the stand-by position (FIG. 58), a card is passed between the cleaning rollers 1024a, 1024b which pick up contaminates from the card surfaces. The cleaned card waits at the exit of the cleaning module until the adjacent downstream module is ready to receive the card. The turret body is then rotated in a clockwise direction which disengages the cleaning roller drive mechanism and brings the cleaning roller 1024a into position ready for cleaning. The backing roller 1064 is then driven toward the cleaning roller 1024a to the position shown in FIG. 59 until the stripper tape 1002 contacts the outer surface of the cleaning roller 1024a.

The tape drive roller 1066 then rotates counterclockwise to pull tape forward across the surface of cleaning roller 1024a. Tape driven in this direction causes the length of tape between tape drive roller 1066 and the take up roll 1004 to increase allowing the movable roller 1068 to move toward the card path. Simultaneously the length of tape between the supply roll 1006 and the tape drive roller 1062 is decreased, which forces the movable roller 1060 to move away from the card path. The length of tape moved in this direction is equal to, or greater than, the circumference of cleaning roller 1024a to ensure that the entire roller surface is cleaned. If the movable roller 1060 reaches the limit of its travel and more tape is still required, the remainder of the tape needed will be peeled off the supply roll 1006.

With the surface of cleaning roller 1024a cleaned, the backing roller 1064 returns to the ready position (see FIG. 58) disengaged from the cleaning roller 1024a. Tape drive roller 1062 then rotates clockwise to pull tape backward, in the opposite direction. Tape driven in this direction causes the length of tape between tape drive roller 1062 and the supply roll 1006 to increase allowing the movable roller 1060 to move toward the card path. Simultaneously the length of tape between the take up roll 1004 and the tape drive roller 1066 is decreased forcing the movable roller 1068 to move away from the card path. The length of tape moved in this direction will determine the amount of tape that will be reused. This length is selectable and ranges from zero (e.g. no reuse), to a length equal to the forward tape movement (e.g. 100% reuse). If the tape length moved backwards is less than the tape length moved forward, the movable roller 1068 will not reaches its ready position. In this case the take up roll 1004 will be driven clockwise causing the movable roller 1068 to move away from the card path until it reaches its ready position. The turret body is then rotated in a counterclockwise direction 180 degrees to place cleaning roller 1024b in position for cleaning. The rest of the roller cleaning cycle is then repeated for the cleaning roller 1024b.

It should be noted that both rollers do not need to be cleaned during one card cycle. The first roller 1024a could be cleaned, the turret returned to its home position, then another card passed between the cleaning rollers 1024a, b, followed by the cleaning of the second cleaning roller 1024b.

Rollers

Rollers are often used, for instance, in card personalization systems. Typically, rollers are used to transport cards from processing module to processing module, including entry of cards into processing modules and exiting of cards out of processing modules. In addition, rollers are used within processing modules, such as, in input hoppers for picking cards, or in graphics modules passing cards from a set of rollers used for entry of a card to a set of rollers employed for processing the graphics onto a particular card. In the past, rollers have employed a hub portion having a cylindrical body connected to the hub, and providing a surface for gripping a card. Further, a set screw applied through the body and the hub attaches the roller to a rotatably driven shaft.

Although these designs may be suitable for their purposes, improvements may still be made upon rollers. There is still a need to prevent stripping of set screws, set screws becoming loose during operation, and dirt entering the set screw head. Further, there is a need to provide an improved structure that is convenient for assembly, while still maintaining cost effective parts. The following description illustrates the features and improvements made upon existing designs of rollers in accordance with the principles of the present invention.

Figure 46:
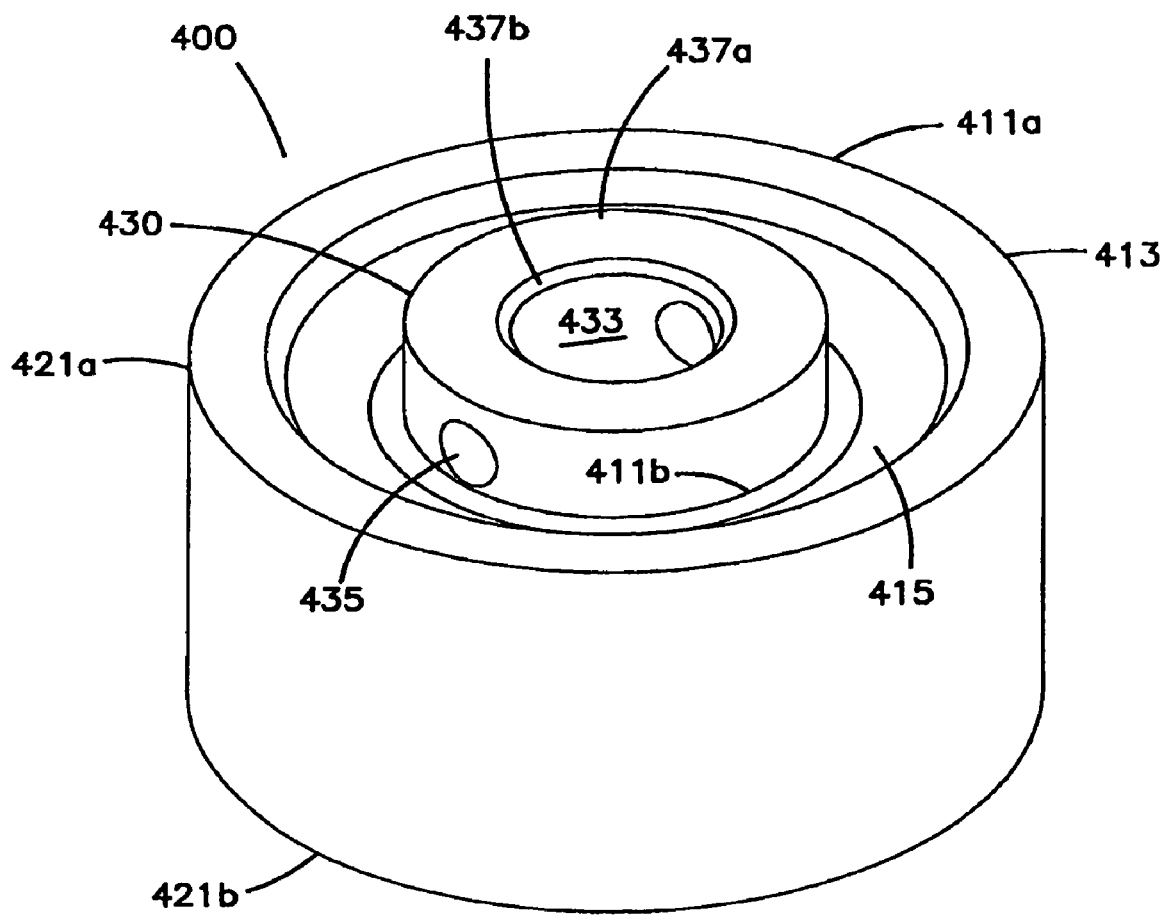
FIG. 46 represents a perspective view of one embodiment of a roller in accordance with the principles of the present invention.
Figure 47:
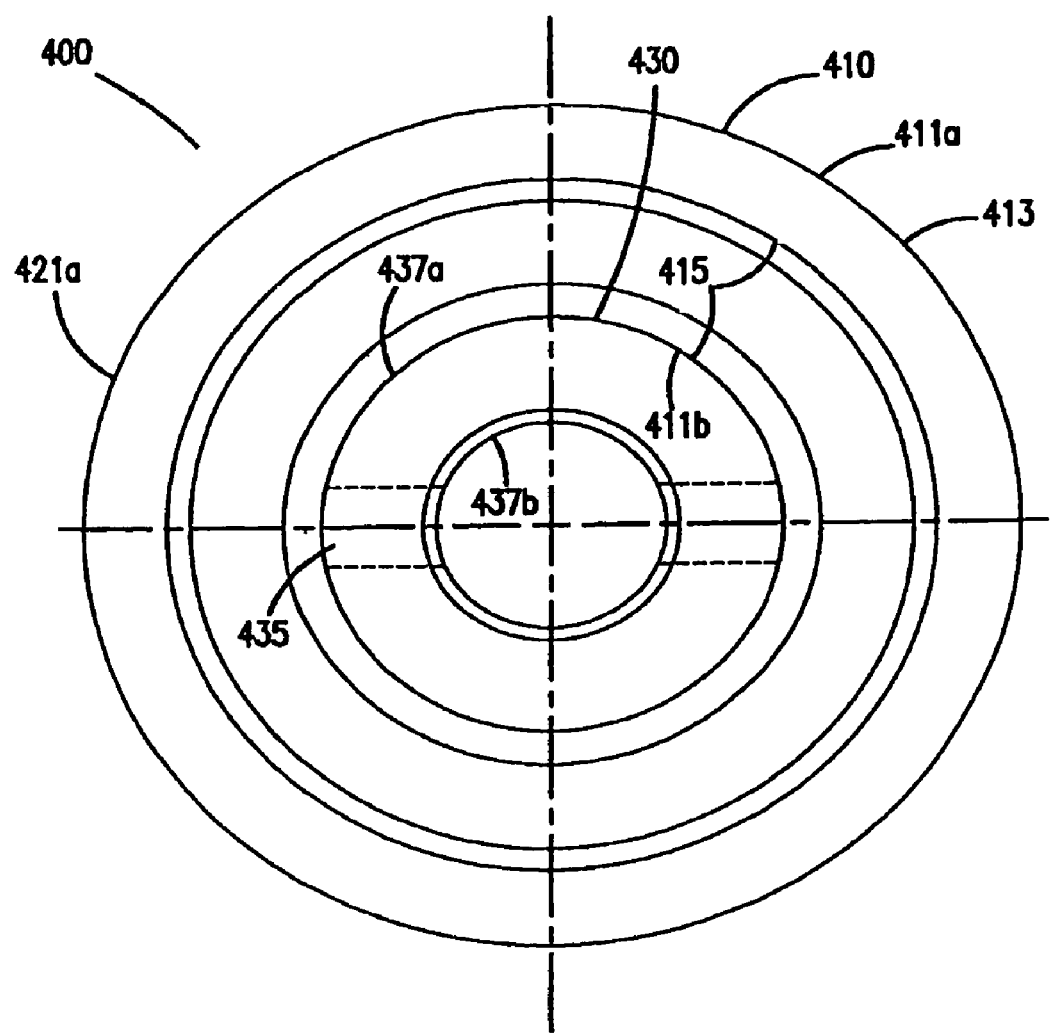
FIG. 47 represents a top view of the roller of FIG. 46.
Figure 48:
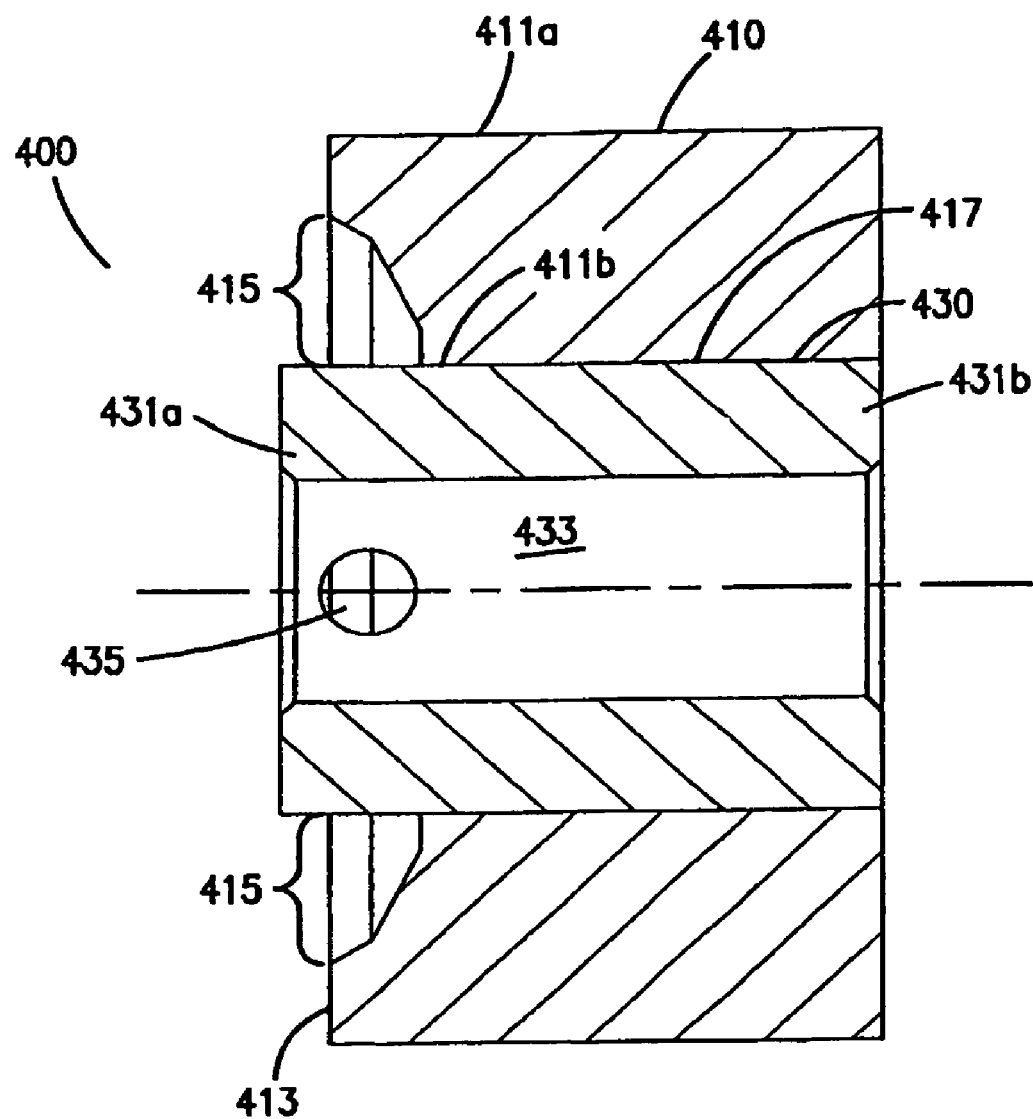
FIG. 48 represents side cross sectional view of the roller of FIG. 46.

FIGS. 46 to 48 illustrate one preferred embodiment of a roller. The roller 400 includes a body 410 having top 421a, a bottom 421b. Preferably, the body is a cylindrical body having an opening 417 through the top 421a and the bottom 421b, that defines an inner diameter 411b and outer diameter 411a. More preferably, the cylindrical body 410 is constructed of a compliant or resilient material such as rubber. The roller 400 includes a hub 430 connected to the cylindrical body and having an opening 433 through the top 431a and bottom 431b. The opening 433 defines an inner diameter 437b and an outer diameter 437a. At least two through holes 435 oppositely disposed are transversely located to the opening 433.

The cylindrical body 410 may be connected by an interference fit with the hub 430. In addition, the cylindrical body 410 may be molded onto the hub 430.

Figure 49A:
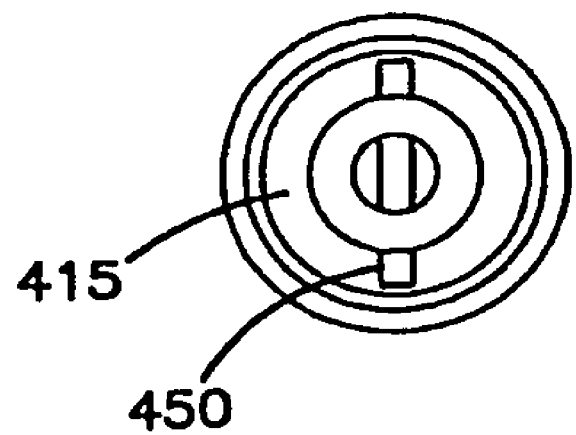
FIG. 49a represents a top view of one embodiment of a roller including a locking pin in accordance with the principles of the present invention.
Figure 49B:
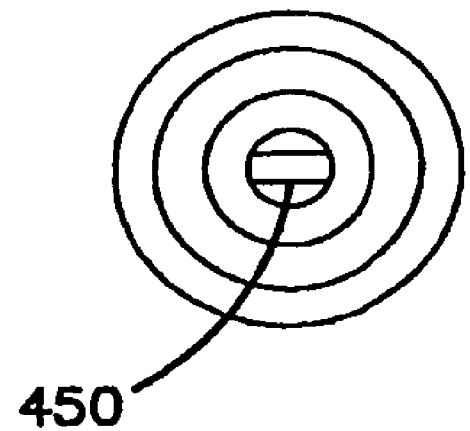
Figure 50:
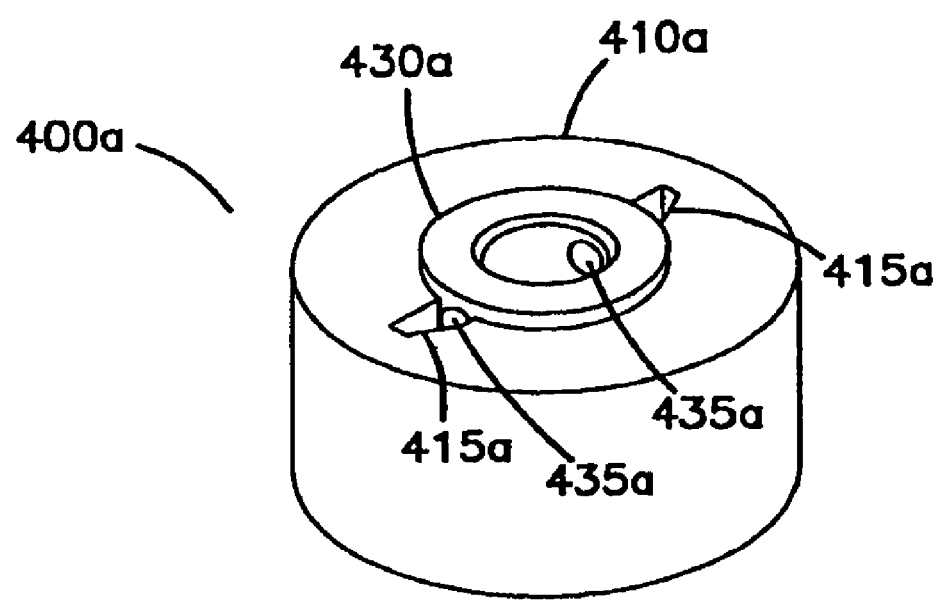
FIG. 50 represents a perspective view of one embodiment of a roller in accordance with the principles of the present invention.

As shown in FIGS. 49a and 49b, a retention member 450, such as a pin, may be fitted into one of the oppositely disposed transverse through holes 435 and connected to a rotatably driven shaft (not shown). The shaft also would include a corresponding through hole, so that the retention member 450 may fit through the shaft and across to the other oppositely disposed transverse through hole 435. Preferably, the retention member extends a length out from the oppositely disposed transverse through holes.

As shown in FIGS. 46 to 48, a lip portion 413 resides about the circumference defined by the outer diameter 411a of the cylindrical body 410. Preferably, the lip portion 413 is flexible as the cylindrical body is constructed of a compliant material. The lip portion 413 includes a width and defines a recess area 415 between the lip portion 413 and the inner diameter 411b. The lip portion provides a retention means for the retention pin 450 (FIGS. 49a and 49b). Preferably, the recessed area resembles a dished out area about the circumference of the cylindrical body 410. FIGS. 46 to 48 illustrate the recess area about the entire circumference of the cylindrical body 410. However, it will be appreciated that any suitably sized recess area may be employed to accommodate retaining the pin.

Preferably, the hub is constructed of metal parts. However, it will be appreciated that a plastic material may also be employed.

Figure 51:
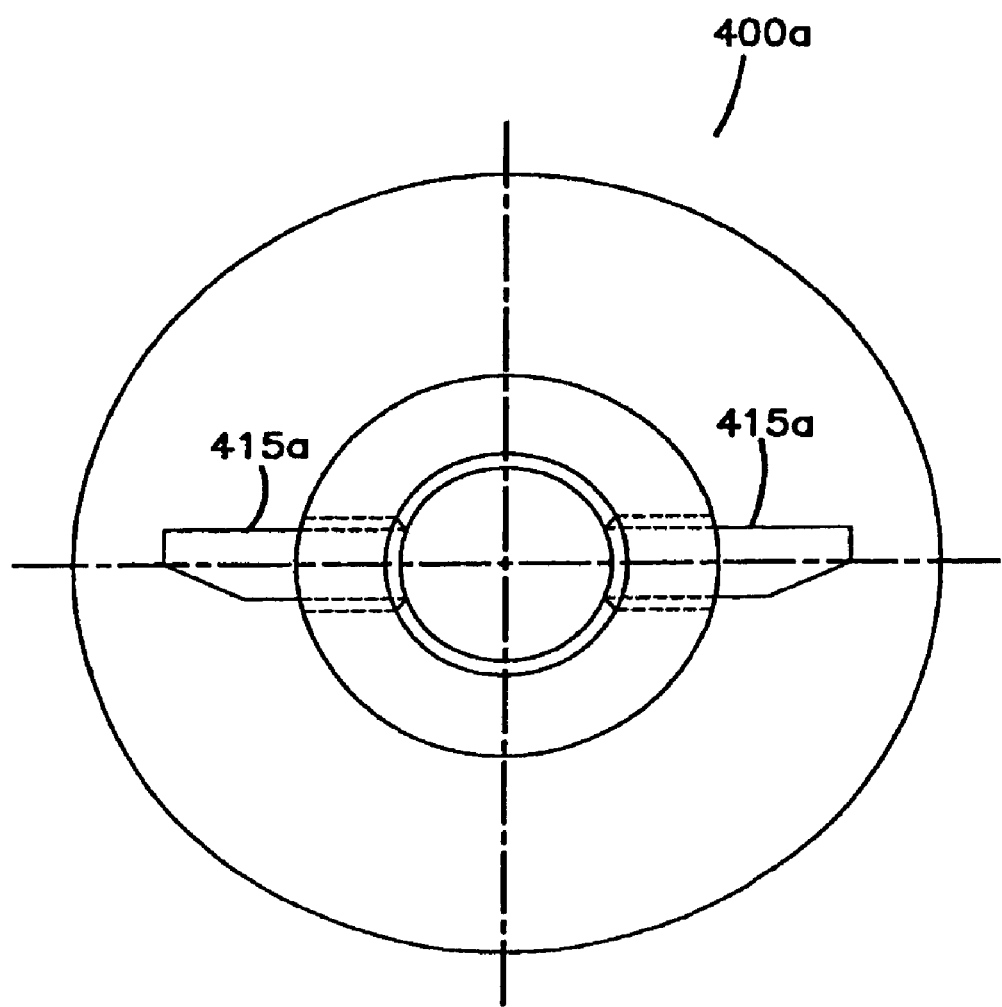
FIG. 51 represents a top view of the roller of FIG. 50.
Figure 52:
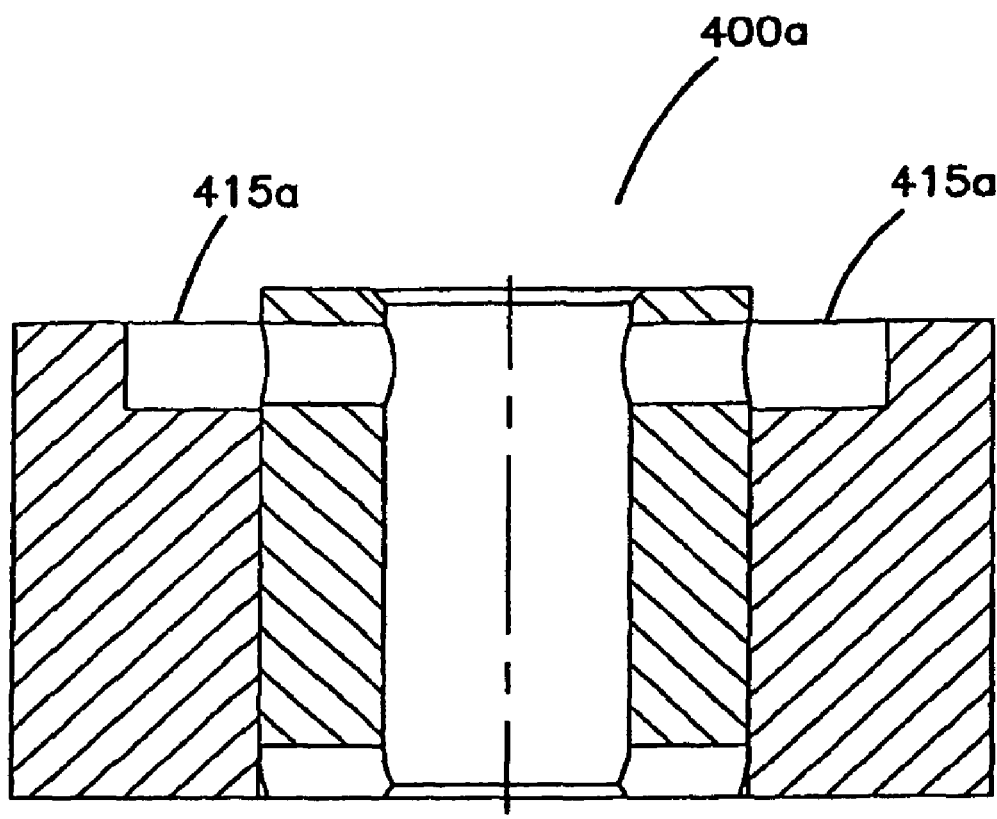
FIG. 52 represents a side view of the roller of FIG. 50.
Figure 53:
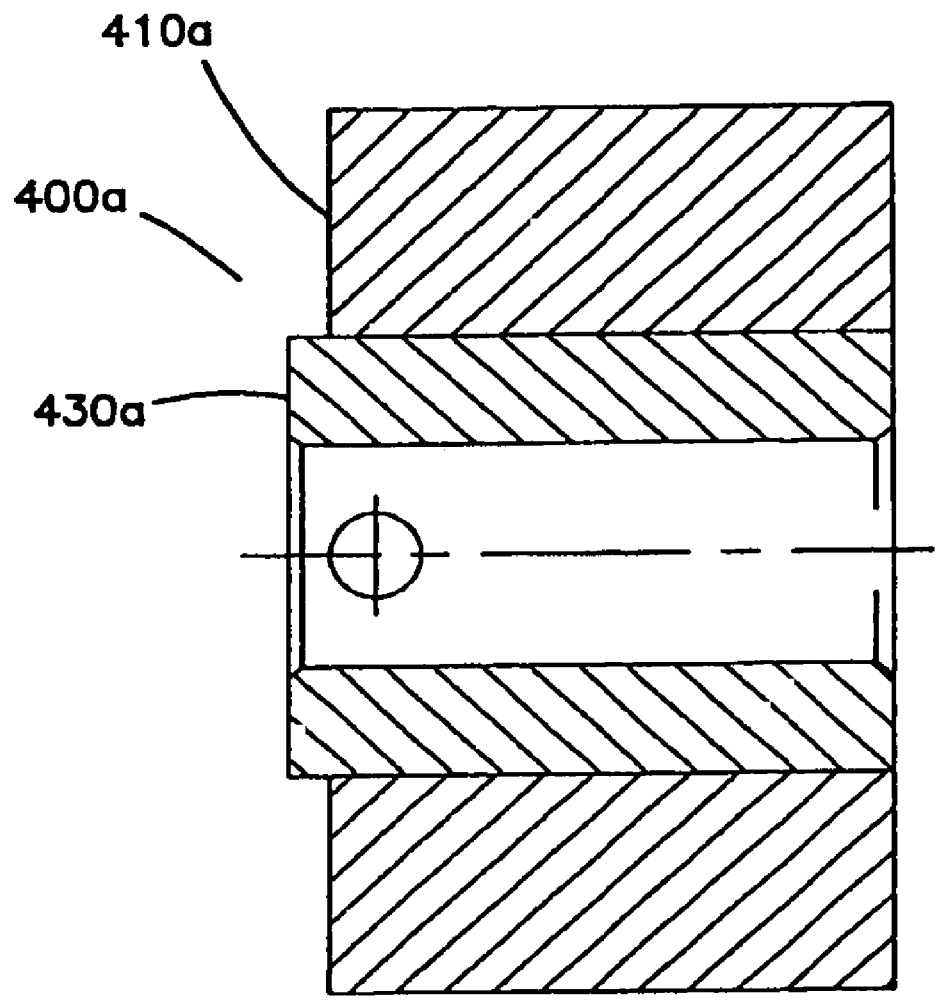
FIG. 53 represents a side view of the roller of FIG. 50.

FIGS. 50 to 53 illustrate another preferred embodiment of a roller. The roller 400*a* includes a hub 430*a* and body 410*a* similar to the hub 430 and body 410 described above. Two recess areas 415*a* are illustrated at each of the oppositely disposed transverse holes 435. As shown in FIGS. 51 to 53, the cylindrical body employs different sized recesses 415*a* than the dished out recess area 415 above. The hub 430*a*, and other features of the body 410*a* are substantially similar to the descriptions above and are not further detailed.

In addition to other advantages, the rollers of the present invention provide improved retention structures. For instance, the transverse holes and recess area in cooperation with a retention member, such as a pin, eliminate the need for a set screw. The roller offers the advantages of preventing stripping of its retention parts, and an arrangement that is more difficult to wear. Further, the roller of the present invention provides a more convenient configuration for assembly and disassembly. For instance the resilient lip may be depressed to remove the retention pin without the need for a screwdriver. In addition to the above advantages, the roller of the present invention provides a structure that is cost effective and maintenance friendly.

Take Up Roll Spindle

Take up rolls are often used in the processing modules of a card personalization system, for instance, in a print module, a graphics module or a cleaning module, such as described above. Take up rolls collect used web product for disposal after a supply of web product, such as from a supply roll that is spent. Typically, during collection of used web product, the take up roll core bears a high amount of force from the web product being tightly wound onto it. The force of the wound web product around the core can cause the core to compress which makes it difficult for the web product and core to be removed from the spindle for disposal. Present designs have disposed of both the take up roll core and the used web product wound around the core. Such designs increase costs and consume time, as the take up roll must be replaced after each roll of used web product is collected. In addition, local restrictions may require the core to be removed from the web product and disposed of separately Therefore, there is a need to provide a spindle that enables users to conveniently dispose of used web product without having to remove and dispose of the core. Furthermore, there is a need to provide a spindle for a take up roll that can be reused to minimize the replacement of parts, thereby reducing costs and increasing time efficiency.

Figure 61:
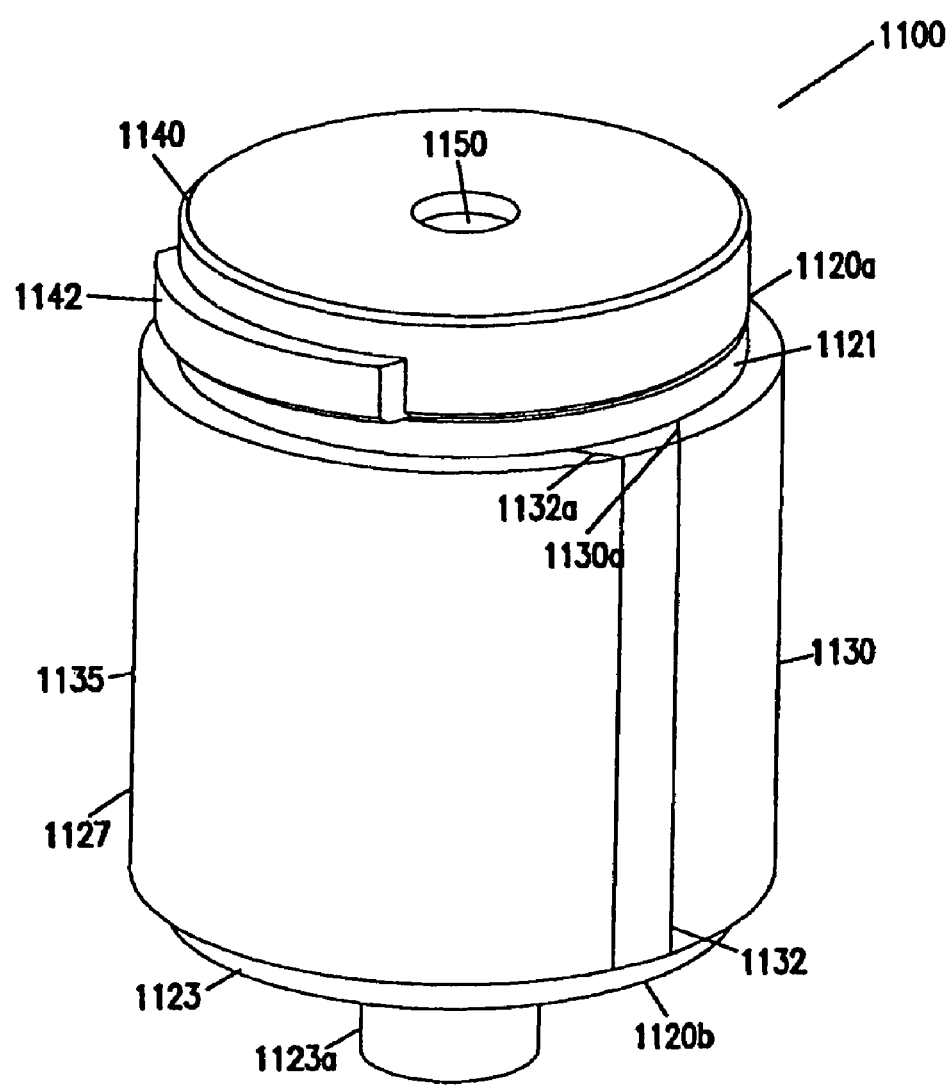
FIG. 61 represents a top side perspective view of one embodiment for a take up roll core in accordance with the principals of the present invention.
Figure 62:
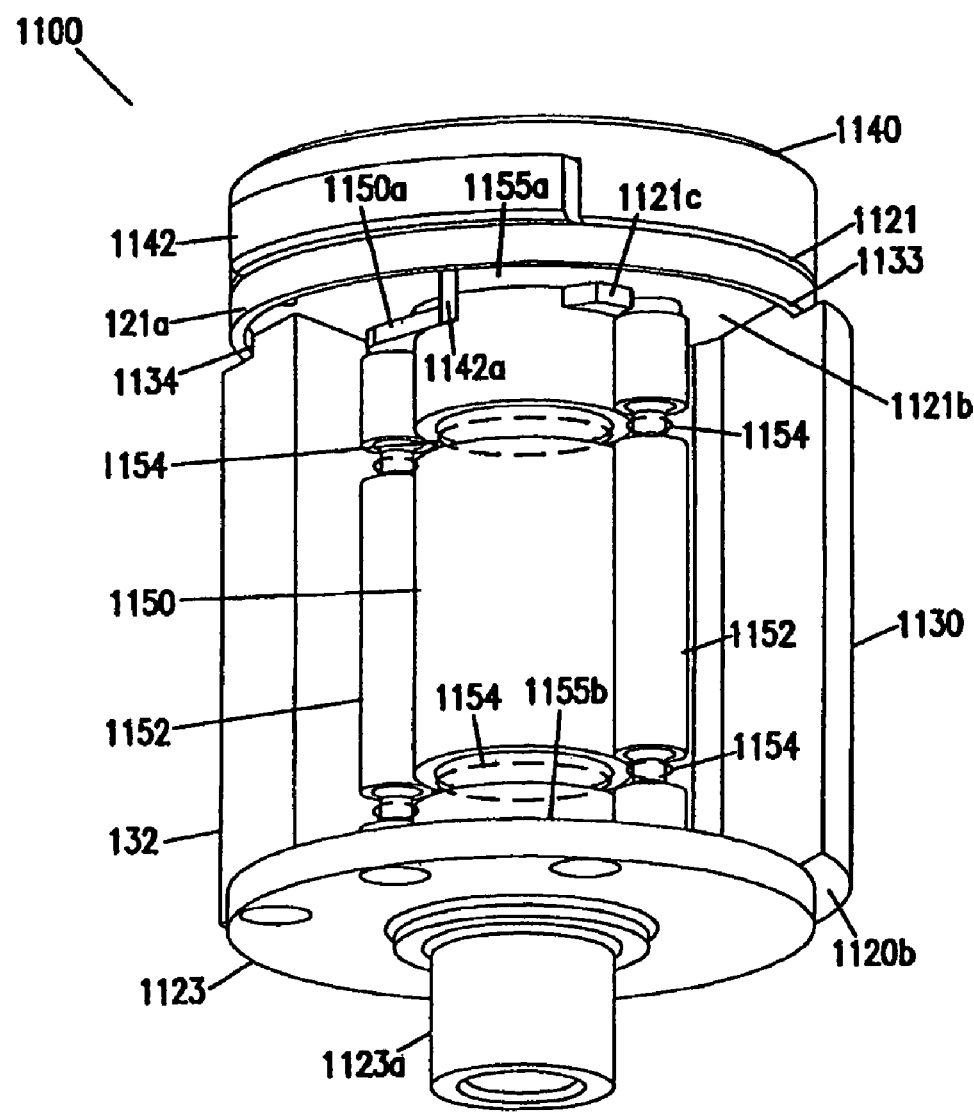
FIG. 62 represents a partial sectional view of the take up roll core of FIG. 61.

FIGS. 61-62 illustrate one preferred embodiment of a spindle 1100 for a take up roll. The spindle 1100 includes a top 1120*a* and a bottom 1120*b*. First oppositely disposed primary housing portions 1130 and 1135 and second oppositely disposed secondary housing portions 1132 (shown in FIGS. 63-63*a*) define an outer side surface 1127 of the spindle 1100. The primary and secondary housing portions 1130, 1132, 1135 further define a cavity 1190 (shown in FIGS. 63-63*a*) extending from the top 1120*a* to the bottom 1120*b*. The secondary housing portions 1132 are moveable relative to and in contact with the primary housing portions 1130. Preferably, the primary housing portions 1130 and 1135 are larger than the secondary housing portions 1132, and define a majority of the outer surface 1127. The outer side surface 1127 is substantially cylindrical for winding used web product. A first plate 1121 is disposed on the top 1120*a* of the spindle 1100. Likewise, a second plate 1123 is oppositely disposed from the first plate 1121 at the bottom 1120*b* of the spindle 1100. The second plate 1123 includes a shaft portion 123*a* that is adaptable for connection to a drive shaft (not shown) for driving the spindle 1100.

Preferably, both plates 1121, 1123 include a cut-out surface 1121*b* defining a ridge 1121*a* about the circumference of the plate, and cooperating with lip portions 1133, 1134 connected to the housing portions 1130, 1132. The housing portions are retained within the cut-out surface 1121*b* and are restricted from moving past the ridge 1121*a*. As shown in FIG. 62, the cut-out surface 1121*b* and ridge 1121*a* are illustrated at the first plate 1121. It will be appreciated that similar structures may be employed on the second plate 1123 and bottoms of the housing portions 1130, 1132.

As best shown in FIG. 62, the spindle 1100 includes a rotating member 1150 disposed within a portion of the cavity 1190 and extending coaxially in the cavity 11190 between the top 1120*a* and the bottom 1120*b*. The rotating member 1150 is operatively connected to a handle 1140 disposed on the first plate 1121. The rotating member 1150 and the handle 1140 are rotatably connected to plates 1121 and 1123, and are rotatable relative to the first plate 1121, second plate 1123, and the housing portions 1130, 1132. The rotating member 1150 includes at least two flanges 1150*a* that protrude radially outward from the rotating member 1150. Rollers 1152 are operatively connected to the rotating member 1150, and are contactable with the primary and secondary housing portions 1130, 1135 and 1132. Preferably, the rollers 1152 are connected to the rotating member 1150 through resilient o-rings so as to allow restricted rolling movement between the rollers 1152 and the rotating member 1150. More preferably, the rotating member 1150 contains the same o-rings 1154 commonly connected with the rollers 1152, such as in a figure eight configuration. In FIG. 62, o-rings 1154 are illustrated as dashed lines at the tops and bottoms of both the rotating member 1150 and the rollers 1152.

Figure 63:
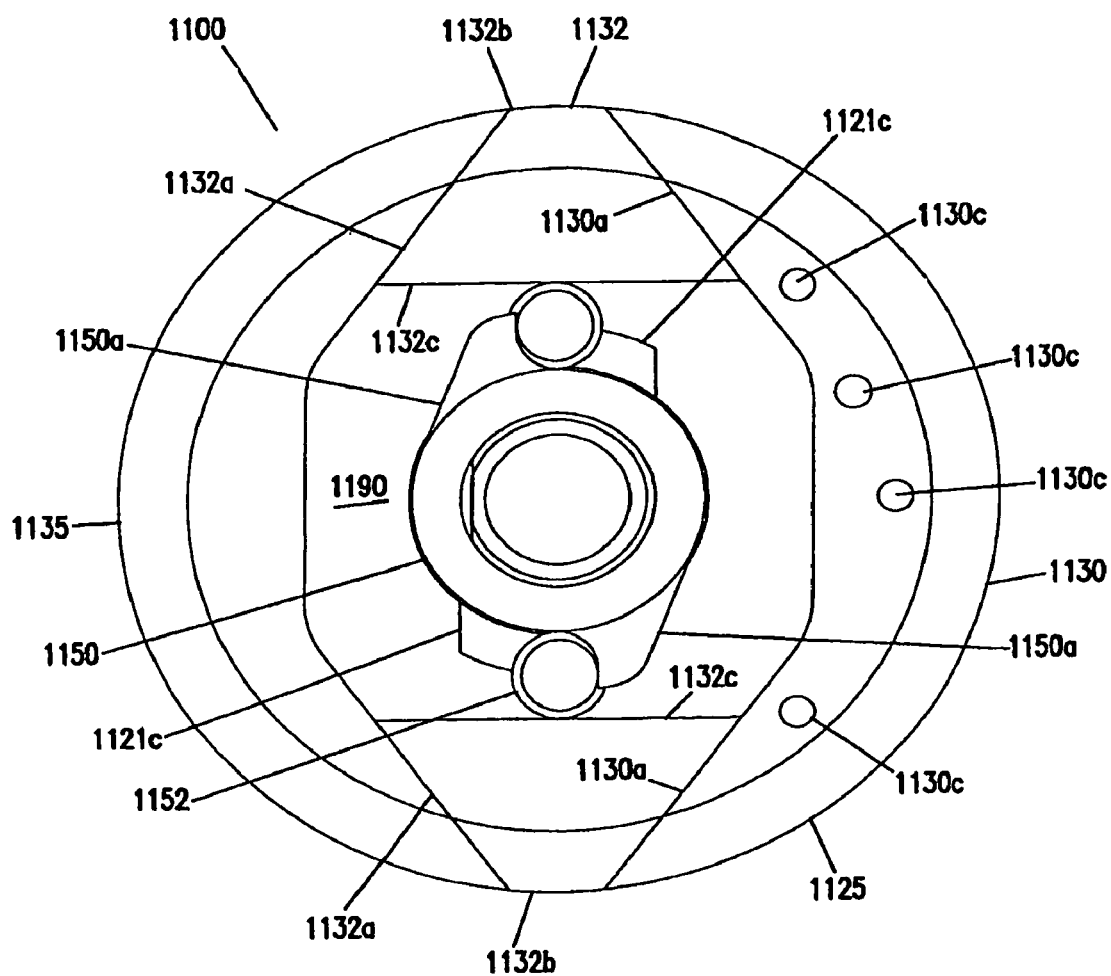
FIG. 63 represents a sectional view of the take up roll core of FIG. 61 in one embodiment of a first configuration before or during web product take up.
Figure 63A:
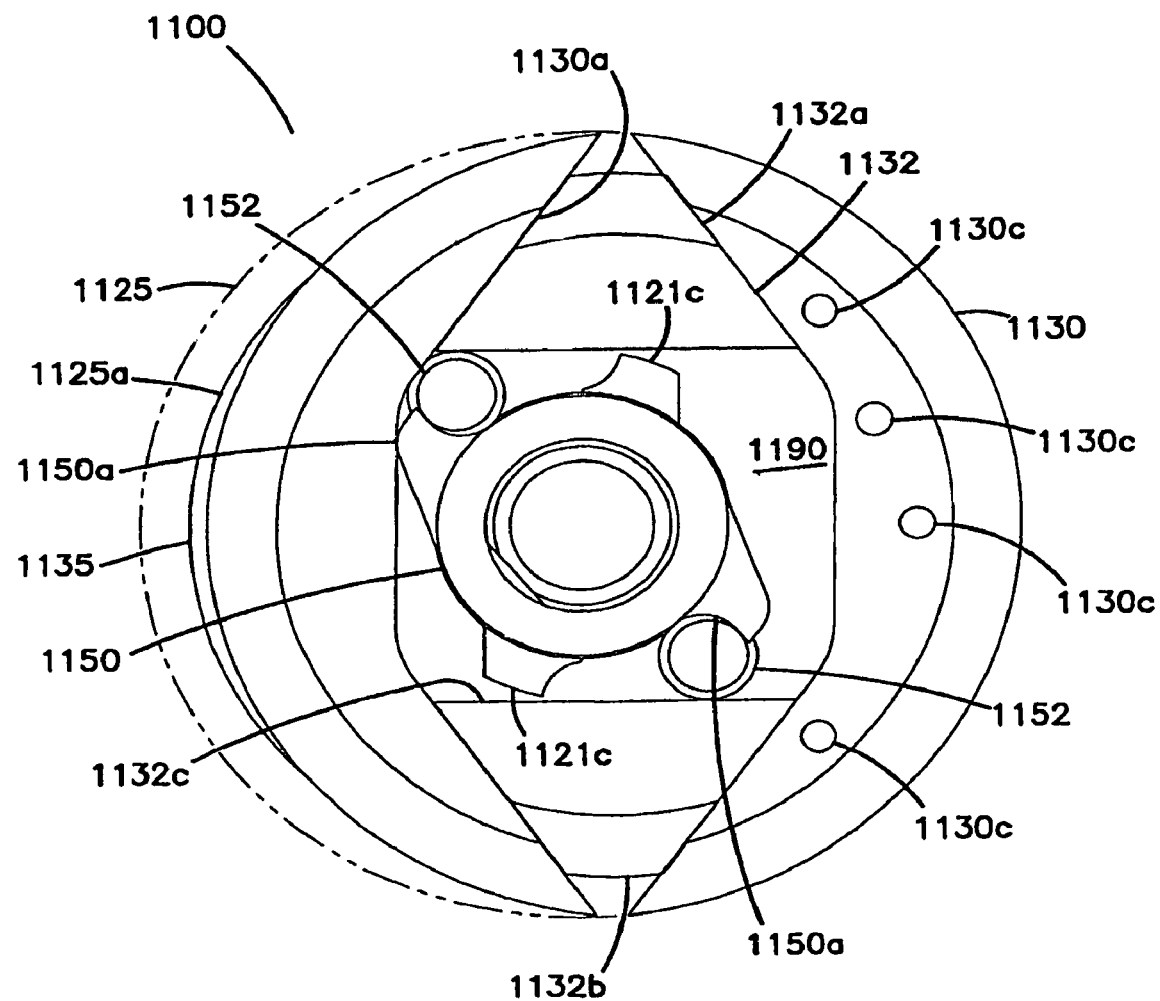
FIG. 63a represents a sectional view of the take up roll core of FIG. 61 in one embodiment of a second configuration for web product removal.
Figure 66:
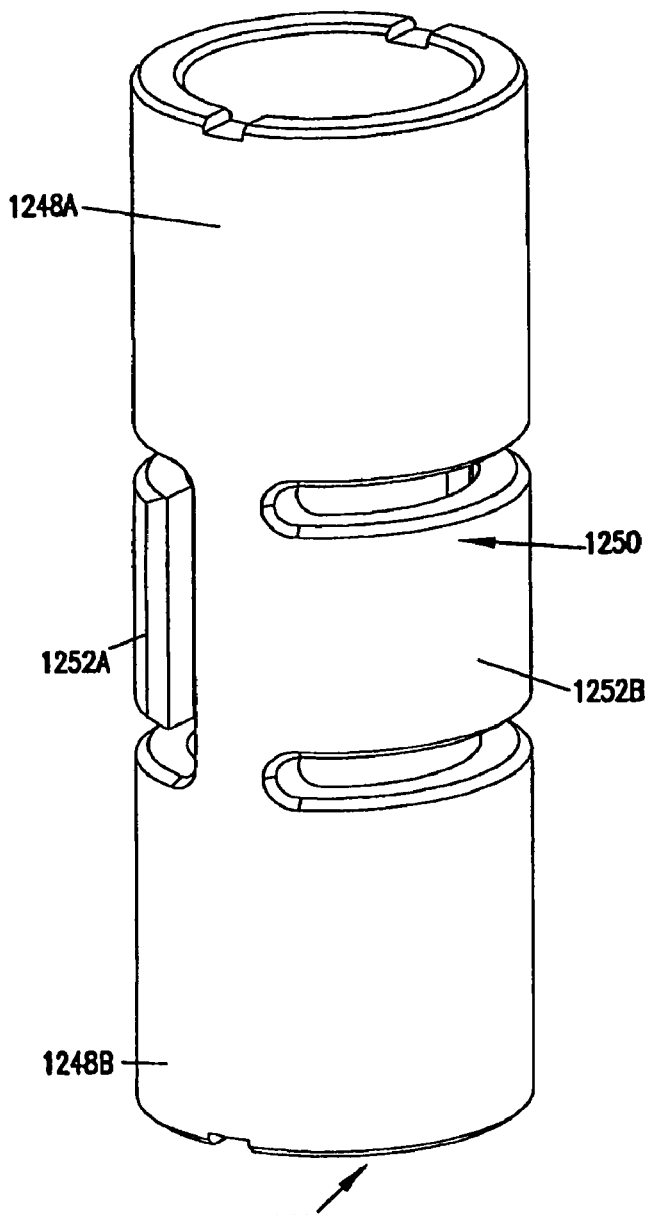
FIG. 66 is a perspective view of a cam sleeve used to mount the cam on the shaft.
Figure 68:
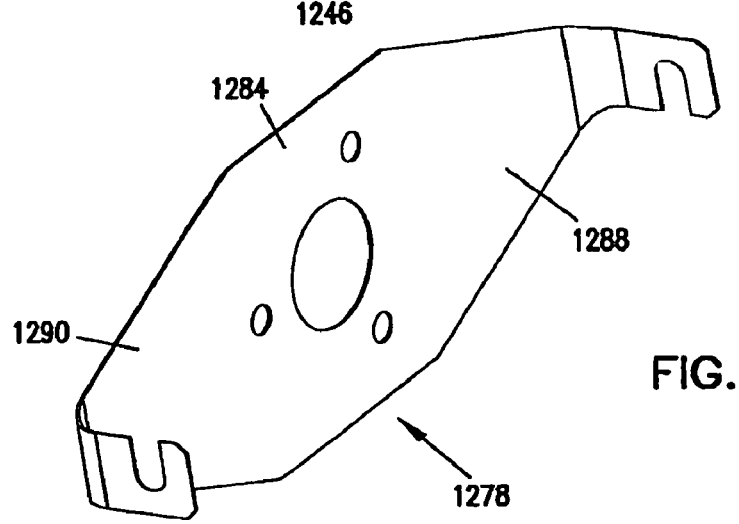
FIG. 68 illustrates the mounting bracket used in the embossing module.

In FIG. 62, two oppositely disposed flanges 1150*a* are disposed at a top 1155*a* of the rotating member 1150, and extend longitudinally downward from the top 1155*a* along a length of an outer side surface of the rotating member 1150. It will be appreciated that other configurations and number of flanges also may be employed. For instance, flanges may extend longitudinally downward along the entire length of the rotating member 1150. Likewise, oppositely disposed flanges, such as 1150*a*, may also be disposed at a bottom 1155*b* of the rotating member 1150. Bosses projecting down from surface 1121*b* of the first plate 1121 form stops 1121*c* that limit the range of rotation of the rollers 1152, rotating member 1150 and flanges 1150*a*, as best shown in FIGS. 63, 63*a*. It will be appreciated that stops, such as stops 1121*c*, may be formed on the second plate 1123. The function of the rollers 1152 and rotating member 1150 are further detailed below.

A locking mechanism 1142 is operatively connected to the handle 1140. The locking mechanism 1142 includes a detent 1142*a* operatively connected thereto, and is actuatable into a locked position so as to prevent rotation of the handle 1140 and rotating member 1150. In the locked position, the detent 1142*a* stops the handle 1140 from rotating and stops the rotating member from rotating. The detent 1142*a* of the locking mechanism 1142 is releasable from the locked position, so as to enable rotation of the handle 1140 and rotating member 11150.

FIGS. 63-63*a* illustrate examples of the spindle 1100 in a first configuration and a second configuration, respectively. The first configuration represents the spindle 1100 in a position prior to taking up web product and during the taking up of web product. The second configuration represents the spindle in a position such that web product can be removed. In FIG. 63, the spindle 1100 includes a first diameter 1125 during the first configuration. The rotating member 1150 is shown in a position where the flanges 1150a are held against the rollers 1152 that push the secondary housing portions 1132, such that the secondary housing portions 1132 are pushed outward from the cavity 1190 to define the first diameter 1125.

Preferably, the primary housing portions 1130 and 1135 include an inner surface facing the cavity 1190 provided with a tapered surface 1130a. More preferably, the primary housing portion 1130 is fixed to at least one of the plates 1121, 1123 through holes 1130c that correspond to holes (not shown) in the plates 1121, 1123. It will be appreciated that the primary housing portion 1130 may be fixed to both plates 1121, 1123. A suitable fastener, such as a screw, may be employed to fix the one housing portion 1130 to the plates 1121, 1123. The other primary housing portion 1135 is moveable within a cut-out surface, such as cut-out surface 1121b of the plate 1121, and is retained by a ridge and lip structure, such as ridge 1121a and lip 1133 described above. The tapered region 1130a tapers or slants in a direction toward the outer surface 1127. The secondary housing portions 1132 include side surfaces 1132a that contact the tapered surface 1130a of the primary housing portions, and move relative to the primary housing portions 1130 and 1135. Preferably, the side surfaces 1132a are tapered. As shown in FIGS. 63 and 63a, the secondary housing portions 1132 include the outer surface 1132b being smaller than the inner surface 1132c. Preferably, the secondary housing portions are substantially trapezoidal or wedge shaped in cross section.

In FIG. 63a, the second configuration represents the spindle 1100 in a position for removing used web product. As shown in FIG. 63a, the secondary housing portions are shown as being moved inwards toward the cavity 1190. In addition, the movable primary housing portion 1135 is shown as being moved inwards toward the cavity 1190. A second diameter 1125a is defined by movement of the housing portions into the second configuration. The rotating member 1150 is shown moved counterclockwise, relative to the arrangement illustrated in FIG. 63, in a position where the flanges 1150a are rotated away from rollers 1152. The movement of the rotating member 1150 enables the rollers 1152 to roll against the surface of the rotating member 1150 and the inner surface 1132c of the secondary housing portions 1132 as rollers 1152 move. As shown in FIG. 63a, movement of the rollers 1152 allows the secondary housing portions 1132 to move inwards and collapse to the cavity 1190. Similarly, the movable primary housing portion 1135, is moved from its position in the first configuration, and is enabled to move inwards and collapse to the cavity 1190. The moved housing portions define the second diameter 1125a. The second diameter 1125a is smaller than the diameter defined in the first configuration enabling the now loosely wound web product around the spindle 1100 to be easily removed by sliding the web product up and off of the spindle.

When the locking mechanism detent 1142a is defeated the handle 1140 can be rotated with the connected rotating member 1150 so as to release locking mechanism 1142 and actuate the spindle 1100 into the second configuration to enable removal of web product. As shown in FIG. 63a, the rotating member 1150 is moved counterclockwise into the second configuration. To move the rotating member 1150 and rollers 1152 back to the first configuration, the handle 1140 is rotated in the clockwise direction until the rollers 1152 contact stops, such as stops 1121c and the cavity 1190 is expanded to its maximum. In this position the lock moves into its detent position locking the position of the handle and preventing the rotating member 1150 from rotating.

When web product is wound around the spindle 1100 of a take up roll, a substantial amount of force is exerted upon the rollers 1152. Preferably, the spindle 1100 and its parts are constructed of a metal material so as to provide a durable, long lasting core that can counter the force exerted by the web product wound around the spindle 1100. More preferably, the rollers 1152 are cylindrical in shape, such that the force required to move the rollers is the force necessary to overcome the friction associated with rolling motion and not sliding. The motion of rollers 1152 against both the rotating member 1150 and the secondary housing 1132 portions is a rolling motion and requires minimal force to initiate even if the compressive force on the outer spindle surface is great. The cylindrical shape of the rollers provides an arrangement such that the rotating member 1150 and the rollers 1152 can be easily moved from the first configuration to the second configuration to change the diameter for removing web product when the rotating member 1150 is not locked by a locking mechanism, such as 1142 above.

In addition to processing modules of a card personalization system, the spindle 1100 may be used for other take up rolls employed for other products, such as but not limited to paper, plastics or other products being wound on a core. In addition to other advantages, the spindle of the present invention enables users to conveniently dispose of used web product without having to remove and dispose of the core with the used web product. Further, the spindle of the present invention provides a take up roll that can be reused to minimize the replacement of parts, thereby reducing costs and increasing time efficiency.

Embossing Module

Details of portions of the embossing module 1200 are illustrated in FIGS. 64-68. The embossing module 1200 is configured and arranged to form embossed data on the cards. The embossed data can be alphabetic, numeric, symbols, and other characters and combinations thereof. These will hereinafter be referred to generically as characters. The embossed characters typically pertain to cardholder information, such as cardholder name, account number, card expiration date, and the like.

Figure 67:
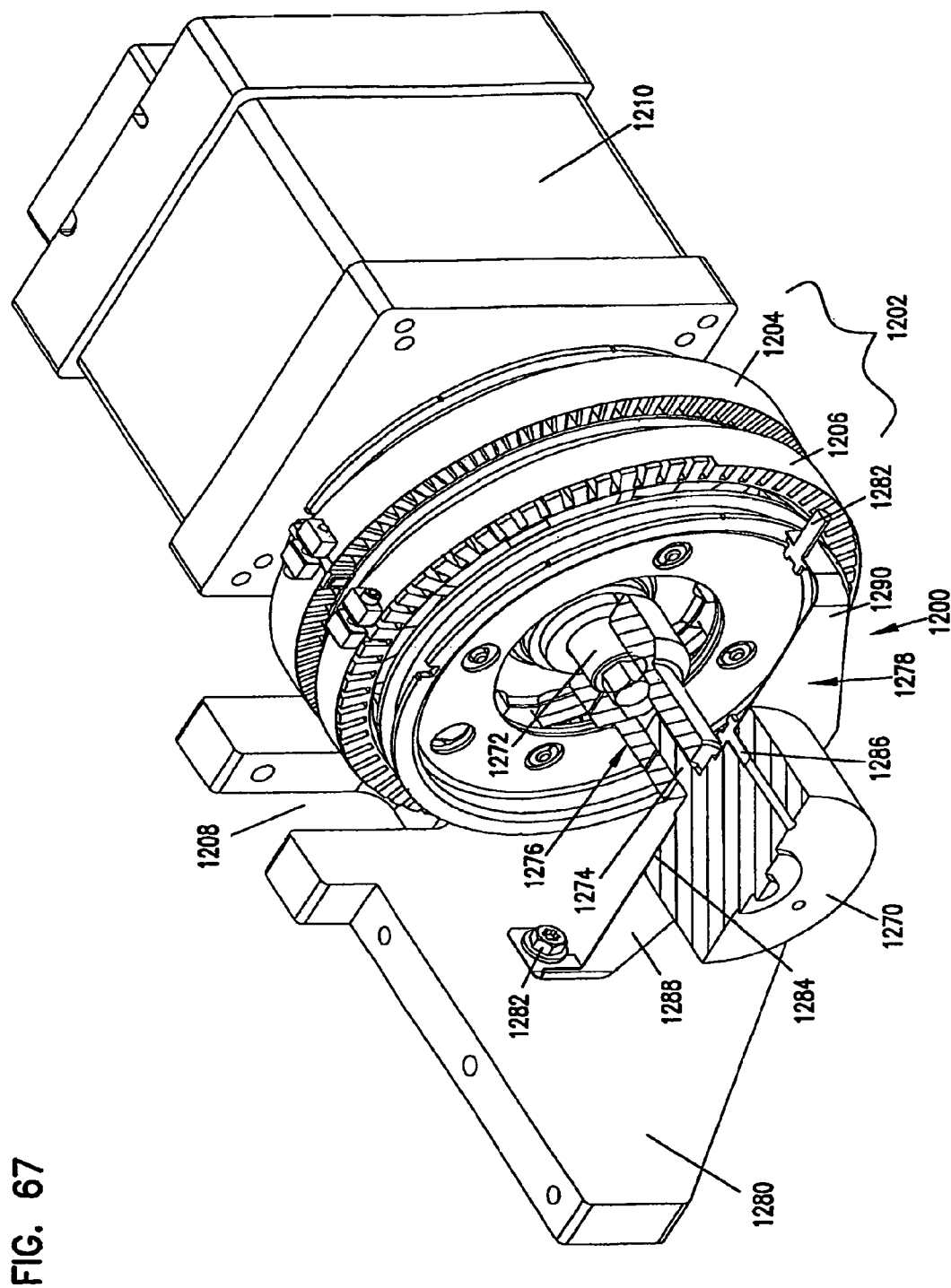
FIG. 67 is a perspective view, partly in section, of an embossing wheel assembly for using in the embossing module.

FIG. 67 illustrates a portion of the embossing module 1200. The module 1200 includes an embossing wheel 1202 composed of a punch side 1204 and a die side 1206. The punch side 1204, which is of known construction, contains a plurality of punches arranged in a circular fashion. Each punch contains a punch character used to produce a corresponding embossed character on the card. The die side 1206, also of known construction, contains a plurality of dies arranged in a circular fashion. Each die contains a die character that corresponds to a respective oppositely positioned punch character. When the punch is actuated into engagement with a card, the corresponding die is actuated into engagement on the opposite side of the card from the punch, thereby creating a corresponding embossed character on the card. During embossing, the card will be suitably positioned between the punch and die sides 1204, 1206. After embossing, the card will exit the module through an exit path 1208. The wheel 1202 is driven by a motor 1210. Further, a punch actuator and a die actuator are provided to actuate the individual punches and dies of the punch side 1204 and die side 1206 during embossing.

The construction and operation of the embossing module 1200 described so far are conventional. One way to increase the card throughput of the system 10 is to reduce the time needed to emboss a card. Embossing time is based, in part, on how fast the punches and dies of the wheel 1202 can be brought into position during embossing, and on how fast the punches and dies can be actuated into and out of engagement with the card. Therefore, reductions in the rotation time of the embossing wheel 1202 and in the actuation times of the punches and dies can increase production rate. Although increasing the speed of rotation of the wheel 1202 during movements, and increasing punch and die actuation speeds is possible, these speed increases can create problems if not properly accounted for.

With reference to FIG. 64, an actuator 1220 that can be used to actuate the punches is illustrated. An identical actuator will be provided to actuate the dies. The actuators 1220 will be suitably positioned relative to the punch side 1204 and die side 1206 to be able to actuate the respective punches and dies.

The actuator 1220 includes a drive motor 1222, preferably a servo motor, a plunger 1224 that is slidably disposed within a housing 1226, and a drive cam 1228 that is fixed to a shaft 1230 of the motor 1222 for driving the plunger 1224. The motor 1222, housing 1226 and plunger 1224 are shown in cross-section for clarity and to illustrate details thereof. The use of a cam to drive a plunger is known from DataCard Corporation's model 150i embosser, available from DataCard Corporation of Minnetonka, Minn.

The plunger 1224 includes an actuating end 1232 that actuates the punch/die when the plunger is actuated to an actuating position. The opposite end of the plunger 1224 includes a follower 1234 that rides on the outer surface of the cam 1228 as the cam is rotated. The outer surface of the cam 1228 is eccentric, whereby as the cam rotates, the plunger 1224 is driven out during an actuation cycle. The plunger 1224 is biased by a suitable mechanism, such as a spring 1236, back to a retracted position. A pin 1238 extends through the follower 1234 and connects to a bearing 1240 that is disposed within an elongated slot 1242 defined in a block 1243 connected to the housing 1226. The bearing 1240 helps to keep the follower axis aligned with the cam axis to ensure line contact between the two, and thereby realize maximum life.

The cam 1228 is configured to be clamped onto the shaft 1230 by a locking screw 1244. As illustrated in FIG. 65, a sleeve 1246 is disposed between the cam 1228 and the shaft 1230. The sleeve 1246 acts to absorb wear instead of the shaft 1230. As a result, the shaft needs to be replaced with less frequency. Instead, the sleeve 1246 can be replaced as needed.

The sleeve 1246, which is preferably made of metal, such as stainless steel, comprises a pair of constant diameter end portions 1248a, 1248b and a collapsible central portion 1250 about which the cam 1228 is disposed. The central portion 1250 comprises a pair of cut-out fingers 1252a, 1252b that are able to collapse into engagement with the outer surface of the shaft 1230 as the cam 1228 is clamped onto the shaft. The end portions 1248a, 1248b, however, are substantially unaffected by the collapse of the fingers 1252a, 1252b and maintain a substantially constant diameter.

An important feature of the actuator 1220 is that the cam 1228 is directly mounted on and driven by the motor shaft 1230. In previous embossers, the cam is typically mounted on a shaft that is separate from the motor shaft. As a result, a coupling is needed to couple the two shafts. When two shafts are used, if exact alignment of the shafts is not achieved, or if the shafts become misaligned during use, excessive shaft wear and shaft failure can results. However, it is extremely difficult to exactly align the shafts with each other, so these problems cannot be entirely eliminated when separate shafts are used.

In the actuator 1220, as shown in FIG. 64, the cam 1228 is mounted directly on the motor shaft 1230, which eliminates the alignment issues when two shafts are used. Each end portion 1248a, 1248b of the sleeve 1246 surrounds the shaft and is supported by the housing 1226 within a sleeve bearing 1254a, 1254b. Further, the opposite end of the shaft 1230 is supported by a bearing 1256. An intermediate portion of the shaft 1230, near the top of the motor housing, is provided a reduced diameter section 1258. A bearing 1260 disposed in the motor housing surrounds the section 1258. The bearing 1260 acts only as a retainer to retain the shaft 1230, but the bearing 1260 is non-functional in that it does not rotationally support the shaft 1230. The reduced diameter section 1258 allows the shaft 1230 to bend and float slightly during use. However, the sleeve bearings 1254a, 1254b maintain the proper orientation of the shaft 1230 at the location of the cam 1228 and absorb the embossing loads. Thus, the shaft 1230 is supported by three bearings 1254a, 1254b, 1256 rather than the customary four bearings that are used to support two separate shafts coupled by a coupling.

Returning now to FIG. 67, the motor 1210 is preferably a servo motor. To achieve fast move times of the embossing wheel 1202, large current pulses are provided to the servo motor 1210 to actuate the motor. However, when the embossing wheel 1202 stops at a desired position, the large current pulses tend to cause the wheel 1202 to oscillate slightly back and forth from the desired position. This oscillation can create slight inaccuracies in the positioning of the resulting embossed character on the card. Therefore, a reduction or elimination of the oscillation can improve the accuracy of the embossing process.

As illustrated in FIG. 67, a friction brake 1270 is positioned adjacent the end of the shaft 1272 of the motor 1210. The friction brake 1270 includes a brake shaft 1274 that is coupled to the motor shaft 1272 by a rigid coupling 1276. The brake 1270 and coupling 1276 are shown in cross-section to illustrate details thereof.

The brake 1270 preferably comprises a magnetic particle brake. Magnetic particle brakes are known in the art, and generally include a disk that is coupled to the shaft 1274, with the disk being surrounded by magnetic particles. When an electric current is applied to the particles, a force is applied to the disk tending to retard rotation of the shaft 1274. Removal of the electrical current removes the retardation force. As practiced, a current is continuously applied to the brake 1270 to produce a constant retardation force. However, it is contemplated that electrical current could be applied only when the retardation force is necessary.

It is to be realized that other friction devices could be used in place of a magnetic particle brake, as long as the friction device is capable of retarding rotation of the shaft 1274. For example, a spring loaded friction device could be used.

The brake 1270 is secured to a mounting bracket 1278 that in turn is fixed to stationary structure 1280 of the module 1200 by fasteners 1282. The brake 1270 is secured to a central portion 1284 of the bracket via fasteners 1286 (only one fastener is visible in FIG. 67). The bracket 1278, which is illustrated in detail in FIG. 68, includes a pair of compliant arms 1288, 1290 that extend outwardly from the central portion 1284.

With the mounting of the brake 1270 on the bracket 1278, the brake 1270 is prevented from rotating. However, the compliant arms 1288, 1290 permit flexing of the brake 1270, to thereby accommodate forces that can cause slight misalignment of the shafts 1272, 1274.

The operation of the brake 1270 is as follows. A current is supplied to the motor 1210 to rotate the wheel 1202 to the desired position. The rotation force is sufficient to overcome the retardation force applied by the brake 1270. Once the desired position is reached, the current to the motor is stopped. However, forces set-up in the servo motor after removal of the current tend to cause the shaft 1272 to oscillate back and forth slightly. However, the retardation force provided by the brake 1270 is larger than the forces tending to cause oscillation. As a result, the retardation force of the brake 1270 maintains the wheel 1202 at the desired position without the oscillation, thereby increasing the accuracy of the embossing process.

The above specification, examples and data provide a complete description of the manufacture and use of the invention. Since many embodiments of the invention can be made without departing from the spirit and scope of the invention, the invention resides in the claims hereinafter appended.

What is claimed is:

1. A card personalization system comprising:
   a card input capable of holding a plurality of cards and that inputs cards into the system;
   a card output that collects processed cards;
   a plurality of card processing stations between the card input and the card output, each processing station capable of performing a card processing operation;
   an operator station disposed upstream of the card input;
   a support pole connected to the operator station;
   a status indicator on the support pole that is capable of indicating an operational status of the system; and
   a first stop button disposed on the card input, and a second stop button disposed on one of the card processing stations or on the card output, the first stop button button and the second stop button each capable of stopping operation of the system when pressed.

2. The system of claim 1, the operator station includes a third stop button that is capable of stopping operation of the system when pressed.

3. The system of claim 1, wherein the first stop button and the second stop button can restart the system.

4. A card personalization system comprising:
   an operator station;
   a card input that inputs cards into the system, a plurality of card processing mechanisms, and a card output that collects processed cards; and
   a first stop button disposed on the card input the first stop button capable of stopping operation of the system when pressed and further comprising a second stop button on one of the card processing mechanisms, the second stop button capable of stopping operation of the system when pressed.

5. The system of claim 4, wherein the operator station includes a third stop button that is capable of stopping operation of the system when pressed.

6. The system of claim 4, wherein the first stop button can restart the system.

7. A card personalization system comprising:
   a card input capable of holding a plurality of cards and that inputs cards into the system;
   a card output that collects processed cards;
   a plurality of card processing stations between the card input and the card output, each processing station capable of performing a card processing operation;
   an operator station disposed upstream of the card input;
   stop buttons disposed on two or more of the card processing stations, each stop button is capable of stopping operation of the system when pressed; and
   the operator station includes a stop button that is capable of stopping operation of the system when pressed.

8. The card personalization system of claim 7, further comprising a stop button on the card input or on the card output.

\* \* \* \* \*